US012574998B2

(12) United States Patent
Rastegardoost et al.

(10) Patent No.: US 12,574,998 B2
(45) Date of Patent: Mar. 10, 2026

(54) MULTI-CONSECUTIVE SLOTS TRANSMISSION WITH SIDELINK DISCONTINUOUS RECEPTION

(71) Applicant: Ofinno, LLC, Reston, VA (US)

(72) Inventors: Nazanin Rastegardoost, McLean, VA (US); Hyoungsuk Jeon, Centreville, VA (US); Esmael Hejazi Dinan, McLean, VA (US); Jongwoo Hong, Vienna, VA (US); Bing Hui, Nanjing (CN); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/300,235

(22) Filed: Aug. 14, 2025

(65) Prior Publication Data

US 2025/0374372 A1 Dec. 4, 2025

Related U.S. Application Data

(63) Continuation of application No. PCT/US2024/016007, filed on Feb. 15, 2024.

(Continued)

(51) Int. Cl.
| | |
|---|---|
| *H04W 76/00* | (2018.01) |
| *H04W 76/28* | (2018.01) |
| *H04W 92/18* | (2009.01) |

(52) U.S. Cl.
CPC ............ *H04W 76/28* (2018.02); *H04W 92/18* (2013.01)

(58) Field of Classification Search
CPC .................................................. H04W 76/28
See application file for complete search history.

(56) References Cited

U.S. PATENT DOCUMENTS

| | | |
|---|---|---|
| 12,047,985 B2 | 7/2024 | Shin et al. |
| 2020/0029340 A1 | 1/2020 | He et al. |

(Continued)

FOREIGN PATENT DOCUMENTS

| | | |
|---|---|---|
| WO | 2021/147959 A1 | 7/2021 |
| WO | 2021/163527 A1 | 8/2021 |

(Continued)

OTHER PUBLICATIONS

3GPP TS 38.214 V17.4.0 (Dec. 2022); Technical Specification; 3rd Generation Partnership Project; Technical Specification Group Radio Access Network; NR; Physical layer procedures for data; (Release 17).

(Continued)

*Primary Examiner* — Erika A Washington

(74) *Attorney, Agent, or Firm* — Brett K. Gardner; Kavon Nasabzadeh; Jacob L. Mangan

(57) ABSTRACT

A wireless device initializes a candidate resource set, comprising one or more first multi-slot resources of a sidelink resource pool, for a plurality of sidelink transmissions to at least one destination wireless device. Each of the one or more first multi-slot resources comprises a number of consecutive slots, and the number of consecutive slots is larger than 1. The wireless device determines to include, in the candidate resource set, a second multi-slot resource of the sidelink resource pool. The second multi-slot resource comprises the number of consecutive slots within a sidelink discontinuous reception (DRX) active time of the at least one destination wireless device. The wireless device transmits, to the at least one destination wireless device, the plurality of sidelink transmissions via the second multi-slot resource.

20 Claims, 40 Drawing Sheets

Related U.S. Application Data

(60) Provisional application No. 63/446,283, filed on Feb. 16, 2023.

(56) References Cited

U.S. PATENT DOCUMENTS

| | | | |
|---|---|---|---|
| 2021/0127365 A1 | 4/2021 | Wang et al. | |
| 2021/0298015 A1 | 9/2021 | Peng et al. | |
| 2022/0095326 A1 | 3/2022 | Li et al. | |
| 2022/0191794 A1 | 6/2022 | Pan et al. | |
| 2023/0038045 A1* | 2/2023 | Ko | H04W 76/28 |
| 2023/0254898 A1 | 8/2023 | Cheng et al. | |
| 2024/0163904 A1* | 5/2024 | Huang | H04W 72/25 |
| 2024/0373445 A1 | 11/2024 | Zhang et al. | |

FOREIGN PATENT DOCUMENTS

| | | |
|---|---|---|
| WO | 2022/177167 A1 | 8/2022 |
| WO | 2022/208366 A1 | 10/2022 |
| WO | 2023/132787 A2 | 7/2023 |

OTHER PUBLICATIONS

3GPP TS 38.300 V17.3.0 (Dec. 2022); Technical Specification; 3rd Generation Partnership Project; Technical Specification Group Radio Access Network; NR; NR and NG-RAN Overall Description; Stage 2; (Release 17).

3GPP TS 38.321 V17.3.0 (Dec. 2022); Technical Specification; 3rd Generation Partnership Project; Technical Specification Group Radio Access Network; NR; Medium Access Control (MAC) protocol specification; (Release 17).

3GPP TS 38.331 V17.3.0 (Dec. 2022); Technical Specification; 3rd Generation Partnership Project; Technical Specification Group Radio Access Network; NR; Radio Resource Control (RRC) protocol specification; (Release 17).

3GPP TSG RAN WG1 #111; Toulouse, France, Nov. 14-18, 2022; Title: RAN1 Chair's Notes.

R1-2210827; 3GPP TSG RAN WG1 #111; Toulouse, France, Nov. 14-18, 2022; Source: Nokia, Nokia Shanghai Bell; Title: On Channel Access Mechanism for SL-U; Agenda item: 9.4.1.1; Document for: Discussion and Decision.

R1-2210835; 3GPP TSG RAN WG1 Meeting #111; Toulouse, France, Nov. 14-18, 2022; Agenda Item: 9.4.1.1; Source: Futurewei; Title: Channel access mechanism for sidelink on unlicensed spectrum; Document for: Discussion and decision.

R1-2210891; 3GPP TSG-RAN WG1 Meeting #111; Toulouse, France, Nov. 14-18, 2022; Agenda Item: 9.4.1.1; Source: Huawei, HiSilicon; Title: Channel access mechanism and resource allocation for sidelink operation over unlicensed spectrum; Document for: Discussion and Decision.

R1-2211007; 3GPP TSG RAN WG1 #111; Toulouse, France, Nov. 14-18, 2022; Source: vivo; Title: Channel access mechanism for sidelink on unlicensed spectrum; Agenda Item: 9.4.1.1; Document for: Discussion and Decision.

R1-2211079; 3GPP TSG RAN WG1 Meeting #111; Toulouse, France, Nov. 14-18, 2022; Source: Fujitsu; Title: Discussion on channel access mechanism for SL-U; Agenda item: 9.4.1.1; Document for: Discussion and Decision.

R1-2211198; 3GPP TSG RAN WG1 #111; Toulouse, France, Nov. 14-18, 2022; Source: CATT, GOHIGH; Title: Discussion on channel access mechanism for sidelink on unlicensed spectrum; Agenda Item: 9.4.1.1; Document for: Discussion and Decision.

R1-2211235; 3GPP TSG RAN WG1 #111; Toulouse, France, Nov. 14-18, 2022; Agenda Item: 9.4.1.1; Source: Spreadtrum Communications; Title: Discussion on channel access mechanism of sidelink on unlicensed spectrum; Document for: Discussion and decision.

R1-2211263; 3GPP TSG RAN WG1 #111; Toulouse, France, Nov. 14-18, 2022; Agenda Item: 9.4.1.1; Source: LG Electronics; Title: Discussion on channel access mechanism for sidelink on unlicensed spectrum; Document for: Discussion and decision.

R1-2211364; 3GPP TSG RAN WG1 #111; Toulouse, France, Nov. 14-18, 2022; Source: Xiaomi; Title: Discussion on channel access mechanism for sidelink-unlicensed; Agenda item: 9.4.1.1; Document for: Decision.

R1-2211400; 3GPP TSG RAN WG1 #111; Toulouse, France, Nov. 14-Nov. 18, 2022; Source: Intel Corporation; Title: Channel Access Mechanisms for SL Operating in Unlicensed Spectrum; Agenda item: 9.4.1.1; Document for: Discussion and Decision.

R1-2211450; 3GPP TSG-RAN WG1 Meeting #111; Toulouse, France, Nov. 14-18, 2022; Agenda item: 9.4.1.1; Title: On channel access mechanism and resource allocation for SL-U; Source: OPPO; Document for: Discussion and Decision.

R1-2211514; 3GPP TSG RAN WG1#111; Toulouse, France, Nov. 14-18, 2022; Agenda Item: 9.4.1.1; Source: Transsion Holdings; Title: Discussion of channel access mechanism for sidelink in unlicensed spectrum; Document for: Discussion and decision.

R1-2211560; 3GPP TSG RAN WG1 Meeting #111; Toulouse, France, Nov. 14-18, 2022; Source: ETRI; Title: Discussion on channel access mechanism for sidelink on unlicensed spectrum; Agenda item: 9.4.1.1; Document for: Discussion.

R1-2211579; 3GPP TSG RAN WG1 #111; Toulouse, France, Nov. 14-18, 2022; Agenda Item: 9.4.1.1; Source: Lenovo; Title: Channel access mechanism for sidelink on FR1 unlicensed spectrum; Document for: Discussion.

R1-2211612; 3GPP TSG RAN WG1 #111; Toulouse, France, Nov. 14-18, 2022; Agenda Item: 9.4.1.1; Source: Sony; Title: Discussion on channel access mechanism for SL-unlicensed; Document for: Discussion.

R1-2211682; 3GPP TSG RAN WG1 #111; Toulouse, France, Nov. 14-18, 2022; Agenda item: 9.4.1.1; Source: CMCC; Title: Discussion on channel access mechanism for sidelink on unlicensed spectrum; Document for: Discussion and Decision.

R1-2211709; 3GPP TSG RAN WG1 #111; Toulouse, France, Nov. 14-18, 2022; Agenda Item: 9.4.1.1; Source: InterDigital, Inc.; Title: Sidelink channel access on unlicensed spectrum; Document for: Discussion and Decision.

R1-2211758; 3GPP TSG RAN WG1 #110; Meeting, Nov. 11-18, 2022; Source: CableLabs; Title: Channel Access Mechanism Details; Agenda Item: 9.4.1.1; Document for: Discussion and Decision.

R1-2211814; 3GPP TSG-RAN WG1 Meeting #111; Toulouse, FR, Nov 14-Nov. 18, 2022; Agenda Item: 9.4.1.1; Source: Apple Inc.; Title: On channel access mechanism for sidelink on FR1 unlicensed spectrum; Document for: Discussion/Decision.

R1-2211917; 3GPP TSG RAN WG1 Meeting #111; Toulouse, France, Nov. 14-18, 2022; Source: CAICT; Title: Considerations on channel access mechanism of SL-U; Agenda Item: 9.4.1.1; Document for: Discussion and decision.

R1-2211985; 3GPP TSG RAN WG1 #111; Toulouse, France, Nov. 14-18, 2022; Source: NTT DOCOMO, Inc.; Title: Discussion on channel access mechanism in SL-U; Agenda Item: 9.4.1.1; Document for: Discussion and Decision.

R1-2212045; 3GPP TSG RAN WG1 Meeting #111; Toulouse, France, Nov. 14-18, 2022; Agenda item: 9.4.1.1; Source: Samsung; Title: On channel access mechanism for sidelink on FR1 unlicensed spectrum; Document for: Discussion and Decision.

R1-2212117; 3GPP TSG RAN WG1 Meeting #111; Toulouse, Nov. 14-Nov. 19, 2022; Agenda item: 9.4.1.1; Source: Qualcomm Incorporated; Title: Channel access mechanism for Sidelink on Unlicensed Spectrum; Document for: Discussion and Decision.

R1-2212184; 3GPP TSG RAN WG1 #111; Toulouse, France, Nov. 14-18, 2022; Source: Sharp; Title: Discussion on Channel access mechanism for NR sidelink evolution; Agenda Item: 9.4.1.1; Document for: Discussion and Decision.

R1-2212206; 3GPP TSG RAN WG1 #111; Toulouse, France, Nov. 14-18, 2022; Agenda item: 9.4.1.1; Source: ZTE, Sanechips; Title: Discussion on channel access mechanism for SL-U; Document for: Discussion and decision.

R1-2212222; 3GPP TSG RAN WG1 #111; Toulouse, France, Nov. 14-18, 2022; Agenda Item: 9.4.1.1; Source: Ericsson; Title: Channel access mechanism for SL-U; Document for: Discussion, Decision.

(56)          References Cited

OTHER PUBLICATIONS

R1-2212270; 3GPP TSG RAN WG1 #111; Toulouse, France, Nov. 14-18, 2022; Agenda item: 9.4.1.1; Source: MediaTek Inc.; Title: Discussion on channel access mechanism; Document for: Discussion/ Decision.
R1-2212274; 3GPP TSG RAN WG1 #111; Toulouse, France, Nov. 14-18, 2022; Source: Panasonic; Title: Sidelink channel access on unlicensed spectrum; Agenda Item: 9.4.1.1; Item for: Discussion.
R1-2212287; 3GPP TSG RAN WG1 #111; Toulouse, France, Nov. 14-18, 2022; Agenda Item: 9.4.1.1; Source: ITL; Title: Channel Access Mechanism for SL-U; Document for: Discussion and decision.
R1-2212363; 3GPP TSG RAN WG1 #111; Toulouse, France, Nov. 14-18, 2022; Agenda Item: 9.4.1.1; Source: NEC; Title: Channel Access of Sidelink on Unlicensed Spectrum; Document for: Discussion/ Decision.
R1-2212439; 3GPP TSG RAN WG1 #111; Toulouse, France, Nov. 14-18, 2022; Source: WILUS Inc.; Title: Discussion on channel access mechanism for SL on unlicensed spectrum; Agenda item: 9.4.1.1; Document for: Discussion/Decision.
R1-2212442; 3GPP TSG RAN WG1 Meeting #111; Toulouse, France, Nov. 14-18, 2022; Agenda item: 9.4.1.1; Title: NR Sidelink Unlicensed Channel Access Mechanisms; Source: Fraunhofer HHI, Fraunhofer IIS; Document for: Discussion.
R1-2212521; 3GPP TSG RAN WG1 #110; Meeting, Nov. 11-18, 2022; Source: CableLabs; Title: Channel Access Mechanism Details; Agenda Item: 9.4.1.1; Document for: Discussion and Decision.
R1-2212803; 3GPP TSG RAN WG1 #111; Toulouse, France, Nov. 14-18, 2022; Source: Moderator (OPPO); Title: FL summary #8 for AI 9.4.1.1: SL-U channel access mechanism; Agenda item: 9.4.1.1; Document for: Discussion and Decision.
R2-2211640; 3GPP TSG-RAN WG2 Meeting #120; Toulouse Meeting, Nov. 14-18, 2022; Agenda Item: 8.15.2 (NR_SL_enh2); Source: LG Electronics Inc.; Title: Discussion on RAN2 aspects in SL-U; Document for: Discussion and Decision.
R2-22xxxxx; 3GPP TSG-RAN WG2 Meeting #119bis electronic; Online, Oct. 10-19, 2022; Agenda Item: 9.5; Source: Session Chair (Samsung); Title: Report from session on NR SL; Document for: Approval.
R1-2211761; 3GPP TSG RAN WG1 Meeting #111; Toulouse, France, Nov. 14-18, 2022; Source: Johns Hopkins University APL; Title: Further Discussion on Channel Access Mechanisms; Agenda item: 9.4.1.1; Document for: Discussion and Decision.
International Search Report and Written Opinion of the International Searching Authority mailed May 16, 2024, in International Application No. PCT/US2024/016007.

* cited by examiner

IP Packets

FIG. 5B

Uplink

FIG. 5A

Downlink

Logical Channels

Transport Channels

Physical Channels

Physical Signals

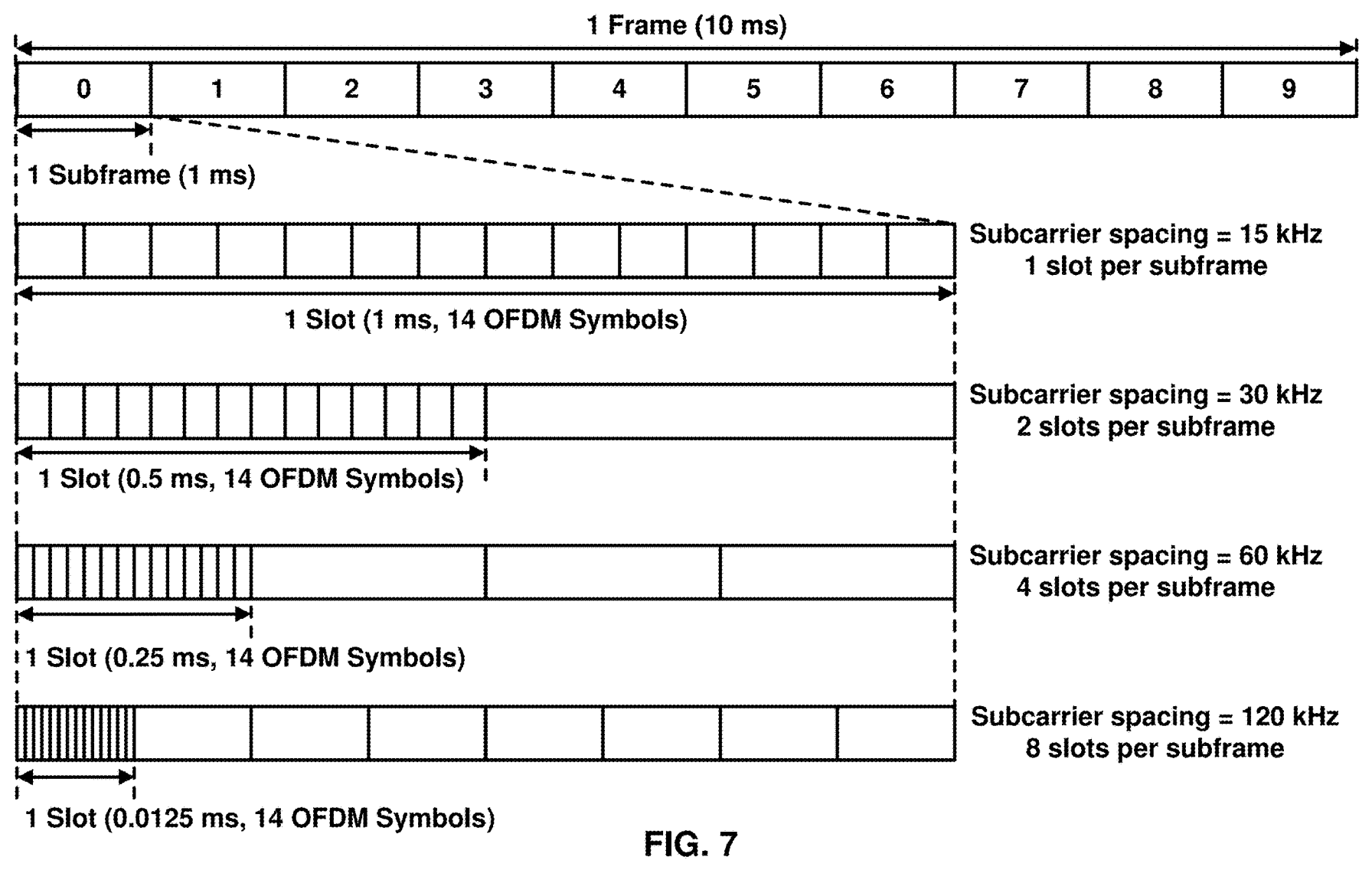

1 Frame (10 ms)

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

```
SL-ResourcePool::=     SEQUENCE {
    ...
    sl-UE-SelectedConfigRP     SL-UE-SelectedConfigRP
    ...
    sl-PreemptionEnable     ENUMERATED {enabled, pl1, pl2, pl3, pl4,
    pl5, pl6, pl7, pl8}
    ...
    sl-TxPercentageList     SL-TxPercentageList
    ...
} sl-UE-SelectedConfigRP ::=     SEQUENCE {
    ...
    sl-ThresPSSCH-RSRP-List     SL-ThresPSSCH-RSRP-List
    sl-MultiReserveResource     ENUMERATED {enabled}
    sl-MaxNumPerReserve     ENUMERATED {n2, n3}
    sl-SensingWindow     ENUMERATED {ms100, ms1100}
    sl-SelectionWindowList     SL-SelectionWindowList
    sl-ResourceReservePeriodList     SEQUENCE (SIZE (1..16)) OF SL-
ResourceReservePeriod
    sl-RS-ForSensing     ENUMERATED {pscch, pssch},
    ...
}
```

FIG. 21

```
SL-ResourceReservePeriod ::=       CHOICE {
    sl-ResourceReservePeriod1          ENUMERATED {ms0, ms100, ms200,
ms300, ms400, ms500, ms600, ms700, ms800, ms900, ms1000},
    sl-ResourceReservePeriod2          INTEGER (1..99)
}

SL-SelectionWindowList ::=         SEQUENCE (SIZE (8)) OF SL-
SelectionWindowConfig SL-SelectionWindowConfig ::=       SEQUENCE {
    sl-Priority                        INTEGER (1..8),
    sl-SelectionWindow                 ENUMERATED {n1, n5, n10, n20}
}

SL-TxPercentageList ::=            SEQUENCE (SIZE (8)) OF SL-
TxPercentageConfig SL-TxPercentageConfig ::=          SEQUENCE {
    sl-Priority                        INTEGER (1..8),
    sl-TxPercentage                    ENUMERATED {p20, p35, p50}
}
```

FIG. 22 time

FIG. 39        time

MULTI-CONSECUTIVE SLOTS TRANSMISSION WITH SIDELINK DISCONTINUOUS RECEPTION

CROSS-REFERENCE TO RELATED APPLICATIONS

This application is a continuation of International Application No. PCT/US2024/016007, filed Feb. 15, 2024, which claims the benefit of U.S. Provisional Application No. 63/446,283 filed Feb. 16, 2023, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 21 illustrates an example of configuration information for sidelink communication as per an aspect of an example embodiment of the present disclosure.

FIG. 22 illustrates an example of configuration information for sidelink communication as per an aspect of an example embodiment of the present disclosure.

DETAILED DESCRIPTION

Figures 1A, 1B:
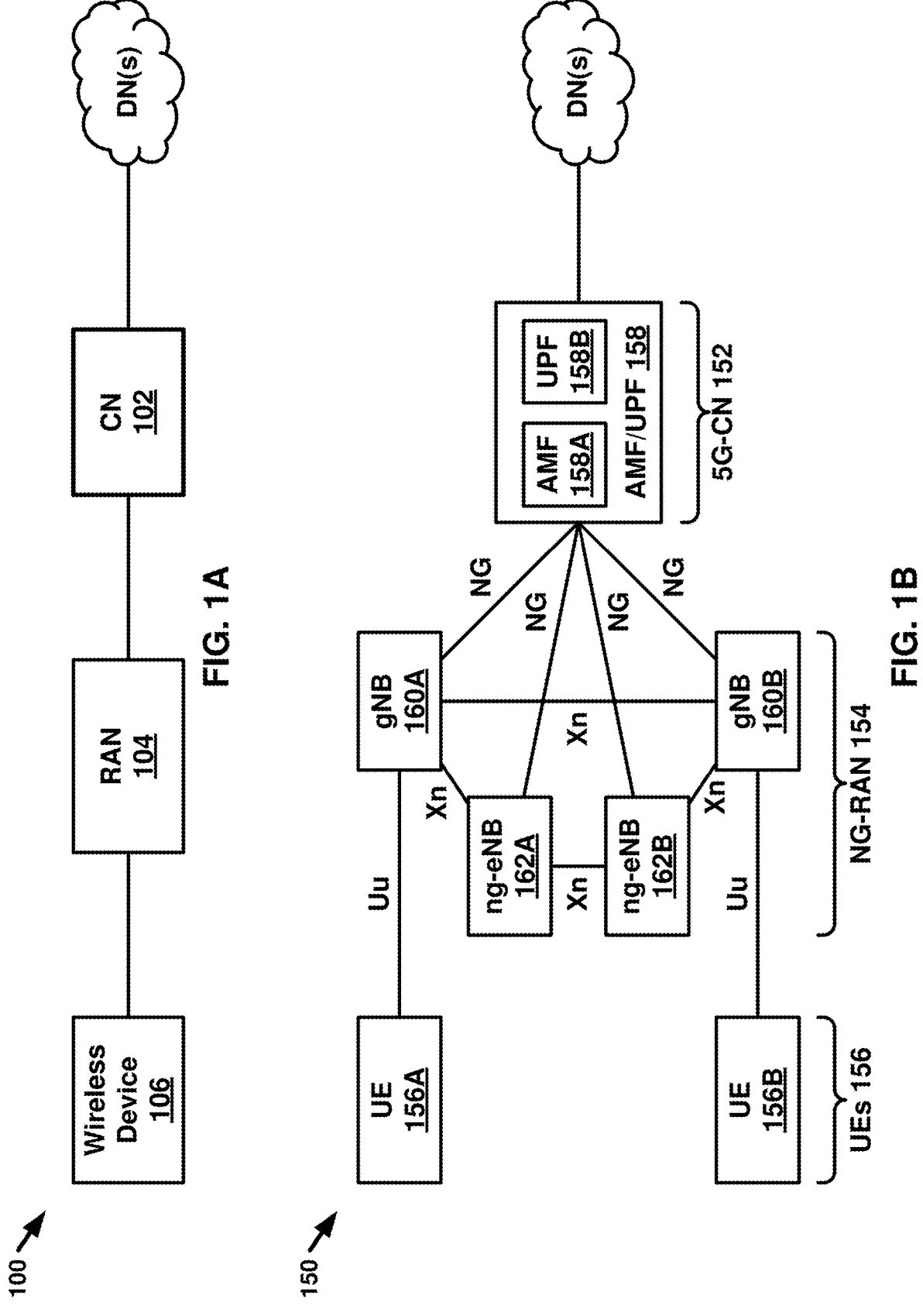
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNS), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
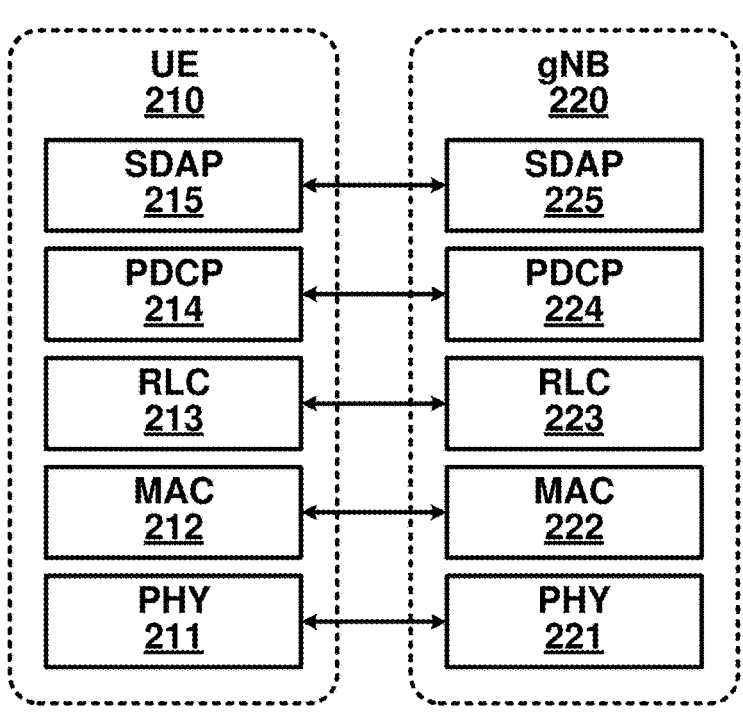
FIG. 2A and FIG. 2B respectively illustrate a New Radio (NR) user plane and control plane protocol stack.
Figure 2B:
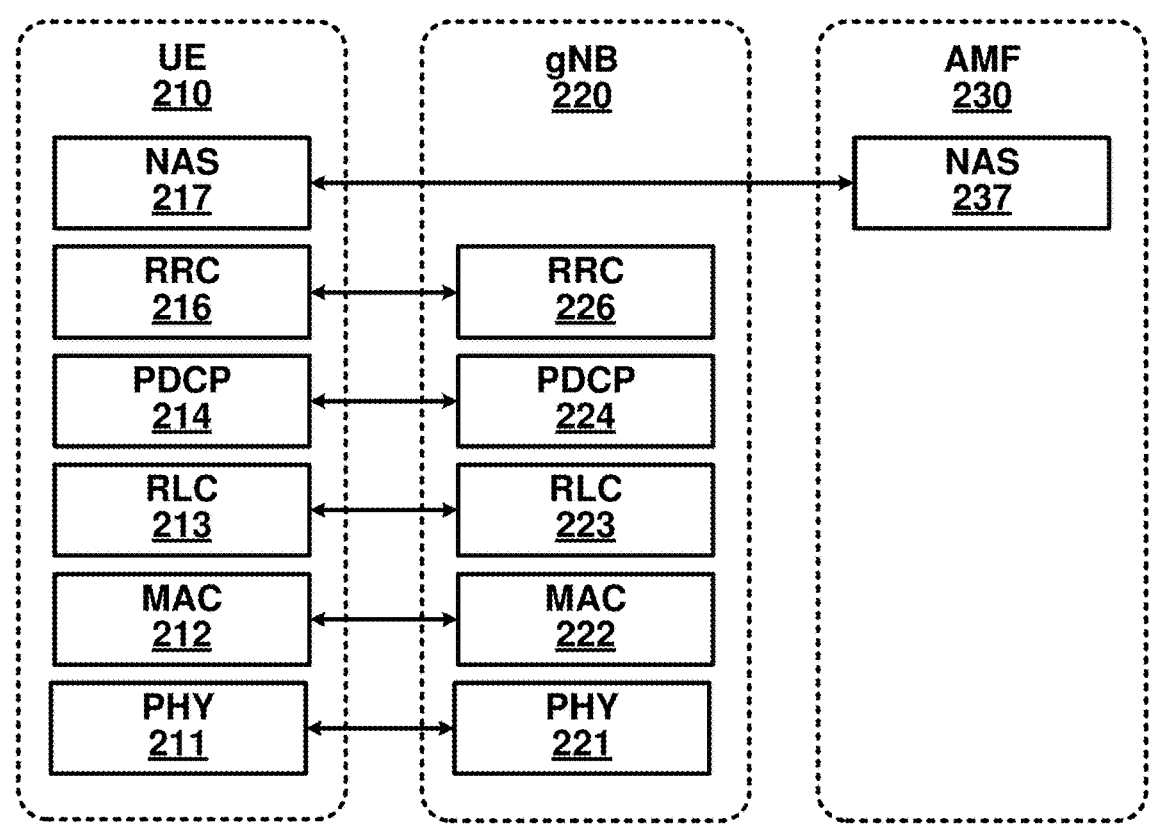

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
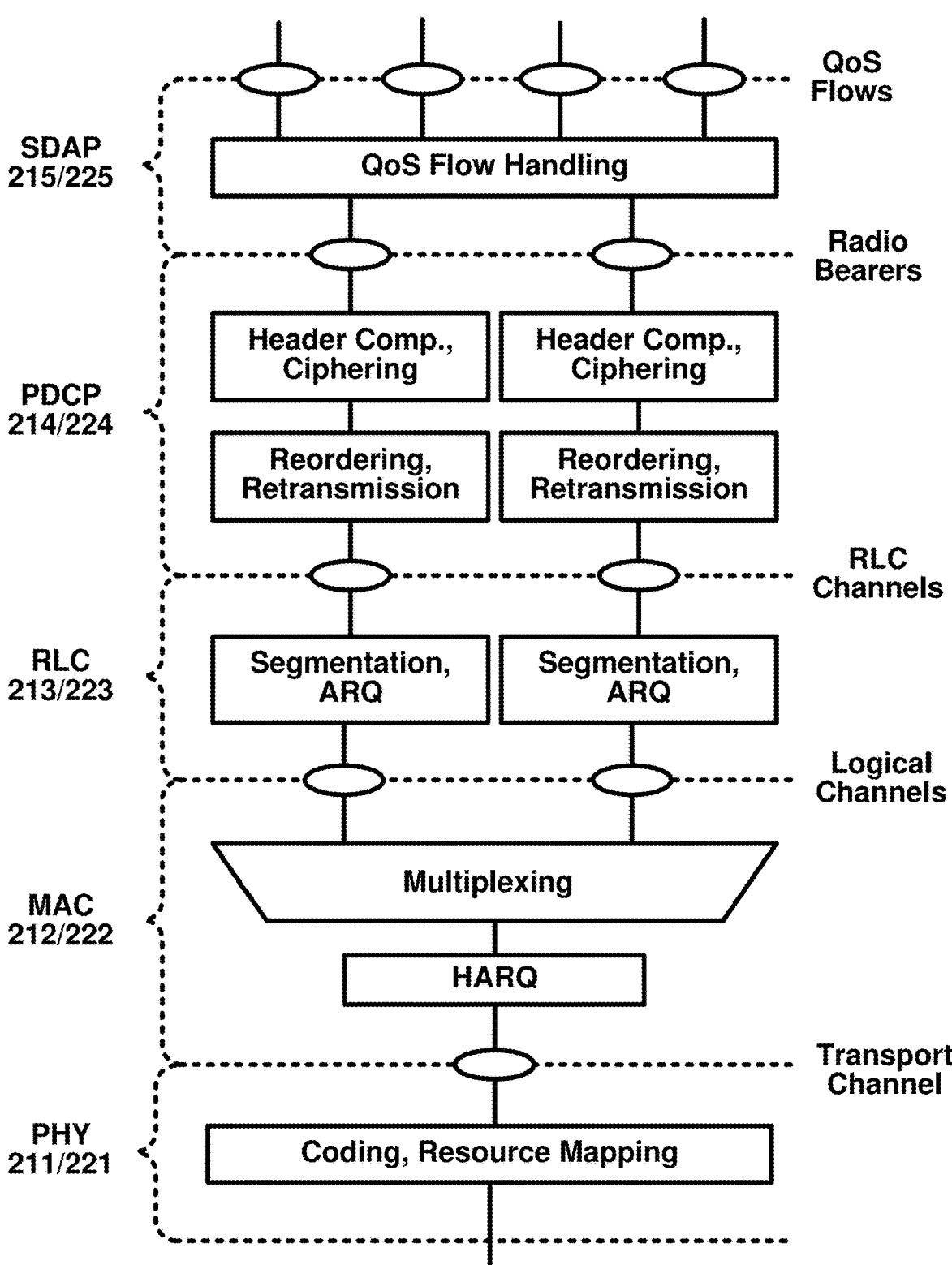
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
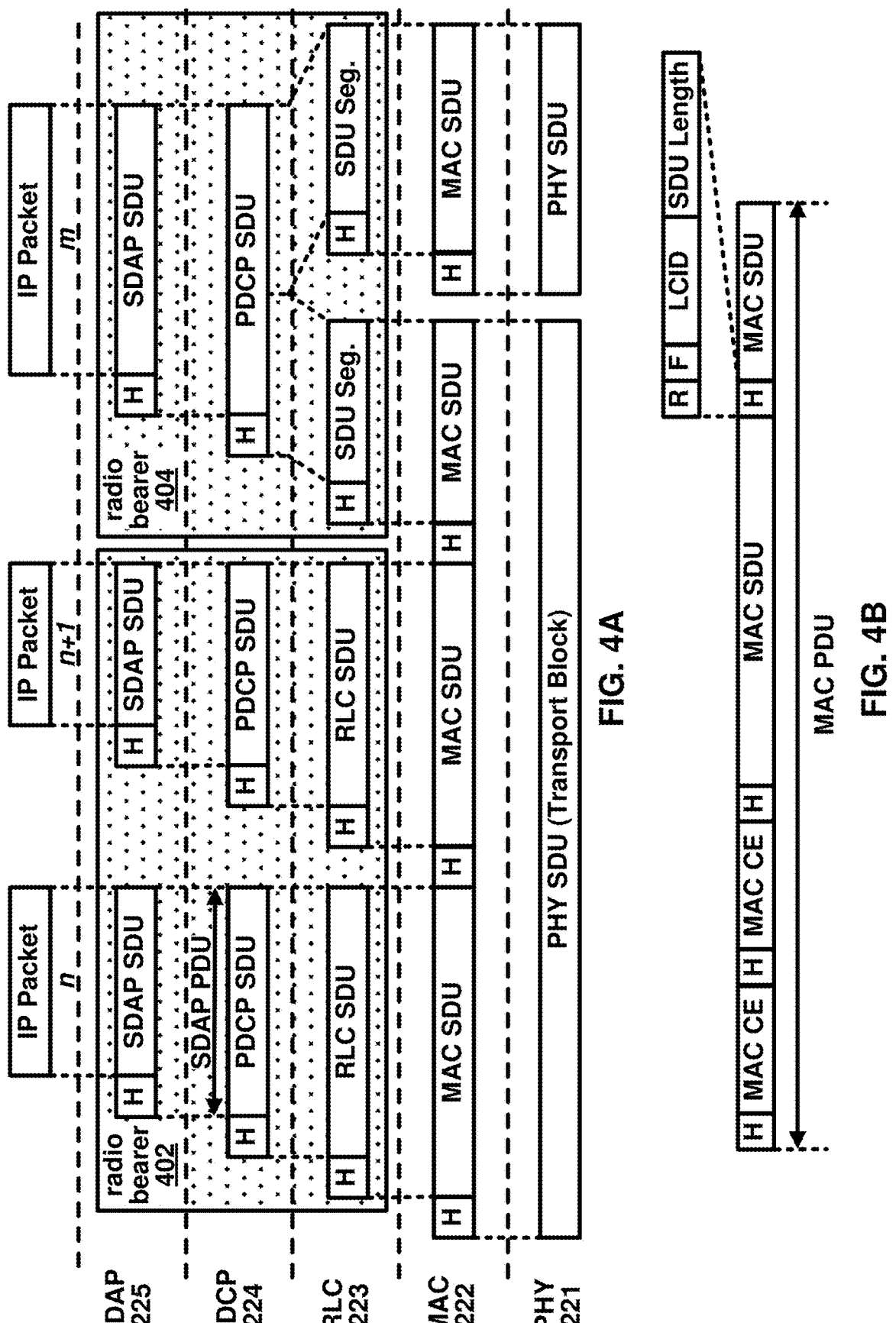
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
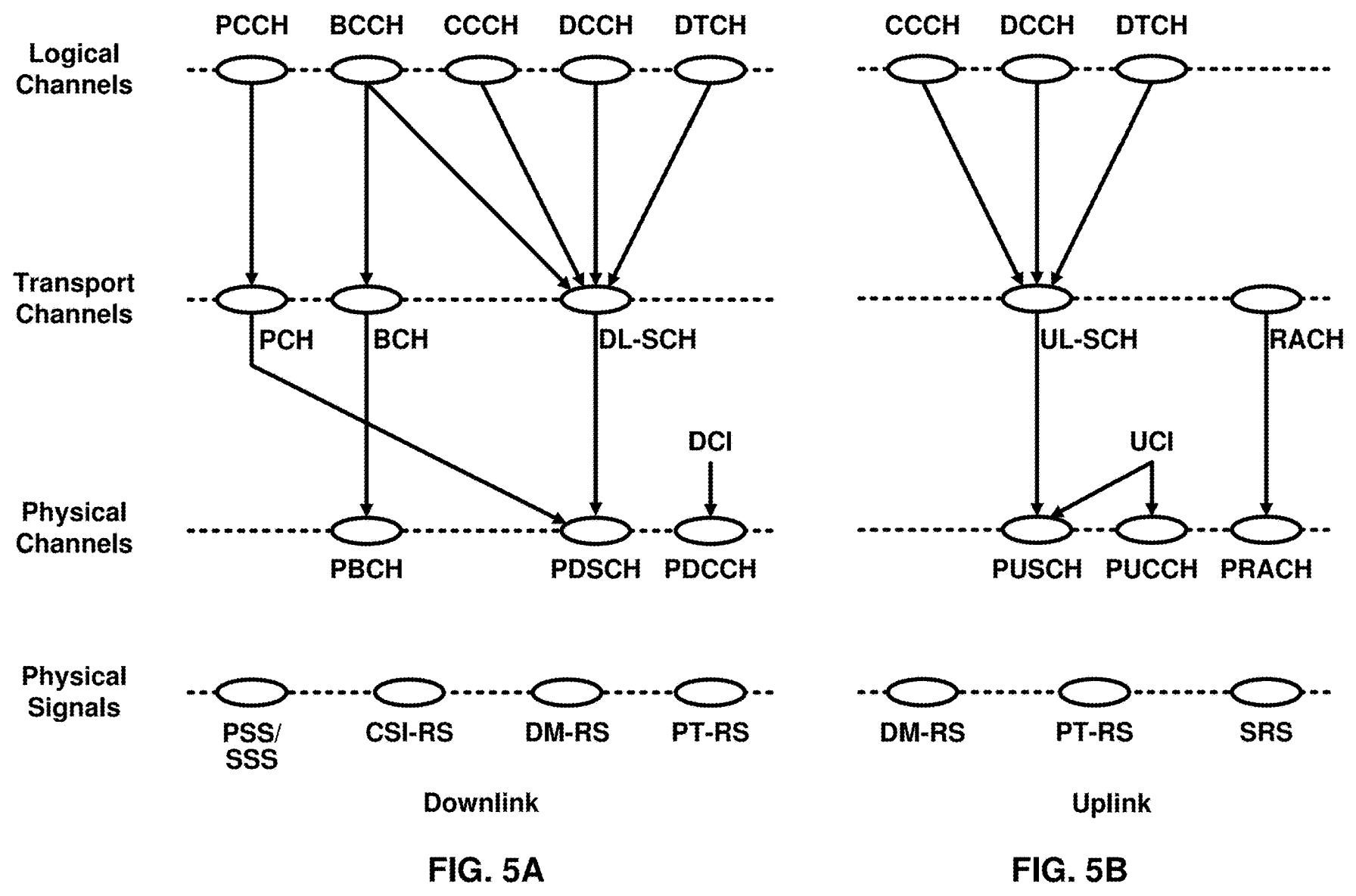

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels.

The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
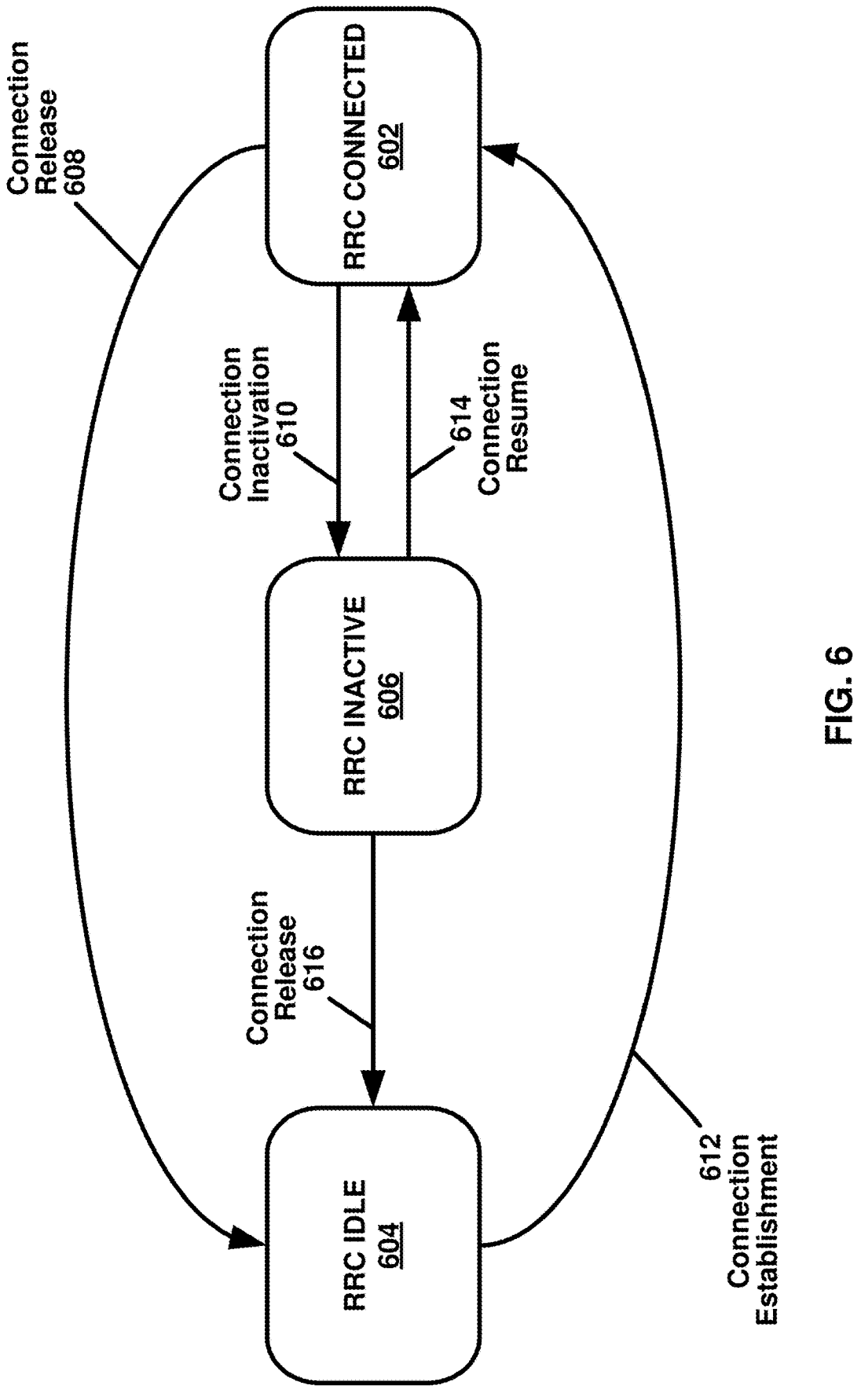
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 KHz/4.7 μs; 30 KHz/2.3 μs; 60 KHz/1.2 μs; 120 KHz/0.59 μs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
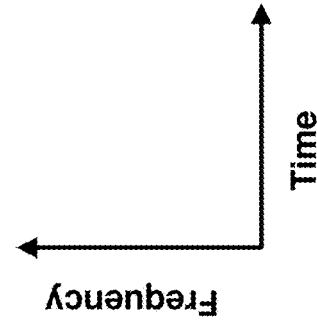
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 KHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the down-link BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
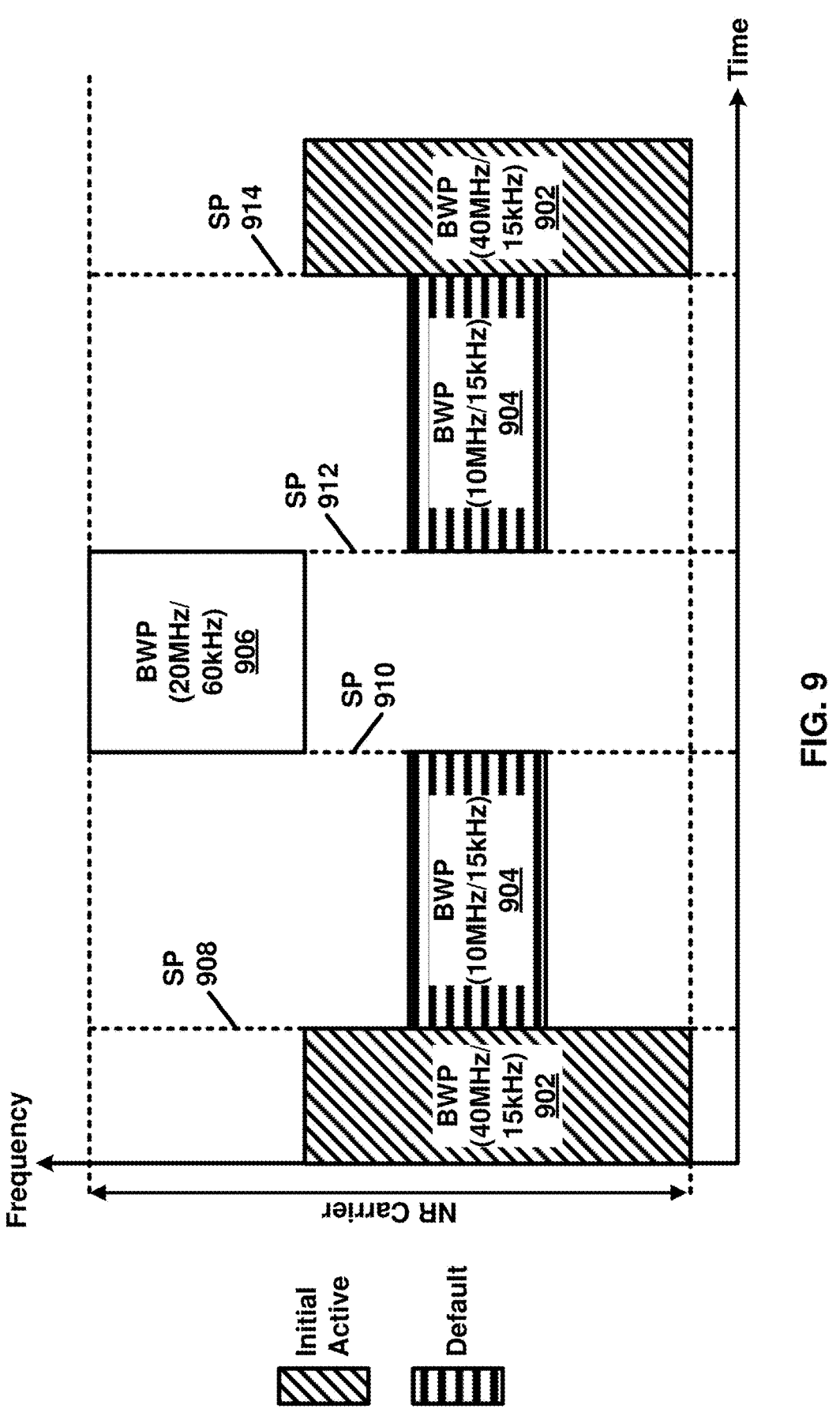
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP

904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
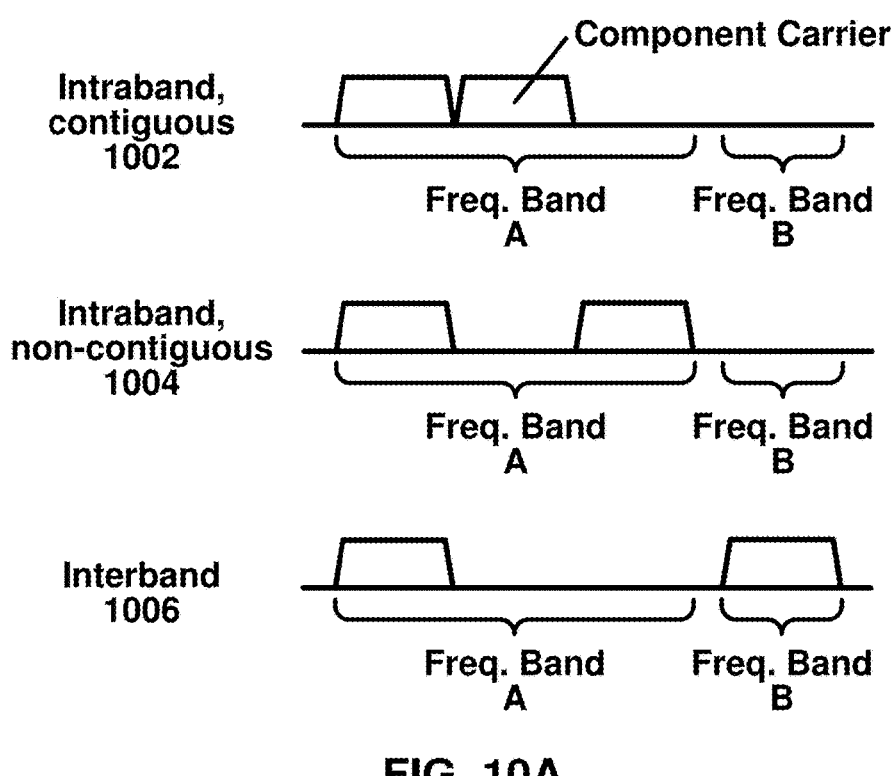
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
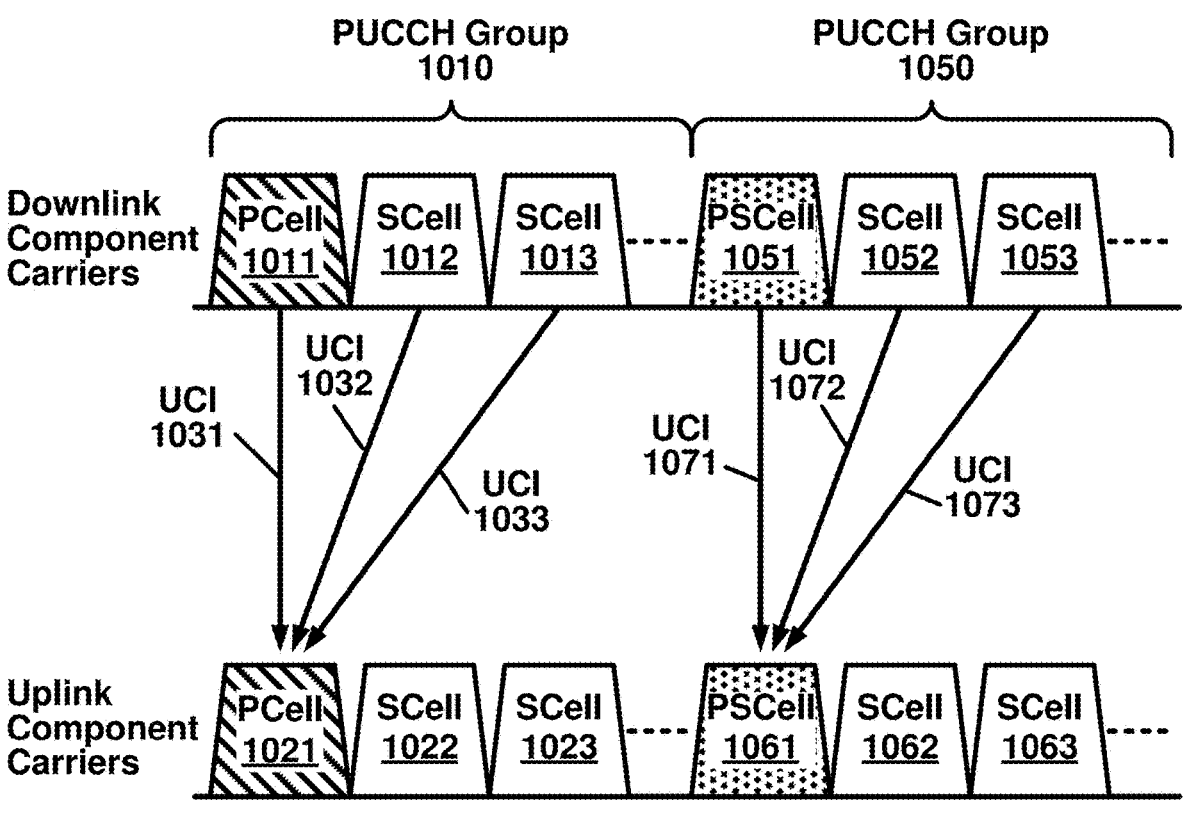
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
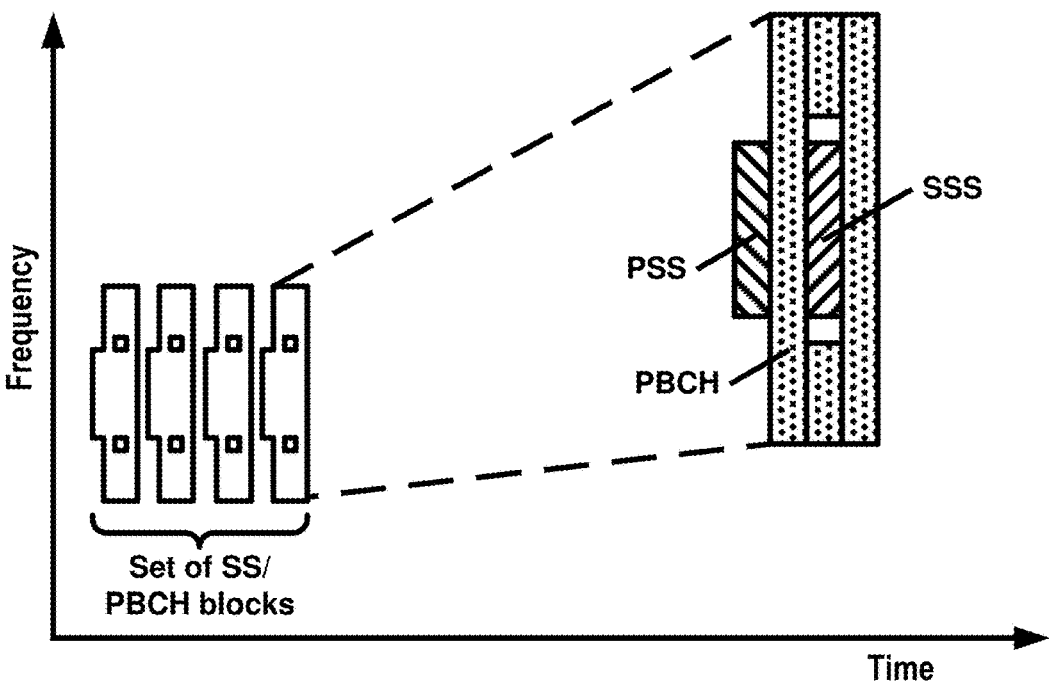
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may config-ure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for down-link CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-stati-cally configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodula-tion/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first band-width being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one con-figuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corre-sponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS loca-tion, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
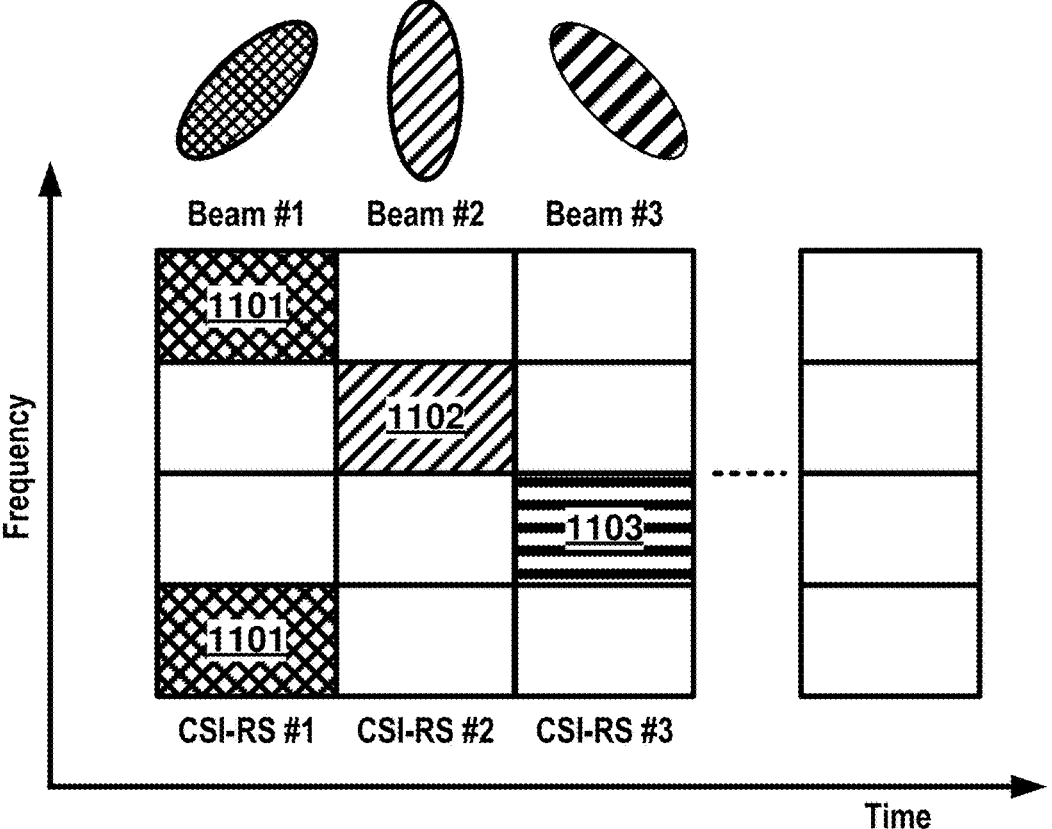
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
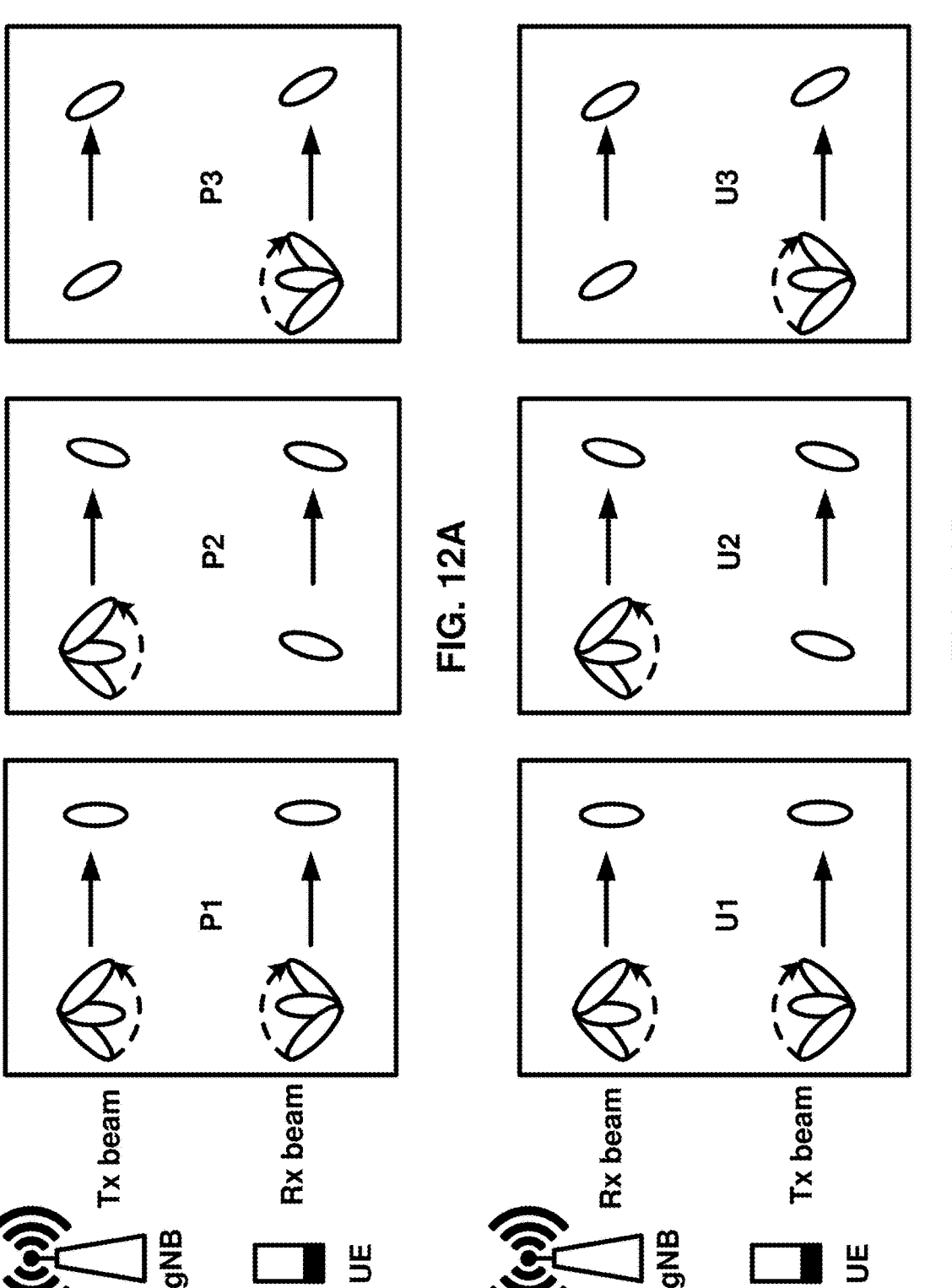
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
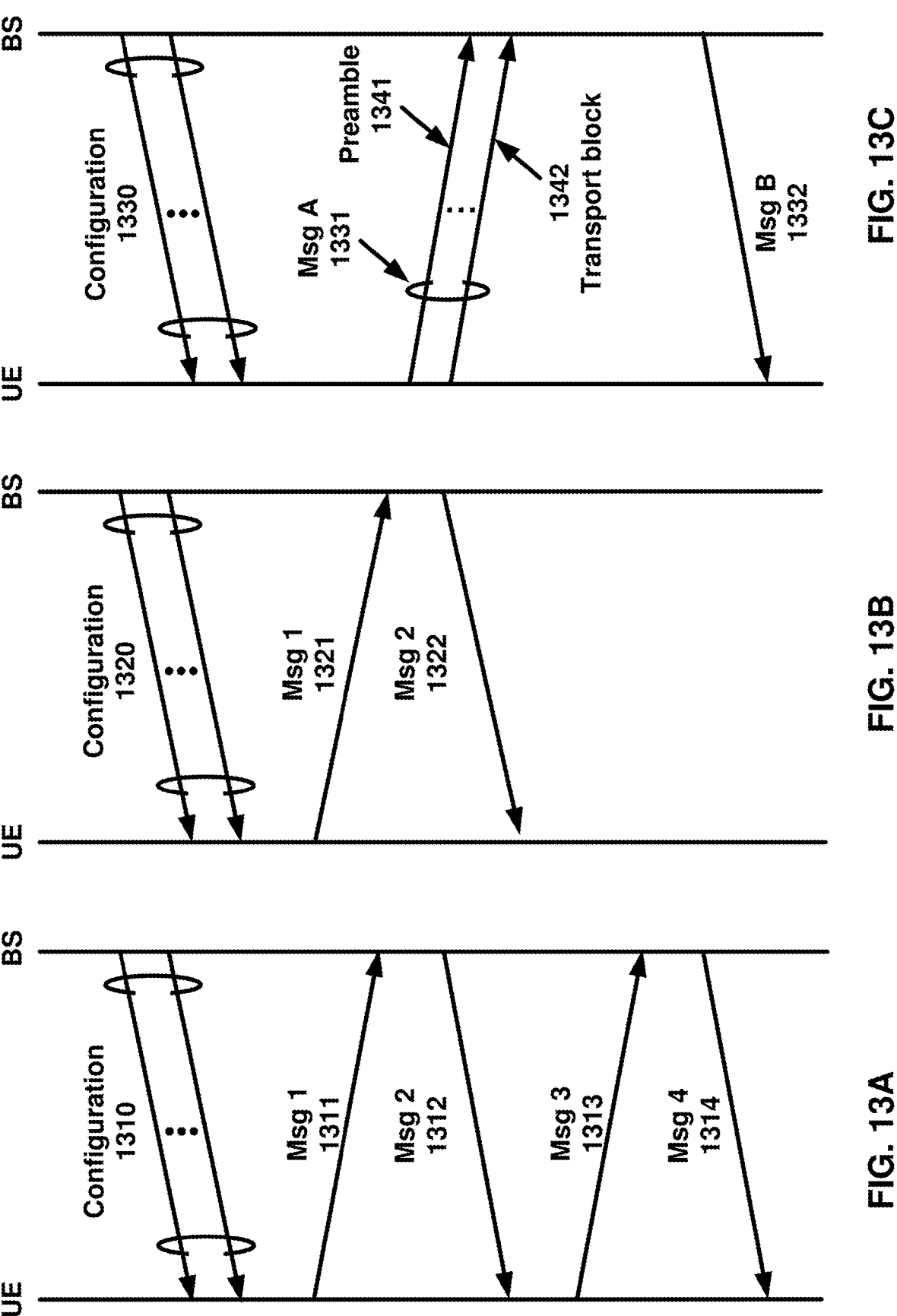
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=$1+s\_id+14\times t\_id+14\times 80\times f\_id+14\times 80\times 8\times ul\_carrier\_id$, where $s\_id$ may be an index of a first OFDM symbol of the PRACH occasion (e.g., $0 \leq s\_id < 14$), $t\_id$ may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
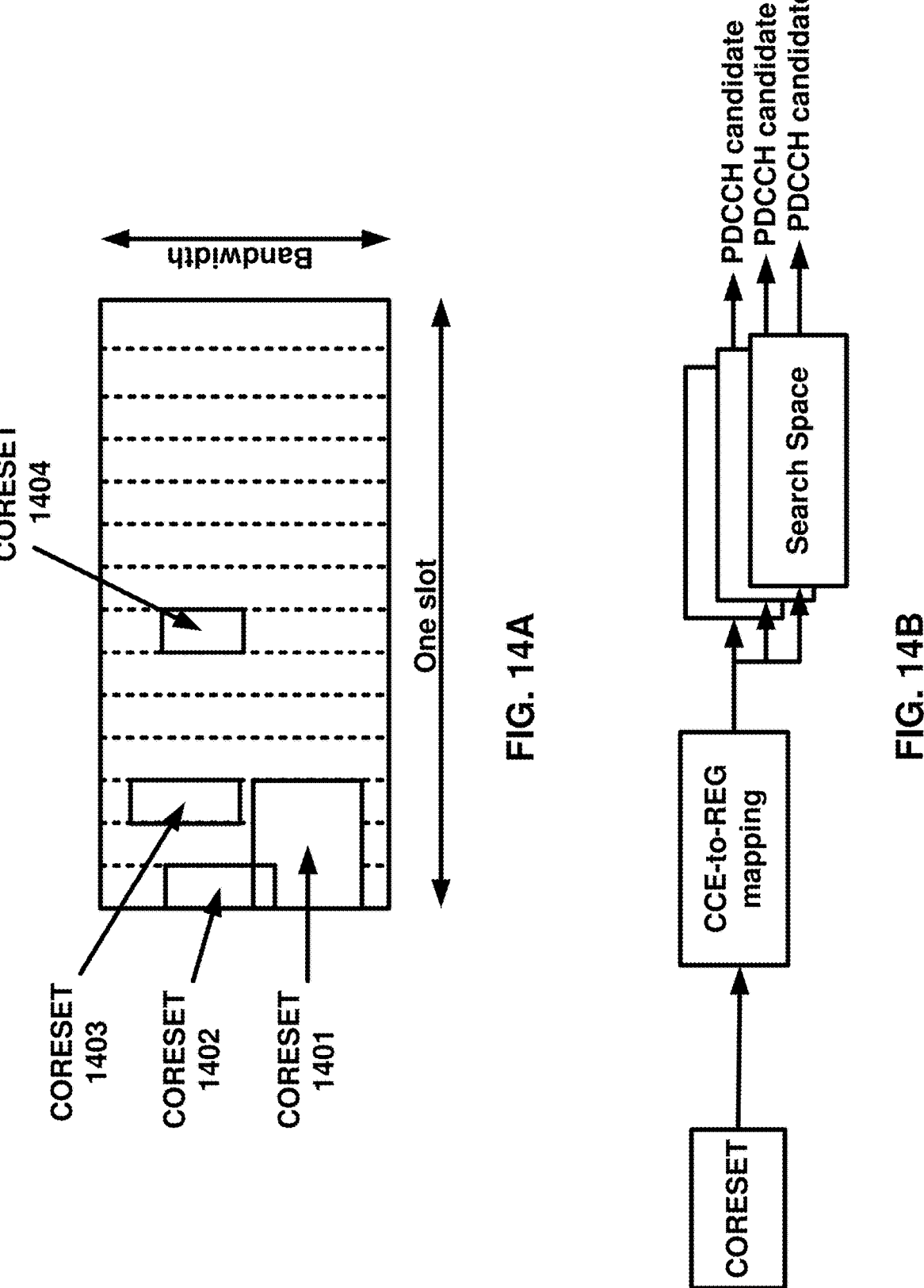
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
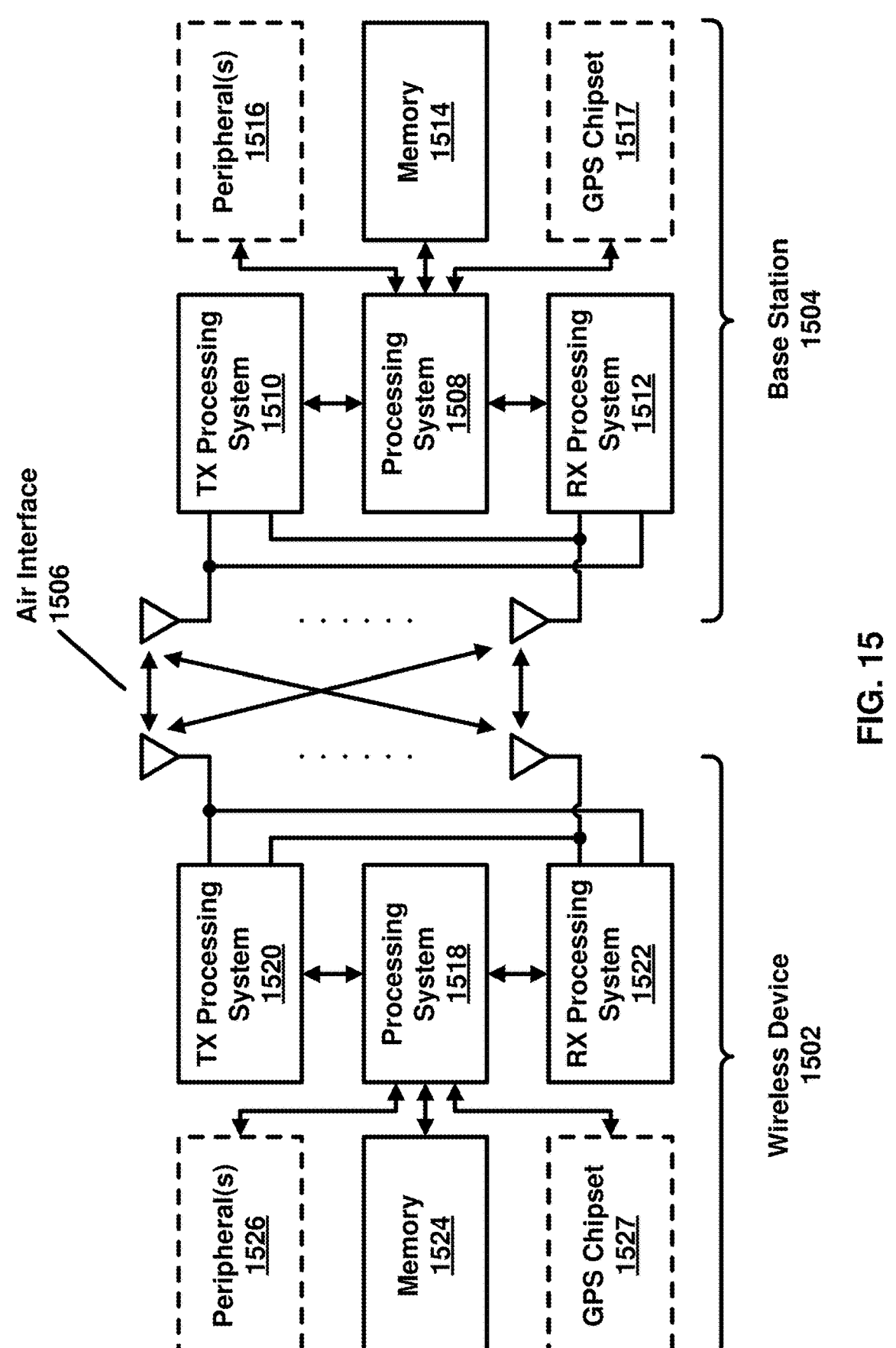
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
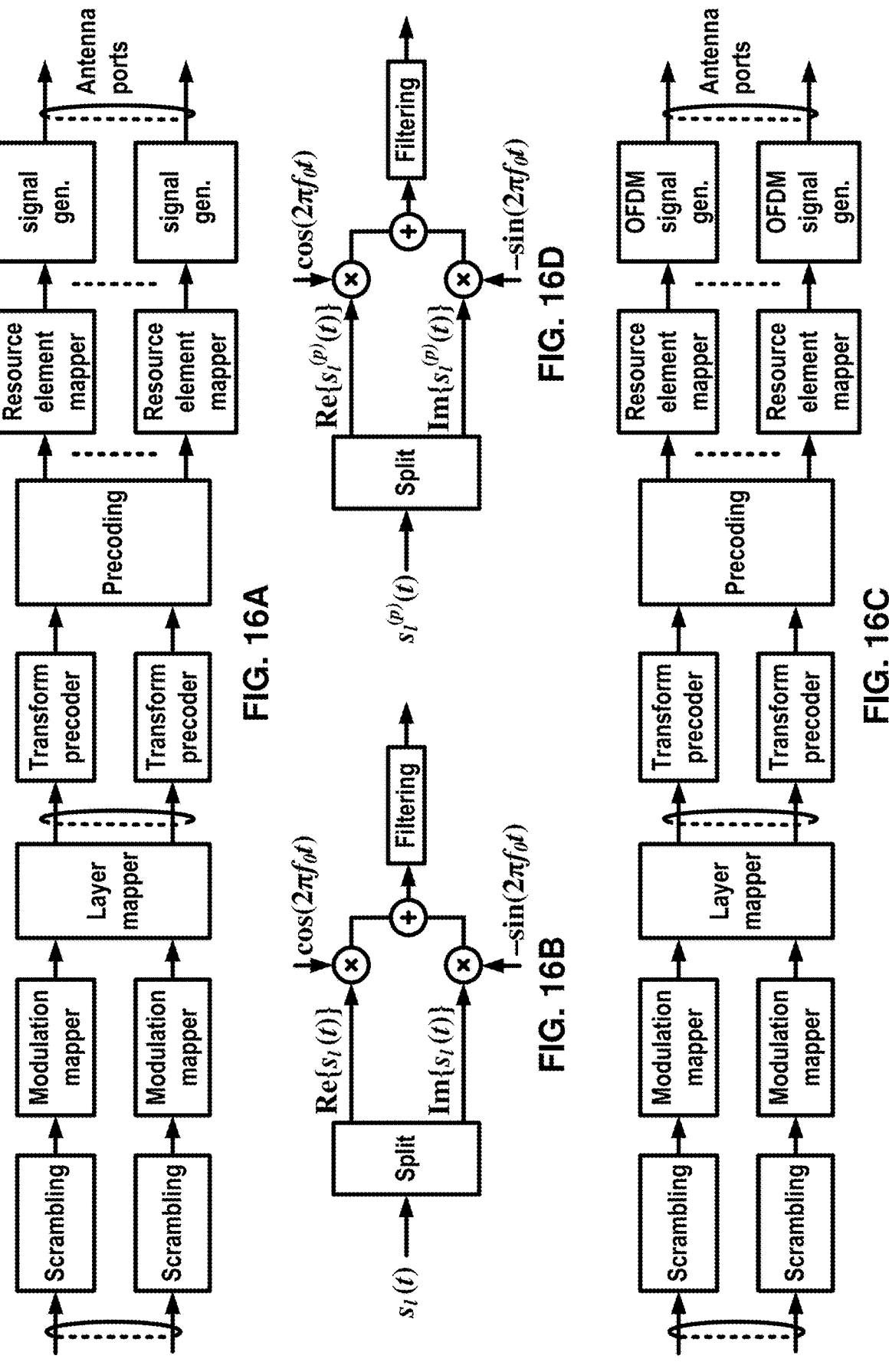
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
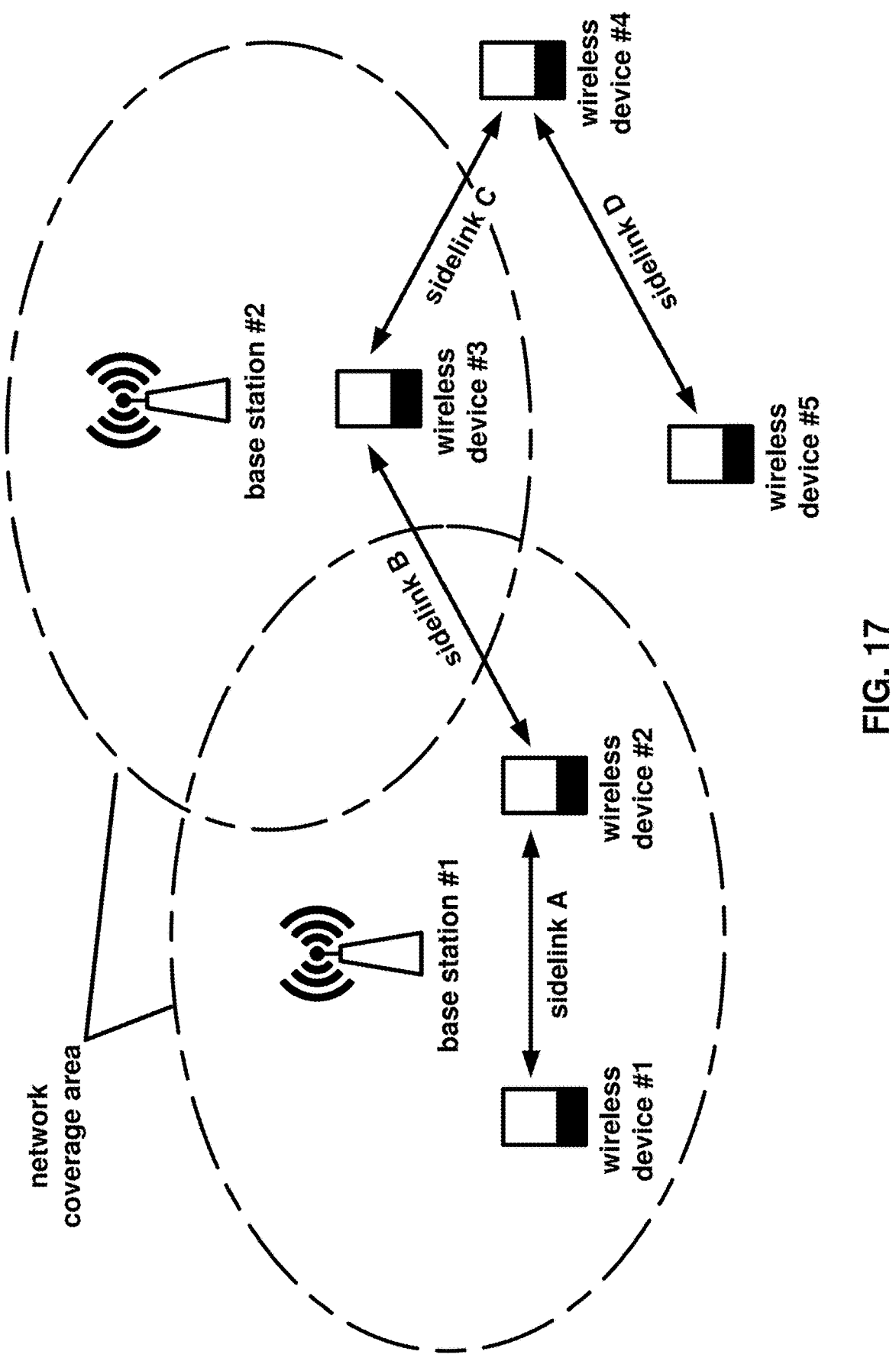
FIG. 17 illustrates examples of device-to-device (D2D) communication as per an aspect of an example embodiment of the present disclosure.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the FIG. 17, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
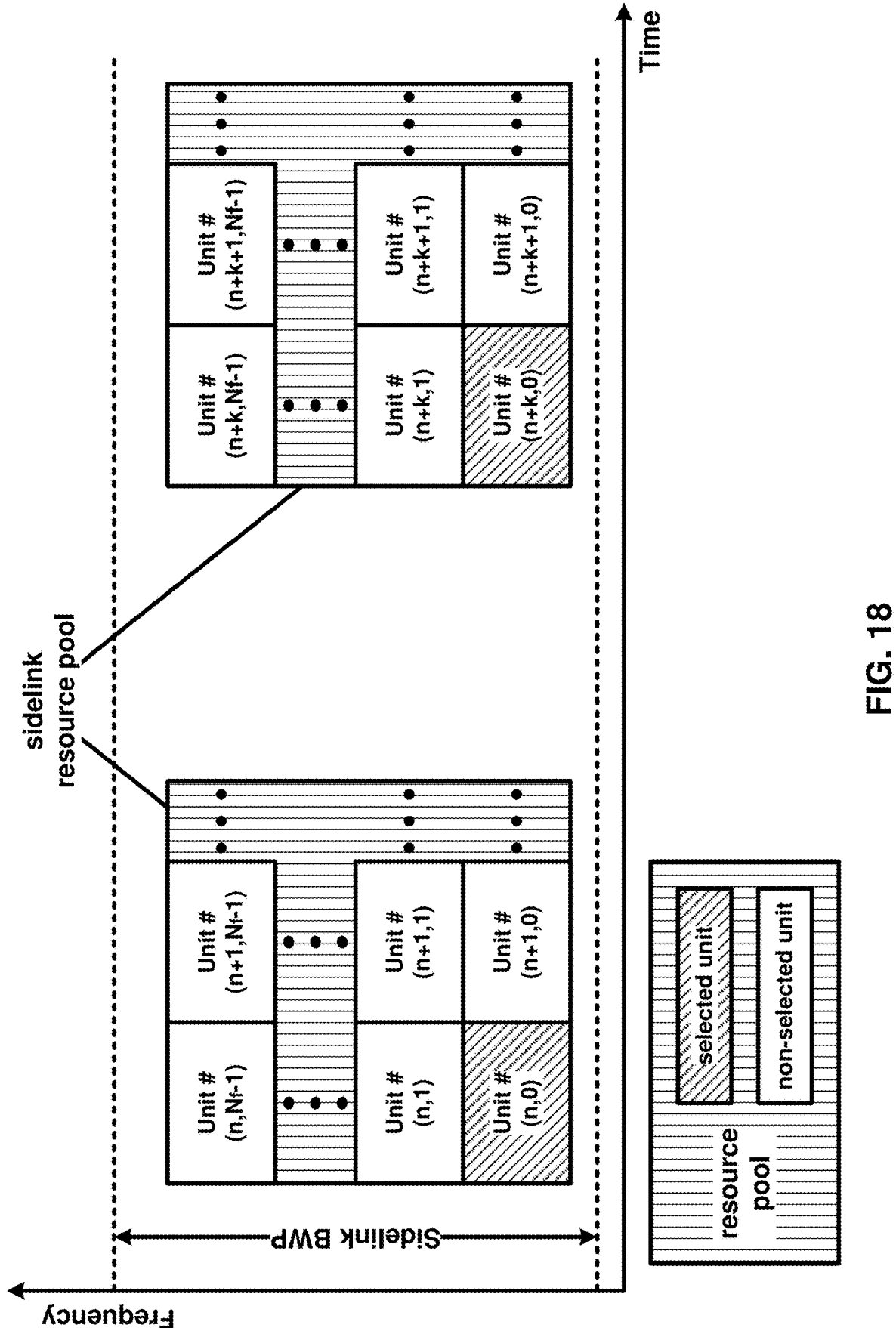
FIG. 18 illustrates an example of a resource pool for sidelink operations as per an aspect of an example embodiment of the present disclosure.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n–k,0), then the wireless device may select resource unit (n,0), resource (n+k,0), etc. For example, if a sidelink transmission from another wireless device is detected in resource unit (n–k, 1), then the wireless device may avoid selection of resource unit (n, 1), resource (n+k, 1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic may use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

In an example of vehicle-to-everything (V2X) communications via a Uu interface and/or a PC5 interface, the V2X communications may be vehicle-to-vehicle (V2V) communications. A wireless device in the V2V communications may be a vehicle. In an example, the V2X communications may be vehicle-to-pedestrian (V2P) communications. A wireless device in the V2P communications may be a pedestrian equipped with a mobile phone/handset. In an example, the V2X communications may be vehicle-to-infrastructure (V2I) communications. The infrastructure in the V2I communications may be a base station/access point/node/road side unit. A wireless device in the V2X communications may be a transmitting wireless device performing one or more sidelink transmissions to a receiving wireless device. The wireless device in the V2X communications may be a receiving wireless device receiving one or more sidelink transmissions from a transmitting wireless device.

Figure 19:
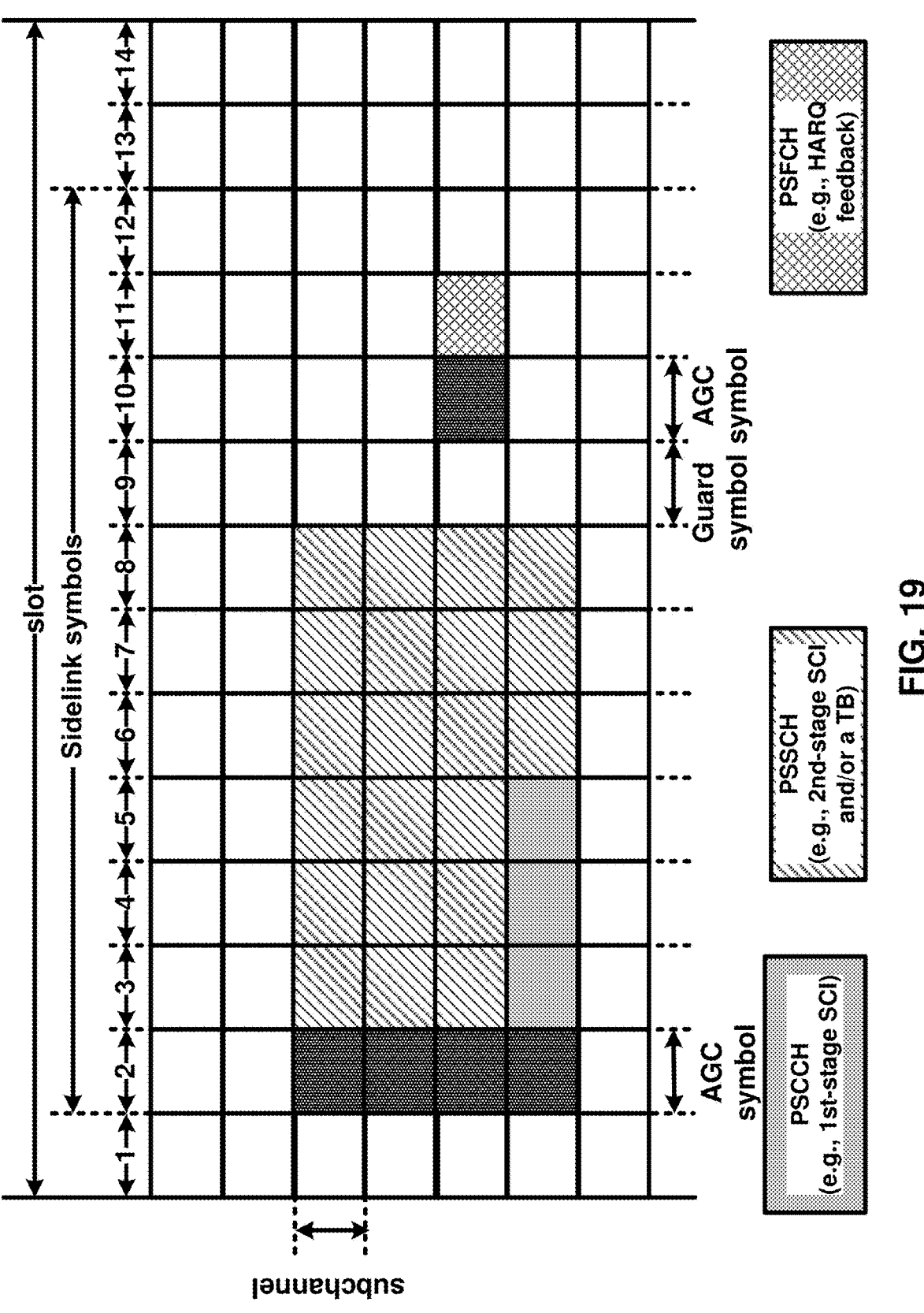
FIG. 19 illustrates an example of sidelink symbols in a slot as per an aspect of an example embodiment of the present disclosure.

FIG. 19 illustrates an example of sidelink symbols in a slot. In an example, a sidelink transmission may be transmitted in a slot in the time domain. In an example, a wireless device may have data to transmit via sidelink. The wireless device may segment the data into one or more transport blocks (TBs). The one or more TBs may comprise different pieces of the data. A TB of the one or more TBs may be a data packet of the data. The wireless device may transmit a TB of the one or more TBs (e.g., a data packet) via one or more sidelink transmissions (e.g., via PSCCH/PSSCH in one or more slots). In an example, a sidelink transmission (e.g., in a slot) may comprise SCI. The sidelink transmission may further comprise a TB. The SCI may comprise a $1^{st}$-stage SCI and a $2^{nd}$-stage SCI. A PSCCH of the sidelink transmission may comprise the $1^{st}$-stage SCI for scheduling a PSSCH (e.g., the TB). The PSSCH of the sidelink transmission may comprise the $2^{nd}$-stage SCI. The PSSCH of the sidelink transmission may further comprise the TB. In an example, sidelink symbols in a slot may or may not start from the first symbol of the slot. The sidelink symbols in the slot may or may not end at the last symbol of the slot. In an example of FIG. 19, sidelink symbols in a slot start from second symbol of the slot. In an example of FIG. 19, the sidelink symbols in the slot end at the twelfth symbol of the slot. A first sidelink transmission may comprise a first automatic gain control (AGC) symbol (e.g., the second symbol in the slot), a PSCCH (e.g., in the third, fourth and the fifth symbols in a sub-channel in the slot), a PSSCH (e.g., from the third symbol to the eighth symbol in the slot), and/or a first guard symbol (e.g., the ninth symbol in the slot). A second sidelink transmission may comprise a second AGC symbol (e.g., the tenth symbol in the slot), a PSFCH (e.g., the eleventh symbol in the slot), and/or a second guard symbol for the second sidelink transmission (e.g., the twelfth symbol in the slot). In an example, one or more HARQ feedbacks (e.g., positive acknowledgement or ACK and/or negative acknowledgement or NACK) may be transmitted via the PSFCH. In an example, the PSCCH, the PSSCH, and the PSFCH may have different number of sub-channels (e.g., a different number of frequency resources) in the frequency domain.

The $1^{st}$-stage SCI may be a SCI format 1-A. The SCI format 1-A may comprise a plurality of fields used for scheduling of the first TB on the PSSCH and the $2^{nd}$-stage SCI on the PSSCH. The following information may be transmitted by means of the SCI format 1-A.

A priority of the sidelink transmission. For example, the priority may be a physical layer (e.g., layer 1) priority of the sidelink transmission. For example, the priority may be determined based on logical channel priorities of the sidelink transmission;

Frequency resource assignment of the PSSCH;

Time resource assignment of the PSSCH;

Resource reservation period/interval for a second TB;

Demodulation reference signal (DMRS) pattern;

A format of the $2^{nd}$-stage SCI;

Beta_offset indicator,

Number of DMRS port;

Modulation and coding scheme of the PSSCH;

Additional MCS table indicator,

PSFCH overhead indication;

Reserved bits.

The $2^{nd}$-stage SCI may be a SCI format 2-A. The SCI format 2-A may be used for the decoding of the PSSCH, with HARQ operation when HARQ-ACK information includes ACK or NACK, or when there is no feedback of HARQ-ACK information. The SCI format 2-A may comprise a plurality of fields indicating the following information.

HARQ process number,

New data indicator,

Redundancy version;

Source ID of a transmitter (e.g., a transmitting wireless device) of the sidelink transmission;

Destination ID of a receiver (e.g., a receiving wireless device) of the sidelink transmission;

HARQ feedback enabled/disabled indicator,

Cast type indicator indicating that the sidelink transmission is a broadcast, a groupcast and/or a unicast;

CSI request.

The $2^{nd}$-stage SCI may be a SCI format 2-B. The SCI format 2-B may be used for the decoding of the PSSCH, with HARQ operation when HARQ-ACK information includes only NACK, or when there is no feedback of HARQ-ACK information. The SCI format 2-B may comprise a plurality of fields indicating the following information.

HARQ process number,

New data indicator,

Redundancy version;

Source ID of a transmitter (e.g., a transmitting wireless device) of the sidelink transmission;

Destination ID of a receiver (e.g., a receiving wireless device) of the sidelink transmission;

HARQ feedback enabled/disabled indicator,

Zone ID indicating a zone in which a transmitter (e.g., a transmitting wireless device) of the sidelink transmission is geographic located;

Communication range requirement indicating a communication range of the sidelink transmission.

Figure 20:
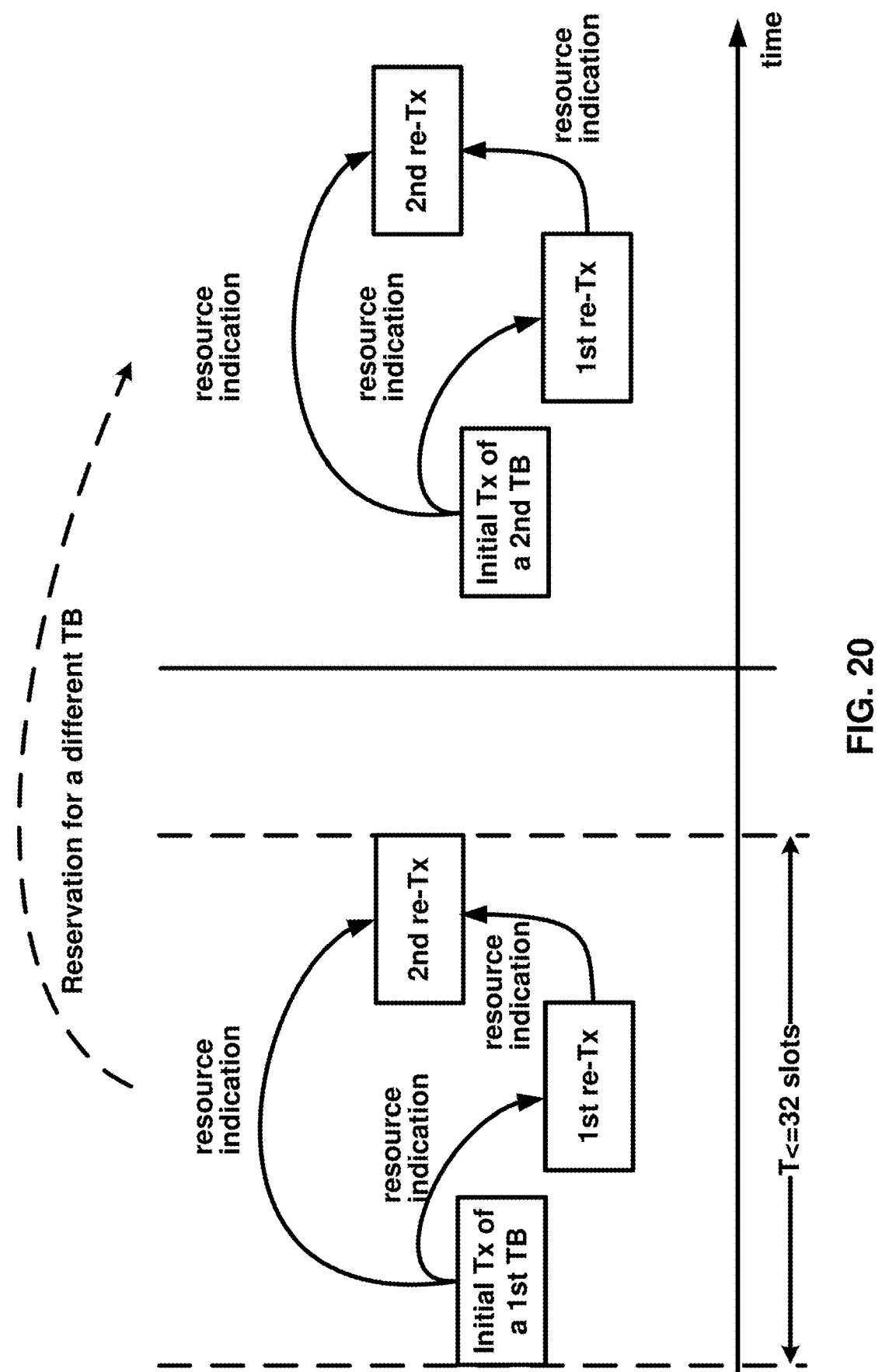
FIG. 20 illustrates an example of resource indication for a first TB (e.g, a first data packet) and resource reservation for a second TB (e.g., a second data packet) as per an aspect of an example embodiment of the present disclosure.

FIG. 20 illustrates an example of resource indication for a first TB (e.g, a first data packet) and resource reservation for a second TB (e.g., a second data packet). SCI of an initial transmission (e.g., a first transmission) and/or retransmission of the first TB may comprise one or more first parameters (e.g., Frequency resource assignment and Time resource assignment) indicating one or more first time and frequency (T/F) resources for transmission and/or retransmission of the first TB. The SCI may further comprise one or more second parameters (e.g., Resource reservation period) indicating a reservation period/interval of one or more second T/F resources for initial transmission and/or retransmission of the second TB.

In an example, in response to triggering a resource selection procedure, a wireless device may select one or more first T/F resources for initial transmission and/or retransmission of a first TB. As shown in FIG. 20, the wireless device may select three resources for transmitting the first TB. The wireless device may transmit an initial transmission (initial Tx of a first TB in FIG. 20) of the first TB via a first resource of the three resources. The wireless device may transmit a first retransmission (1$^{st}$ re-Tx in FIG. 20) of the first TB via a second resource of the three resources. The wireless device may transmit a second retransmission (2$^{nd}$ re-Tx in FIG. 20) of the first TB via a third resource of the three resources. A time duration between a starting time of the initial transmission of the first TB and the second retransmission of the first TB may be smaller than or equal to 32 sidelink slots (e.g., T≤32 slots in FIG. 20). A first SCI may associate with the initial transmission of the first TB. The first SCI may indicate a first T/F resource indication for the initial transmission of the first TB, the first retransmission of the first TB and the second retransmission of the first TB. The first SCI may further indicate a reservation period/interval of resource reservation for a second TB. A second SCI may associate with the first retransmission of the first TB. The second SCI may indicate a second T/F resource indication for the first retransmission of the first TB and the second retransmission of the first TB. The second SCI may further indicate the reservation period/interval of resource reservation for the second TB. A third SCI may associate with the second retransmission of the first TB. The third SCI may indicate a third T/F resource indication for the second retransmission of the first TB. The third SCI may further indicate the reservation period/interval of resource reservation for the second TB.

FIG. 21 and FIG. 22 illustrate examples of configuration information for sidelink communication. In an example, a base station may transmit one or more radio resource control (RRC) messages to a wireless device for delivering the configuration information for the sidelink communication.

The configuration information may comprise a field of sl-UE-SelectedConfigRP. A parameter sl-ThresPSSCH-RSRP-List in the field may indicate a list of 64 thresholds. In an example, a wireless device may receive first sidelink control information (SCI) indicating a first priority. The wireless device may have second SCI to be transmitted. The second SCI may indicate a second priority. The wireless device may select a threshold from the list based on the first priority in the first SCI and the second priority in the second SCI. Referring to second exclusion in FIG. 26, the wireless device may exclude resources from candidate resource set based on the threshold. A parameter sl-MaxNumPerReserve in the field may indicate a maximum number of reserved PSCCH/PSSCH resources indicated in an SCI. A parameter sl-MultiReserveResource in the field may indicate if it is allowed to reserve a sidelink resource for an initial transmission of a TB by an SCI associated with a different TB, based on sensing and resource selection procedure. A parameter sl-ResourceReservePeriodList may indicate a set of possible resource reservation periods/intervals (e.g., SL-ResourceReservedPeriod) allowed in a resource pool. Up to 16 values may be configured per resource pool. A parameter sl-RS-ForSensing may indicate whether DMRS of PSCCH or PSSCH is used for layer 1 (e.g., physical layer) RSRP measurement in sensing operation. A parameter sl-Sensing-Window may indicate a start of a sensing window. A parameter sl-SelectionWindowList may indicate an end of a selection window in resource selection procedure for a TB with respect to priority indicated in SCI. Value n1 may correspond to 1*2μ, value n5 corresponds to 5*2μ, and so on, where μ=0, 1, 2, 3 for subcarrier spacing (SCS) of 15, 30, 60, and 120 KHz respectively. A parameter SL-Selection-WindowConfig may indicate a mapping between a sidelink priority (e.g., sl-Priority) and the end of the selection window (e.g., sl-SelectionWindow).

The configuration information may comprise a parameter sl-PreemptionEnable indicating whether sidelink pre-emption is disabled or enabled in a resource pool. For example, a priority level p_preemption may be configured if the sidelink pre-emption is enabled. For example, if the sidelink pre-emption is enabled but the p_preemption is not configured, the sidelink pre-emption may be applicable to all priority levels.

The configuration information may comprise a parameter sl-TxPercentageList indicating a portion of candidate single-slot PSSCH resources over total resources. For example, value p20 may correspond to 20%, and so on. A parameter SL-TxPercentageConfig may indicate a mapping between a sidelink priority (e.g., sl-Priority) and the portion of candidate single-slot PSSCH resources over total resources (e.g., sl-TxPercentage).

Figure 23:
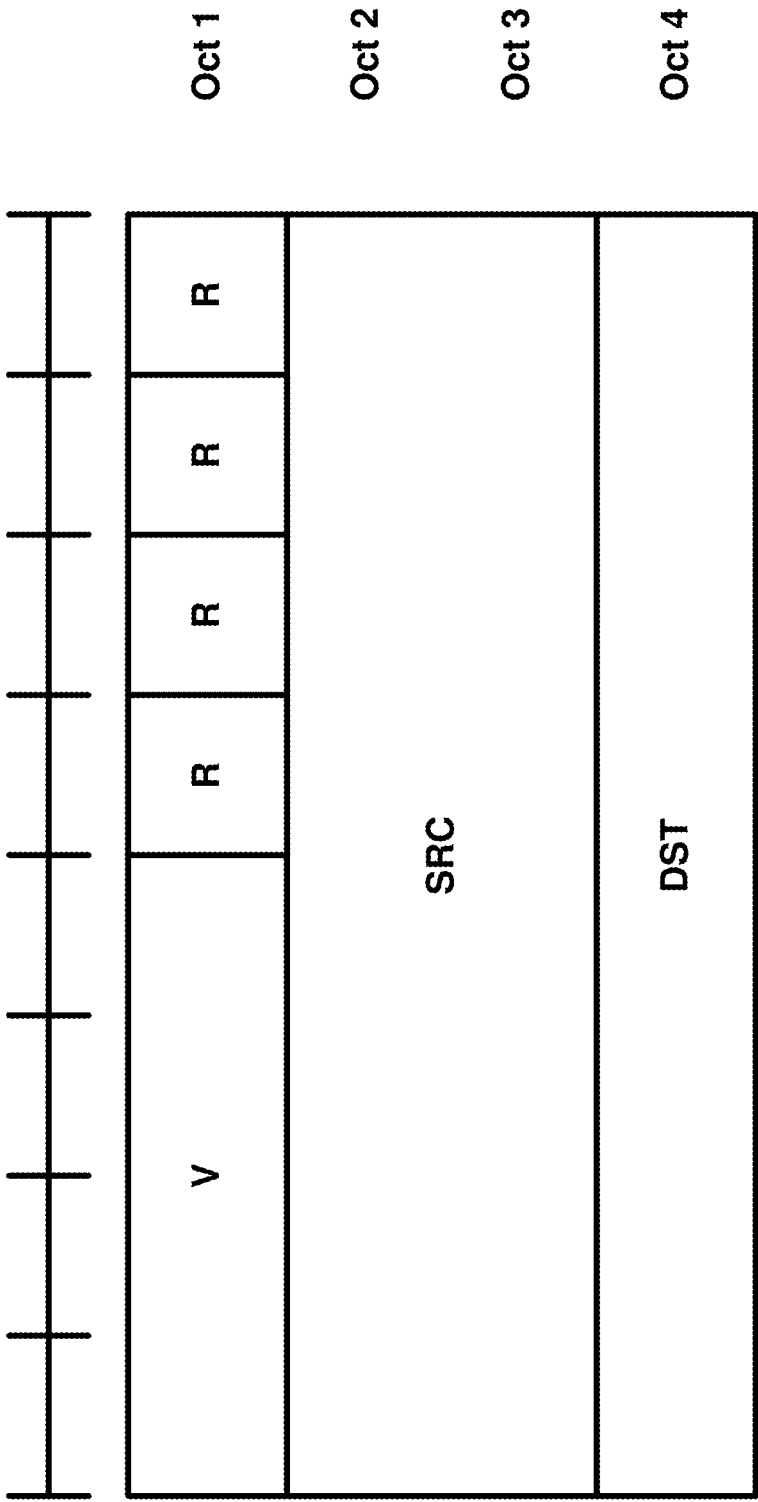
FIG. 23 illustrates an example format of a MAC subheader for sidelink shared channel (SL-SCH) an aspect of an example embodiment of the present disclosure.

FIG. 23 illustrates an example format of a MAC subheader for sidelink shared channel (SL-SCH). The MAC subheader for SL-SCH may comprise seven header fields V/R/R/R/R/SCR/DST. The MAC subheader is octet aligned. For example, the V field may be a MAC protocol date units (PDU) format version number field indicating which version of the SL-SCH subheader is used. For example, the SRC field may carry 16 bits of a Source Layer-2 identifier (ID) field set to a first identifier provided by upper layers. For example, the DST field may carry 8 bits of the Destination Layer-2 ID set to a second identifier provided by upper layers. In an example, if the V field is set to "1", the second identifier may be a unicast identifier. In an example, if the V field is set to "2", the second identifier may be a groupcast identifier. In an example, if the V field is set to "3", the second identifier may be a broadcast identifier. For example, the R field may indicate reserved bit.

Figure 24:
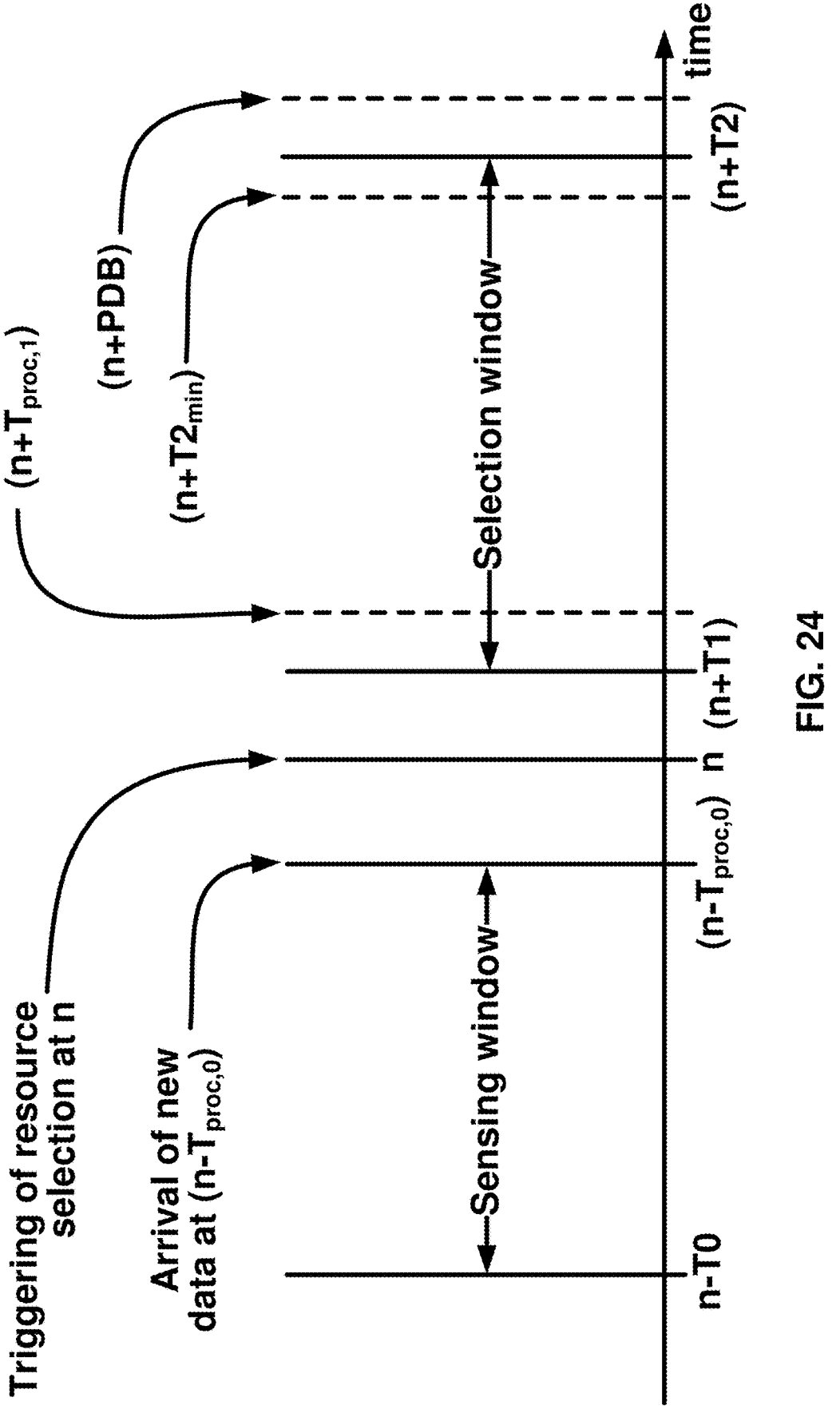
FIG. 24 illustrates an example time of a resource selection procedure as per an aspect of an example embodiment of the present disclosure.

FIG. 24 illustrates an example time of a resource selection procedure. A wireless device may perform the resource selection procedure to select resources for one or more sidelink transmissions. As shown in FIG. 24, a sensing window of the resource selection procedure may start at time $(n-T0)$ (e.g., parameter sl-SensingWindow). The sensing window may end at time $(n-T_{proc,0})$. New data of the one or more sidelink transmissions may arrive at the wireless device at time $(n-T_{proc,0})$. The time period $T_{proc,0}$ may be a processing delay of the wireless device to determine to trigger the resource selection procedure. The wireless device may determine to trigger the resource selection procedure at time n to select the resources for the new data arrived at time $(n-T_{proc,0})$. The wireless device may complete the resource selection procedure at time $(n+T1)$. The wireless device may determine the parameter T1 based on a capability of the wireless device. The capability of the wireless device may be a processing delay of a processor of the wireless device. A selection window of the resource selection procedure may start at time $(n+T1)$. The selection window may end at time $(n+T2)$ indicating the ending of the selection window. The wireless device may determine the parameter T2 based on a parameter T2 min (e.g., sl-SelectionWindow). In an example, the wireless device may determine the parameter T2 subject to T2 min≤T2≤PDB, where the PDB (packet delay budget) may be the maximum allowable delay (e.g., a delay budget) for successfully transmitting the new data via the one or more sidelink transmissions. The wireless device may determine the parameter T2 min to a corresponding value for a priority of the one or more sidelink transmissions (e.g., based on a parameter SL-SelectionWindowConfig indicating a mapping between a sidelink priority sl-Priority and the end of the selection window sl-SelectionWindow). In an example, the wireless device may set the parameter T2=PDB if the parameter T2 min>PDB.

Figure 25:
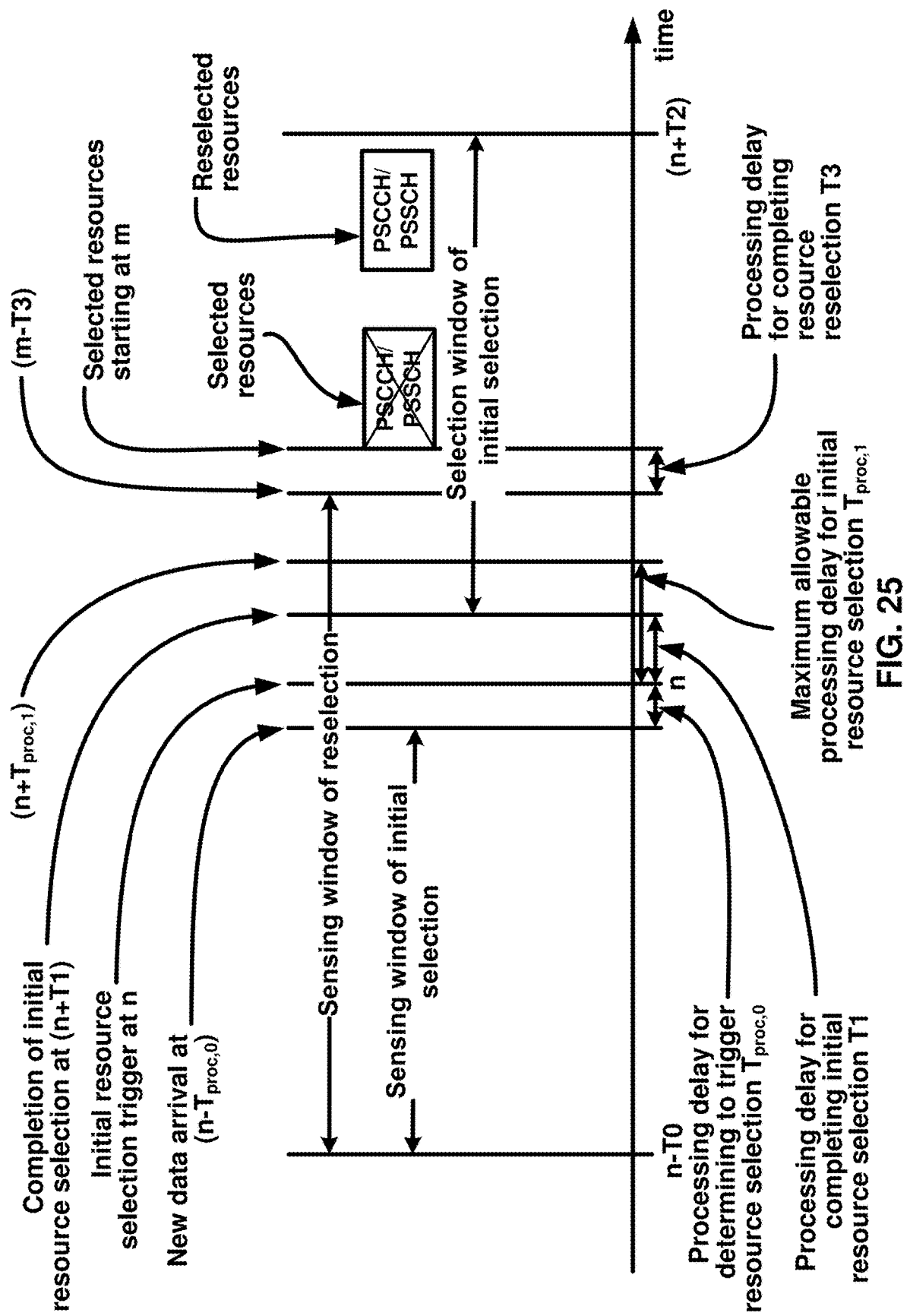
FIG. 25 illustrates an example timing of a resource selection procedure as per an aspect of an example embodiment of the present disclosure.

FIG. 25 illustrates an example timing of a resource selection procedure. A wireless device may perform the resource selection procedure for selecting resources for one or more sidelink transmissions. Referring to FIG. 24, a sensing window of initial selection may start at time $(n-T0)$. The sensing window of initial selection may end at time $(n-T_{proc,0})$. New data of the one or more sidelink transmissions may arrive at the wireless device at the time $(n-T_{proc,0})$. The time period $T_{proc,0}$ may be a processing delay for the wireless device to determine to trigger the initial selection of the resources. The wireless device may determine to trigger the initial selection at time n for selecting the resources for the new data arrived at the time $(n-T_{proc,0})$. The wireless device may complete the resource selection procedure at time $(n+T1)$. The time $(n+T_{proc,1})$ may be the maximum allowable processing latency for completing the resource selection procedure being triggered at the time n, where $0<T1≤T_{proc,1}$. A selection window of initial selection may start at time $(n+T1)$. The selection window of initial selection may end at time $(n+T2)$. The parameter T2 may be configured, preconfigured, or determined at the wireless device.

The wireless device may determine first resources (e.g., selected resources in FIG. 25) for the one or more sidelink transmissions based on the completion of the resource selection procedure at the time $(n+T1)$. The wireless device may select the first resources from candidate resources in the selection window of initial selection based on measurements in the sensing window for initial selection. The wireless device may determine a resource collision between the first resources and other resources reserved by another wireless device. The wireless device may determine to drop the first resources for avoiding interference. The wireless device may trigger a resource reselection procedure (e.g., a second resource selection procedure) at time $(m-T3)$ and/or before time $(m-T3)$. The time period T3 may be a processing delay for the wireless device to complete the resource reselection procedure (e.g., a second resource selection procedure). The wireless device may determine second resources (e.g., reselected resource in FIG. 25) via the resource reselection procedure (e.g., a second resource selection procedure). The start time of the first resources may be time m (e.g., the first resources may be in slot m).

In an example, at least one of time parameters T0, $T_{proc,0}$, $T_{proc,1}$, T2, and PDB may be configured by a base station to the wireless device. In an example, the at least one of the time parameters T0, $T_{proc,0}$, $T_{proc,1}$, T2, and PDB may be preconfigured to the wireless device. The at least one of the time parameters T0, $T_{proc,0}$, $T_{proc,1}$, T2, and PDB may be stored in a memory of the wireless device. In an example, the memory may be a Subscriber Identity Module (SIM) card. In an example of FIG. 24 and FIG. 25, the time n, m, T0, T1, $T_{proc,0}$, $T_{proc,1}$, T2, T2 min, T3, and PDB may be in terms of slots and/or slot index.

Figure 26:
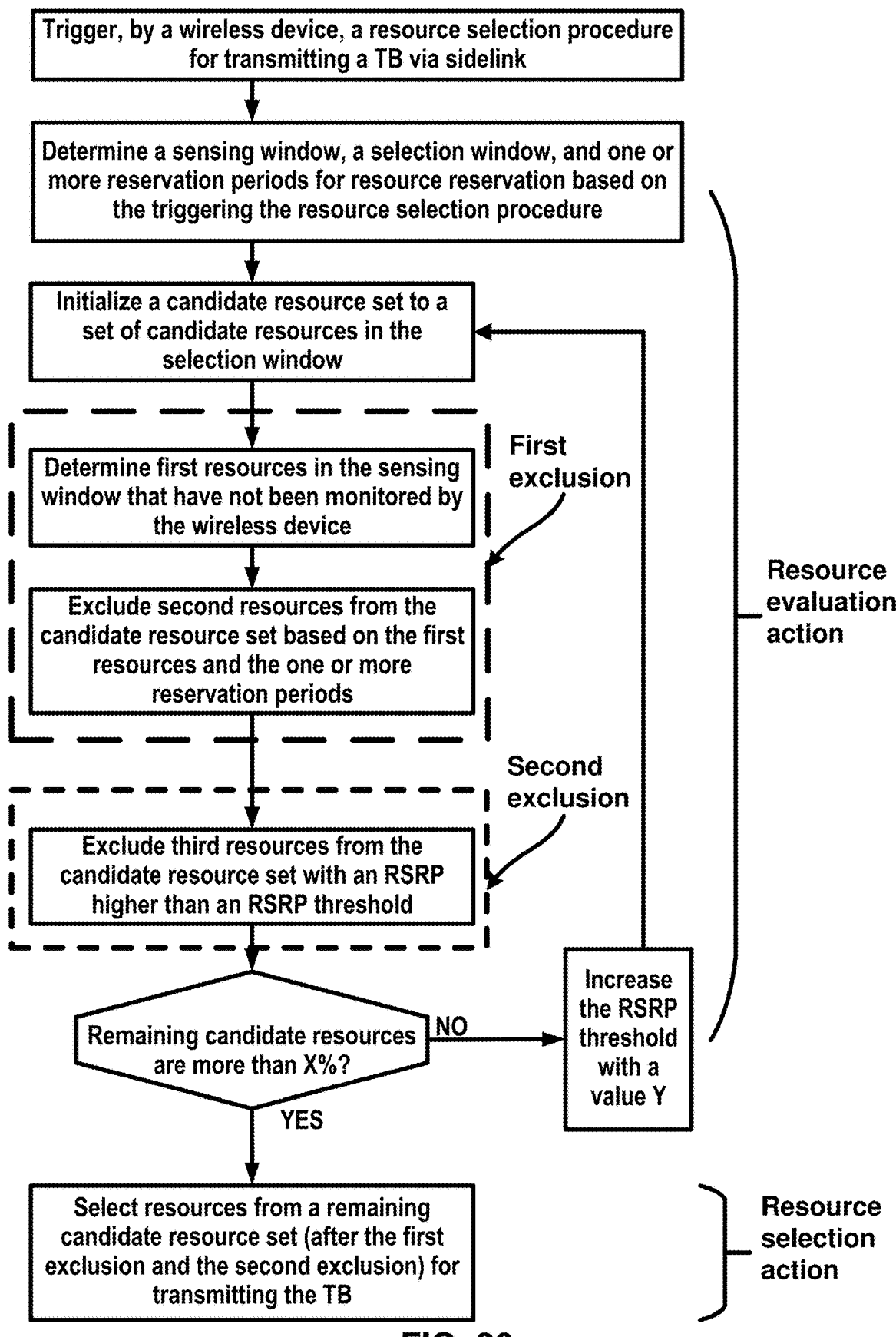
FIG. 26 illustrates an example flowchart of a resource selection procedure by a wireless device for transmitting a TB via sidelink as per an aspect of an example embodiment of the present disclosure.

FIG. 26 illustrates an example flowchart of a resource selection procedure by a wireless device for transmitting a TB (e.g., a data packet) via sidelink.

Figure 27:
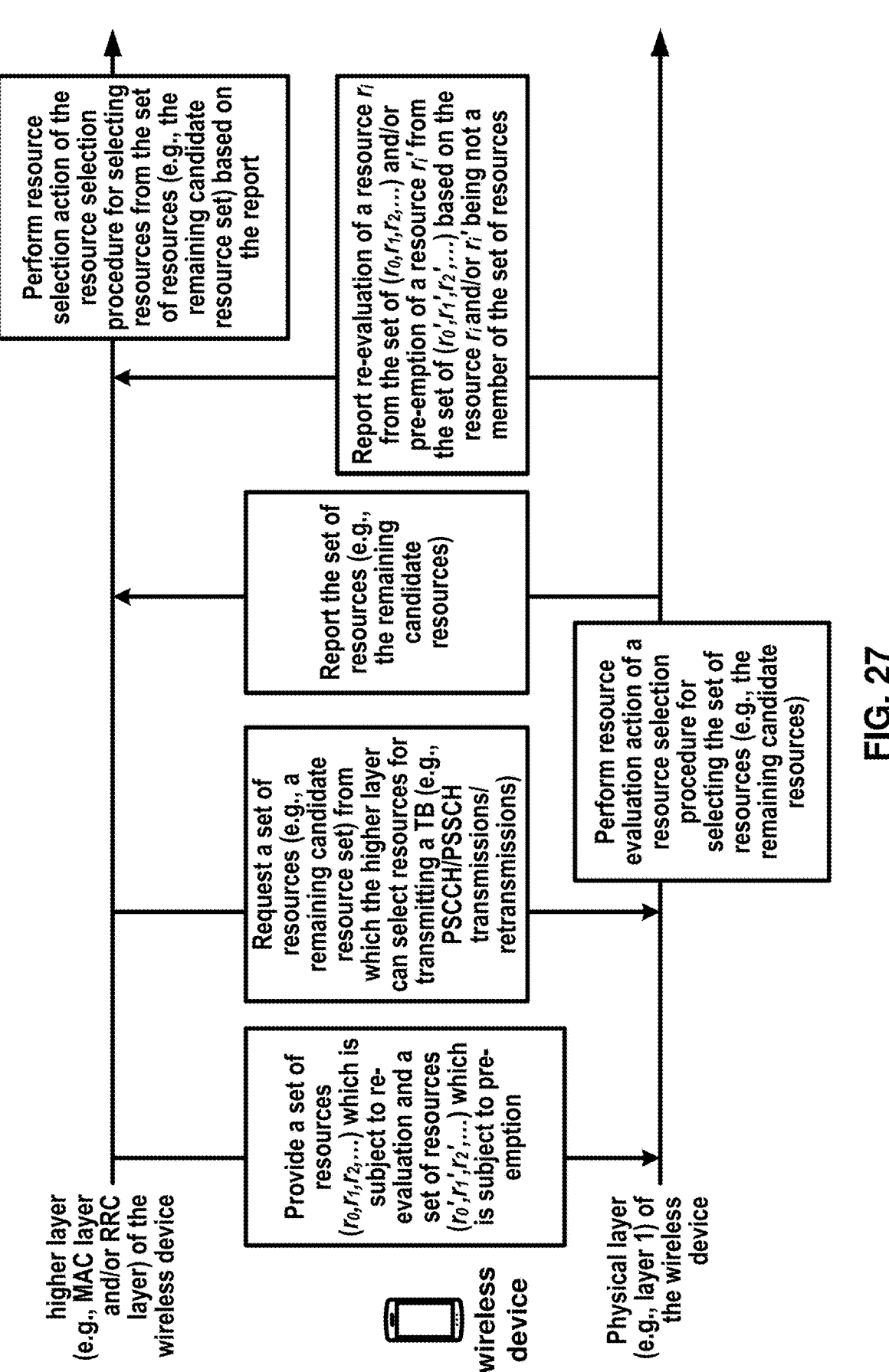
FIG. 27 illustrates an example diagram of the resource selection procedure among layers of the wireless device as per an aspect of an example embodiment of the present disclosure.

FIG. 27 illustrates an example diagram of the resource selection procedure among layers of the wireless device.

Referring to FIG. 26 and FIG. 27, the wireless device may transmit one or more sidelink transmissions (e.g., a first transmission of the TB and one or more retransmissions of the TB) for the transmitting of the TB. Referring to FIG. 19, a sidelink transmission of the one or more sidelink transmission may comprise a PSCCH. The sidelink transmission may comprise a PSSCH. The sidelink transmission may comprise a PSFCH. The wireless device may trigger the resource selection procedure for the transmitting of the TB. The resource selection procedure may comprise two actions. The first action of the two actions may be a resource evaluation action. Physical layer (e.g., layer 1) of the wireless device may perform the first action. The physical layer may determine a subset of resources based on the first action and report the subset of resources to higher layer (e.g., RRC layer and/or MAC layer) of the wireless device. The second action of the two actions may be a resource selection action. The higher layer (e.g., RRC layer and/or MAC layer) of the wireless device may perform the second action based on the reported the subset of resources from the physical layer.

In an example, higher layer (e.g., RRC layer and/or MAC layer) of a wireless device may trigger a resource selection procedure for requesting the wireless device to determine a subset of resources. The higher layer may select resources from the subset of resources for PSSCH and/or PSCCH transmission. To trigger the resource selection procedure, e.g., in slot n, the higher layer may provide the following parameters for the PSSCH and/or PSCCH transmission:

a resource pool, from which the wireless device may determine the subset of resources;
  layer 1 priority, $prio_{TX}$ (e.g., sl-Priority referring to FIG. 21 and FIG. 22), of the PSSCH/PSCCH transmission;
  remaining packet delay budget (PDB) of the PSSCH and/or PSCCH transmission;
  a number of sub-channels, $L_{subCH}$, for the PSSCH and/or PSCCH transmission in a slot;
  a resource reservation period/interval, $P_{rsvp\_TX}$, in units of millisecond (ms).

In an example, if the higher layer requests the wireless device to determine a subset of resources from which the higher layer will select the resources for the PSSCH and/or PSCCH transmission for re-evaluation and/or pre-emption, the higher layer may provide a set of resources ($r_0$, $r_1$, $r_2$, . . . ) which may be subject to the re-evaluation and a set of resources ($r_0'$, $r_1'$, $r_2'$, . . . ) which may be subject to the pre-emption.

In an example, a base station (e.g., network) may transmit a message comprising one or more parameters to the wireless device for performing the resource selection procedure. The message may be an RRC/SIB message, a MAC CE, and/or a DCI. In an example, a second wireless device may transmit a message comprising one or more parameters to the wireless device for performing the resource selection procedure. The message may be an RRC message, a MAC CE, and/or a SCI. The one or more parameters may indicate following information.

sl-SelectionWindowList (e.g., sl-SelectionWindow referring to FIG. 21 and FIG. 22): an internal parameter T2 min (e.g., T2 min referring to FIG. 24) may be set to a corresponding value from the parameter sl-SelectionWindowList for a given value of $prio_{TX}$ (e.g., based on SL-SelectionWindowConfig referring to FIG. 21 and FIG. 22).

sl-ThresPSSCH-RSRP-List (e.g., sl-ThresPSSCH-RSRP-List referring to FIG. 21 and FIG. 22): a parameter may indicate an RSRP threshold for each combination ($p_i$, $p_j$), where $p_i$ is a value of a priority field in a received SCI format 1-A and $p_j$ is a priority of a sidelink transmission (e.g., the PSSCH/PSCCH transmission) of the wireless device; In an example of the resource selection procedure, an invocation of $p_j$ may be $p_j=prio_{TX}$.

sl-RS-ForSensing (e.g., sl-RS-ForSensing referring to FIG. 21 and FIG. 22): a parameter may indicate whether DMRS of a PSCCH or a PSSCH is used, by the wireless device, for layer 1 (e.g., physical layer) RSRP measurement in sensing operation.

sl-ResourceReservePeriodList (e.g., sl-ResourceReservePeriodList referring to FIG. 21 and FIG. 22)

sl-SensingWindow (e.g., sl-SensingWindow referring to FIG. 21 and FIG. 22): an internal parameter $T_0$ may be defined as a number of slots corresponding to t0_SensingWindow ms.

sl-TxPercentageList (e.g., based on SL-TxPercentageConfig referring to FIG. 21 and FIG. 22): an internal parameter X (e.g., sl-TxPercentage referring to FIG. 21 and FIG. 22) for a given $prio_{TX}$ (e.g., sl-Priority referring to FIG. 21 and FIG. 22) may be defined as sl-xPercentage ($prio_{TX}$) converted from percentage to ratio.

sl-PreemptionEnable (e.g., p_preemption referring to FIG. 21 and FIG. 22): an internal parameter $prio_{pre}$ may be set to a higher layer provided parameter sl-PreemptionEnable.

The resource reservation period/interval, $P_{rsvp\_TX}$, if provided, may be converted from units of ms to units of logical slots, resulting in $P_{rsvp\_TX}'$.

Notation:

$$\left(t_0^{SL}, t_1^{SL}, t_2^{SL}, \ldots\right)$$

may denote a set of slots of a sidelink resource pool.

In the resource evaluation action (e.g., the first action in FIG. 26), the wireless device may determine a sensing window (e.g., the sensing window shown in FIG. 24 and FIG. 25 based on sl-SensingWindow) based on the triggering the resource selection procedure. The wireless device may determine a selection window (e.g., the selection window shown in FIG. 24 and FIG. 25 based on sl-SelectionWindowList) based on the triggering the resource selection procedure. The wireless device may determine one or more reservation periods/intervals (e.g., parameter sl-ResourceReservePeriodList) for resource reservation. In an example, a candidate single-slot resource for transmission $R_{x,y}$ may be defined as a set of $L_{subCH}$ contiguous sub-channels with sub-channel x+j in slot $$t_y^{SL}$$

where j=0, . . . , $L_{subCH}-1$. The wireless device may assume that a set of $L_{subCH}$ contiguous sub-channels in the resource pool within a time interval [n+$T_1$, n+$T_2$] correspond to one candidate single-slot resource (e.g., referring to FIG. 24 and FIG. 25). A total number of candidate single-slot resources may be denoted by $M_{total}$. In an example, referring to FIG. 24 and FIG. 25, the sensing window may be defined by a number of slots in a time duration of [n–$T_0$, n–$T_{proc,0}$). The wireless device may monitor a first subset of the slots, of a sidelink resource pool, within the sensing window. The wireless device may not monitor a second subset of the slots than the first subset of the slots due to half duplex. The wireless device may perform the following actions based on PSCCH decoded and RSRP measured in the first subset of the slots. In an example, an internal parameter Th($p_i$, $p_j$) may be set to the corresponding value of RSRP threshold indicated by the i-th field in sl-ThresPSSCH-RSRP-List, where i=$p_i$+ ($p_j$–1)*8.

Referring to FIG. 26 and FIG. 27, in the resource evaluation action (e.g., the first action in FIG. 26), the wireless device may initialize a candidate resource set (e.g., a set $S_A$) to be a set of candidate resources. In an example, the candidate resource set may be the union of candidate resources within the selection window. In an example, a candidate resource may be a candidate single-subframe resource. In an example, a candidate resource may be a candidate single-slot resource. In an example, the set $S_A$ may be initialized to a set of all candidate single-slot resources.

Referring to FIG. 26 and FIG. 27, in the resource evaluation action (e.g., the first action in FIG. 26), the wireless device may perform a first exclusion for excluding second resources from the candidate resource set based on first resources and one or more reservation periods/intervals. In an example, the wireless device may not monitor the first resources within a sensing window. In an example, the one or more reservation periods/intervals may be configured/associated with a resource pool of the second resources. In an example, the wireless device may determine the second resources within a selection window which might be reserved by a transmission transmitted via the first resources based on the one or more reservation periods/intervals. In an example, the wireless device may exclude a candidate single-slot resource $R_{x,y}$ from the set $S_A$ based on following conditions:

the wireless device has not monitored slot $$t_m^{SL}$$

in the sensing window.

for any periodicity value allowed by the parameter sl-ResourceReservePeriodList and a hypothetical SCI format 1-A received in the slot $$t_m^{SL}$$

with "Resource reservation period" field set to that periodicity value and indicating all sub-channels of the resource pool in this slot, condition c of a second exclusion would be met.

Referring to FIG. 26 and FIG. 27, in the resource evaluation action (e.g., the first action in FIG. 26), the wireless device may perform a second exclusion for excluding third resources from the candidate resource set. In an example, a SCI may indicate a resource reservation of the third resources. The SCI may further indicate a priority value (e.g., indicated by a higher layer parameter sl-Priority). The wireless device may exclude the third resources from the candidate resource set based on a reference signal received power (RSRP) of the third resources being higher than an RSRP threshold (e.g., indicated by a higher layer parameter sl-ThresPSSCH-RSRP-List). The RSRP threshold may be related to the priority value based on a mapping list of RSRP thresholds to priority values configured and/or pre-configured to the wireless device. In an example, a base station may transmit a message to the wireless device for configuring the mapping list. The message may be a radio resource control (RRC) message. In an example, the mapping list may be pre-configured to the wireless device. A memory of the wireless device may store the mapping list. In an example, a priority indicated by the priority value may be a layer 1 priority (e.g., physical layer priority). In an example, a bigger priority value may indicate a higher priority of a sidelink transmission. A smaller priority value may indicate a lower priority of the sidelink transmission. In another example, a bigger priority value may indicate a lower priority of a sidelink transmission. A smaller priority value may indicate a higher priority of the sidelink transmission. In an example, the wireless device may exclude a candidate single-slot resource $R_{x,y}$ from the set $S_A$ based on following conditions:

a) the wireless device receives an SCI format 1-A in slot $$t_m^{SL},$$

and "Resource reservation period" field, if present, and "Priority" field in the received SCI format 1-A indicate the values $P_{rsvp\_RX}$ and $prio_{RX}$;

b) the RSRP measurement performed, for the received SCI format 1-A, is higher than Th ($prio_{RX}$, $prio_{TX}$);

c) the SCI format received in slot $$t_m^{SL}$$

or the same SCI format which, if and only if the "Resource reservation period" field is present in the received SCI format 1-A, is assumed to be received in slot(s)

$$t_{m+q \times P'_{rsvp\_RX}}^{SL}$$

determines the set of resource blocks and slots which overlaps with $R_{x,y+j \times P_{rsvp\_TX}}$, for q=1, 2, . . . , Q and j=0, 1, . . . , $C_{resel}$−1. Here, $P'_{rsvp\_RX}$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal} \text{ and } n' - m \le P'_{rsvp\_RX}$$

where $$t_{n'}^{SL} = n$$

if slot n belongs to the set $$\left( t_0^{SL}, t_1^{SL}, \ldots, t_{T_{max}}^{SL} \right),$$

otherwise slot $$t_{n'}^{SL}$$

is the first slot after slot n belonging to the set $$\left( t_0^{SL}, t_1^{SL}, \ldots, t_{T_{max}}^{SL} \right);$$

otherwise Q=1. $T_{scal}$ is set to selection window size T2 converted to units of ms.

Referring to FIG. 26 and FIG. 27, in the resource evaluation action (e.g., the first action in FIG. 26), the wireless device may determine whether remaining candidate resources in the candidate resource set are sufficient for selecting resources for the one or more sidelink transmissions of the TB based on a condition, after performing the first exclusion and the second exclusion. In an example, the condition may be the total amount of the remaining candidate resources in the candidate resource set being more than X percent (e.g., indicated by a higher layer parameter sl-TxPercentageList) of the candidate resources in the candidate resource set before performing the first exclusion and the second exclusion. If the condition is not met, the wireless device may increase the RSRP threshold used to exclude the third resources with a value Y and iteratively re-perform the initialization, first exclusion, and second exclusion until the condition being met. In an example, if the number of remaining candidate single-slot resources in the set $S_A$ is smaller than X·$M_{total}$, then Th ($p_i$, $p_j$) may be increased by 3 dB and the procedure continues with re-performing of the initialization, first exclusion, and second exclusion until the condition being met. In an example, the wireless device may report the set $S_A$ (e.g., the remaining candidate resources of the candidate resource set) to the higher layer of the wireless device. In an example, the wireless device may report the set $S_A$ (e.g., the remaining candidate resources of the candidate resource set when the condition is met) to the higher layer of the wireless device, based on that the number of remaining candidate single-slot resources in the set $S_A$ being greater than or equal to $X \cdot M_{total}$.

Referring to FIG. 26 and FIG. 27, in the resource selection action (e.g., the second action in FIG. 26), the wireless device (e.g., the higher layer of the wireless device) may select fourth resources from the remaining candidate resources of the candidate resource set (e.g., the set $S_A$ reported by the physical layer) for the one or more sidelink transmissions of the TB. In an example, the wireless device may randomly select the fourth resources from the remaining candidate resources of the candidate resource set.

Referring to FIG. 26 and FIG. 27, in an example, if a resource $r_i$ from the set $(r_0, r_1, r_2, \dots)$ is not a member of $S_A$ (e.g., the remaining candidate resources of the candidate resource set when the condition is met), the wireless device may report re-evaluation of the resource $r_i$ to the higher layers.

Referring to FIG. 26 and FIG. 27, in an example, if a resource $r_i'$ from the set $(r_0', r_1', r_2', \dots)$ meets the conditions below, then the wireless device may report pre-emption of the resource $r_i'$ to the higher layers.

$r_i'$ is not a member of $S_A$, and $r_i'$ meets the conditions for the second exclusion, with Th $(prio_{RX}, prio_{TX})$ set to a final threshold for reaching $X \cdot M_{total}$, and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} \leq prio_{pre}$ and $prio_{TX} > prio_{RX}$ In an example, if the resource $r_i$ is indicated for re-evaluation by the wireless device (e.g., the physical layer of the wireless device), the higher layer of the wireless device may remove the resource $r_i$ from the set $(r_0, r_1, r_2, \dots)$. In an example, if the resource $r_i'$ is indicated for pre-emption by the wireless device (e.g., the physical layer of the wireless device), the higher layer of the wireless device may remove the resource $r_i'$ from the set $(r_0', r_1', r_2', \dots)$. The higher layer of the wireless device may randomly select new time and frequency resources from the remaining candidate resources of the candidate resource set (e.g., the set $S_A$ reported by the physical layer) for the removed resources $r_i$ and/or $r_i'$. The higher layer of the wireless device may replace the removed resources $r_i$ and/or $r_i'$ by the new time and frequency resources. For example, the wireless device may remove the resources $r_i$ and/or $r_i'$ from the set $(r_0, r_1, r_2, \dots)$ and/or the set $(r_0', r_1', r_2', \dots)$ and add the new time and frequency resources to the set $(r_0, r_1, r_2, \dots)$ and/or the set $(r_0', r_1', r_2', \dots)$ based on the removing of the resources $r_i$ and/or $r_i'$.

Sidelink pre-emption may happen between a first wireless device and a second wireless device. The first wireless device may select first resources for a first sidelink transmission. The first sidelink transmission may have a first priority. The second wireless device may select second resources for a second sidelink transmission. The second sidelink transmission may have a second priority. The first resources may partially and/or fully overlap with the second resources. The first wireless device may determine a resource collision between the first resources and the second resources based on that the first resources and the second resources being partially and/or fully overlapped. The resource collision may imply fully and/or partially overlapping between the first resources and the second resources in time, frequency, code, power, and/or spatial domain. Referring to an example of FIG. 18, the first resources may comprise one or more first sidelink resource units in a sidelink resource pool. The second resources may comprise one or more second sidelink resource units in the sidelink resource pool. A partial resource collision between the first resources and the second resources may indicate that the at least one sidelink resource unit of the one or more first sidelink resource units belongs to the one or more second sidelink resource units. A full resource collision between the first resources and the second resources may indicate that the one or more first sidelink resource units may be the same as or a subset of the one or more second sidelink resource units. In an example, a bigger priority value may indicate a lower priority of a sidelink transmission. A smaller priority value may indicate a higher priority of the sidelink transmission. In an example, the first wireless device may determine the sidelink pre-emption based on the resource collision and the second priority being higher than the first priority. That is, the first wireless device may determine the sidelink pre-emption based on the resource collision and a value of the second priority being smaller than a value of the first priority. In another example, the first wireless device may determine the sidelink pre-emption based on the resource collision, the value of the second priority being smaller than a priority threshold, and the value of the second priority being smaller than the value of the first priority.

Referring to FIG. 25, a first wireless device may trigger a first resource selection procedure for selecting first resources (e.g., selected resources after resource selection with collision in FIG. 25) for a first sidelink transmission. A second wireless device may transmit an SCI indicating resource reservation of the first resource for a second sidelink transmission. The first wireless device may determine a resource collision on the first resources between the first sidelink transmission and the second sidelink transmission. The first wireless device may trigger a resource re-evaluation (e.g., a resource evaluation action of a second resource selection procedure) at and/or before time (m–T3) based on the resource collision. The first wireless device may trigger a resource reselection (e.g., a resource selection action of the second resource selection procedure) for selecting second resources (e.g., reselected resources after resource reselection in FIG. 25) based on the resource re-evaluation. The start time of the second resources may be time m.

A UE may receive one or more messages (e.g., RRC messages and/or SIB messages) comprising configuration parameters of a sidelink BWP. The configuration parameters may comprise a first parameter (e.g., sl-StartSymbol) indicating a sidelink starting symbol. The first parameter may indicate a starting symbol (e.g., symbol #0, symbol #1, symbol #2, symbol #3, symbol #4, symbol #5, symbol #6, symbol #7, etc.) used for sidelink in a slot. For example, the slot may not comprise a SL-SSB (S-SSB). In an example, the UE may be (pre-)configured with one or more values of the sidelink starting symbol per sidelink BWP. The configuration parameters may comprise a second parameter (e.g., sl-LengthSymbols) indicating number of symbols (e.g., 7 symbols, 8 symbols, 9 symbols, 10 symbols, 11 symbols, 12 symbols, 13 symbols, 14 symbols, etc.) used sidelink in a slot. For example, the slot may not comprise a SL-SSB (S-SSB). In an example, the UE may be (pre-)configured with one or more values of the sidelink number of symbols (symbol length) per sidelink BWP.

The configuration parameters of the sidelink BWP may indicate one or more sidelink (communication) resource pools of the sidelink BWP (e.g., via SL-BWP-PoolConfig and/or SL-BWP-PoolConfigCommon). A resource pool may be a sidelink receiving resource pool (e.g., indicated by sl-RxPool) on the configured sidelink BWP. For example, the receiving resource pool may be used for PSFCH transmission/reception, if configured. A resource pool may be a sidelink transmission resource pool (e.g., indicated by sl-TxPool, and/or sl-ResourcePool) on the configured sidelink BWP. For example, the transmission resource pool may comprise resources by which the UE is allowed to transmit NR sidelink communication (e.g., in exceptional conditions and/or based on network scheduling) on the configured BWP. For example, the transmission resource pool may be used for PSFCH transmission/reception, if configured.

Configuration parameters of a resource pool may indicate a size of a sub-channel of the resource pool (e.g., via sl-SubchannelSize) in unit of PRB. For example, the sub-channel size may indicate a minimum granularity in frequency domain for sensing and/or for PSSCH resource selection. Configuration parameters of a resource pool may indicate a lowest/starting RB index of a sub-channel with a lowest index in the resource pool with respect to lowest RB index RB index of the sidelink BWP (e.g., via sl-StartRB-Subchannel). Configuration parameters of a resource pool may indicate a number of sub-channels in the corresponding resource pool (e.g., via sl-NumSubchannel). For example, the sub-channels and/or the resource pool may consist of contiguous PRBs.

Configuration parameters of a resource pool may indicate configuration of one or more sidelink channels on/in the resource pool. For example, the configuration parameters may indicate that the resource pool is configured with PSSCH and/or PSCCH and/or PSFCH.

Configuration parameters of PSCCH may indicate a time resource for a PSCCH transmission in a slot. Configuration parameters of PSCCH (e.g., SL-PSCCH-Config) may indicate a number of symbols of PSCCH (e.g., 2 or 3) in the resource pool (e.g., via sl-TimeResourcePSCCH). Configuration parameters of PSCCH (e.g., SL-PSCCH-Config) may indicate a frequency resource for a PSCCH transmission in a corresponding resource pool (e.g., via sl-FreqResourceP-SCCH). For example, the configuration parameters may indicate a number of PRBs for PSCCH in a resource pool, which may not be greater than a number of PRBs of a sub-channel of the resource pool (sub-channel size).

Configuration parameters of PSSCH may indicate one or more DMRS time domain patterns (e.g., PSSCH DMRS symbols in a slot) for the PSSCH that may be used in the resource pool.

A resource pool may or may not be configured with PSFCH. Configuration parameters of PSFCH may indicate a period for the PSFCH in unit/number of slots within the resource pool (e.g., via sl-PSFCH-Period). For example, a value 0 of the period may indicate that no resource for PSFCH is configured in the resource pool and/or HARQ feedback for (all) transmissions in the resource pool is disabled. For example, the period may be 1 slot or 2 slots or 4 slots, etc. Configuration parameters of PSFCH may indicate a set of PRBs that are (actually) used for PSFCH transmission and reception (e.g., via sl-PSFCH-RB-Set). For example, a bitmap may indicate the set of PRBs, wherein a leftmost bit of the bitmap may refer to a lowest RB index in the resource pool, and so on. Configuration parameters of PSFCH may indicate a minimum time gap between PSFCH and the associated PSSCH in unit of slots (e.g., via sl-MinTimeGapPSFCH). Configuration parameters of PSFCH may indicate a number of PSFCH resources available for multiplexing HARQ-ACK information in a PSFCH transmission (e.g., via sl-PSFCH-CandidateResourceType).

A UE may be configured by higher layers (e.g., by RRC configuration parameters) with one or more sidelink resource pools. A sidelink resource pool may be for transmission of PSSCH and/or for reception of PSSCH. A sidelink resource pool may be associated with sidelink resource allocation mode 1 and/or sidelink resource allocation mode 2. In the frequency domain, a sidelink resource pool consists of one or more (e.g., sl-NumSubchannel) contiguous sub-channels. A sub-channel consists of one or more (e.g., sl-SubchannelSize) contiguous PRBs. For example, higher layer parameters (e.g., RRC configuration parameters) may indicate a number of sub-channels in a sidelink resource pool (e.g., sl-Num Subchannel) and/or a number of PRBs per sub-channel (e.g., si-SubchannelSize).

A set of slots that may belong to a sidelink resource pool. The set of slots may be denoted by $$\left(t_0^{SL}, t_1^{SL}, \ldots, t_{T_{max}-1}^{SL}\right)$$

where 0

$$\leq t_i^{SL} < 10240 \times 2^{\mu},\ 0 \leq i < T_{max}.$$

The slot index may be relative to slot #0 of the radio frame corresponding to SFN 0 of the serving cell or DFN 0. The set includes all the slots except $N_{S\_SSB}$ slots in which S-SS/PSBCH block (S-SSB) is configured. The set includes all the slots except $N_{nonSL}$ slots in each of which at least one of Y-th, (Y+1)-th, . . . , (Y+X−1)-th OFDM symbols are not semi-statically configured as UL as per the higher layer parameter (e.g., tdd-UL-DL-ConfigurationCommon-r16 of the serving cell if provided and/or sl-TDD-Configuration-r16 if provided and/or sl-TDD-Config-r16 of the received PSBCH if provided). For example, a higher layer (e.g., MAC or RRC) parameter may indicate a value of Y as the sidelink starting symbol of a slot (e.g., sl-StartSymbol). For example, a higher layer (e.g., MAC or RRC) parameter may indicate a value of X as the number of sidelink symbols in a slot (e.g., sl-LengthSymbols). The set includes all the slots except one or more reserved slots. The slots in the set may be arranged in increasing order of slot index. The UE may determine the set of slot assigned to a sidelink resource pool based on a bitmap ($b_0$, $b_1$, . . . , $b_{L_{bitmap}}$−1 associated with the resource pool where $L_{bitmap}$ the length of the bitmap is configured by higher layers. A slot $$t_k^{SL}\left(0 \leq k < 10240 \times 2^{\mu} - N_{S_{SSB}} - N_{nonSL} - N_{reserved}\right)$$

may belong to the set of slots if $b_{k'}$=1 where k'=k mod $L_{bitmap}$. The slots in the set are re-indexed such that the subscripts i of the remaining slots $$t_i^{\prime SL}$$

are successive {0, 1, . . . , $T'_{max}$−1} where $T'_{max}$ is the number of the slots remaining in the set.

The UE may determine the set of resource blocks assigned to a sidelink resource pool, wherein the resource pool consists of $N_{PRB}$ PRBs. The sub-channel m for m=0, 1, . . . , numSubchannel−1 consists of a set of $n_{subCHsize}$ contiguous resource blocks with the physical resource block number $N_{PRB}=n_{subCHRBstart}+m \cdot n_{subCHsize}+j$ for j=0, 1, . . . , $n_{subCHsize}-1$, where $n_{subCHRBstart}$ and $n_{subCHsize}$ are given by higher layer parameters sl-StartRB-Subchannel and sl-Sub-channelSize, respectively. A UE may not be expected to use the last $N_{PRB}$ mod $n_{subCHsize}$ PRBs in the resource pool.

A UE may be provided/configured with a number of symbols in a resource pool for PSCCH (e.g., by si-TimeResourcePSCCH). The PSCCH symbols may start from a second symbol that is available for sidelink transmissions in a slot. The UE may be provided/configured with a number of PRBs in the resource pool for PSCCH (e.g., by sl-FreqResourcePSCCH). The PSCCH PRBs may start from the lowest PRB of the lowest sub-channel of the associated PSSCH, e.g., for a PSCCH transmission with a SCI format 1-A. In an example, PSCCH resource/symbols may be configured in every slot of the resource pool. In an example, PSCCH resource/symbols may be configured in a subset of slot of the resource pool (e.g., based on a period comprising two or more slots).

In an example, each PSSCH transmission is associated with an PSCCH transmission. The PSCCH transmission may carry the 1$^{st}$ stage of the SCI associated with the PSSCH transmission. The 2$^{nd}$ stage of the associated SCI may be carried within the resource of the PSSCH. In an example, the UE transmits a first SCI (e.g., 1$^{st}$ stage SCI, SCI format 1-A) on PSCCH according to a PSCCH resource configuration in slot n and PSCCH resource m. For the associated PSSCH transmission in the same slot, the UE may transmit one transport block (TB) with up to two layers (e.g., one layer or two layers). The number of layers (0) may be determined according to the 'Number of DMRS port' field in the SCI. The UE may determine the set of consecutive symbols within the slot for transmission of the PSSCH. The UE may determine the set of contiguous resource blocks for transmission of the PSSCH. Transform precoding may not be supported for PSSCH transmission. For example, wideband precoding may be supported for PSSCH transmission.

The UE may set the contents of the second SCI (e.g., 2$^{nd}$ stage SCI, SCI format 2-A). The UE may set values of the SCI fields comprising the 'HARQ process number' field, the 'NDI' field, the 'Source ID' field, the 'Destination ID' field, the 'HARQ feedback enabled/disabled indicator' field, the 'Cast type indicator' field, and/or the 'CSI request' field, as indicated by higher (e.g., MAC and/or RRC) layers. The UE may set the contents of the second SCI (e.g., 2$^{nd}$ stage SCI, SCI format 2-B). The UE may set values of the SCI fields comprising the 'HARQ process number' field, the 'NDI' field, the 'Source ID' field, the 'Destination ID' field, the 'HARQ feedback enabled/disabled indicator' field, the 'Zone ID' field, and/or the 'Communication range requirement' field, as indicated by higher (e.g., MAC and/or RRC) layers.

In an example, one transmission scheme may be defined for the PSSCH and may be used for all PSSCH transmissions. PSSCH transmission may be performed with up to two antenna ports, e.g., with antenna ports 1000-1001.

In sidelink resource allocation mode 1, for PSSCH and/or PSCCH transmission, dynamic grant, configured grant type 1 and/or configured grant type 2 may be supported. The configured grant Type 2 sidelink transmission is semi-persistently scheduled by a SL grant in a valid activation DCI.

The UE may transmit the PSSCH in the same slot as the associated PSCCH. The (minimum) resource allocation unit in the time domain may be a slot. The UE may transmit the PSSCH in consecutive symbols within the slot. The UE may not transmit PSSCH in symbols which are not configured for sidelink. A symbol may be configured for sidelink, according to higher layer parameters indicating the starting sidelink symbol (e.g., startSLsymbols) and a number of consecutive sidelink symbols (e.g., lengthSLsymbols). For example, startSLsymbols is the symbol index of the first symbol of lengthSLsymbols consecutive symbols configured for sidelink. Within the slot, PSSCH resource allocation may start at symbol startSLsymbols+1 (e.g., second sidelink symbol of the slot). The UE may not transmit PSSCH in symbols which are configured for use by PSFCH, if PSFCH is configured in this slot. The UE may not transmit PSSCH in the last symbol configured for sidelink (e.g., last sidelink symbol of the slot). The UE may not transmit PSSCH in the symbol immediately preceding the symbols which are configured for use by PSFCH, if PSFCH is configured in this slot. FIG. 19 shows an example of sidelink symbols and the PSSCH resource allocation within the slot.

A Sidelink grant may be received dynamically on the PDCCH, and/or configured semi-persistently by RRC, and/or autonomously selected by the MAC entity of the UE. The MAC entity may have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant. The UE may be configured with Sidelink resource allocation mode 1. The UE may for each PDCCH occasion and for each grant received for this PDCCH occasion (e.g., for the SL-RNTI or SLCS-RNTI of the UE), use the sidelink grant to determine PSCCH duration(s) and/or PSSCH duration(s) for initial transmission and/or one or more retransmission of a MAC PDU for a corresponding sidelink process (e.g., associated with a HARQ buffer and/or a HARQ process ID).

The UE may be configured with Sidelink resource allocation mode 2 to transmit using pool(s) of resources in a carrier, based on sensing or random selection. The MAC entity for each Sidelink process may select to create a selected sidelink grant corresponding to transmissions of multiple MAC PDUs, and SL data may be available in a logical channel. The UE may select a resource pool, e.g., based on a parameter enabling/disabling sidelink HARQ feedback. The UE may perform the TX resource (re-)selection check on the selected pool of resources. The UE may select the time and frequency resources for one transmission opportunity from the resources pool and/or from the resources indicated by the physical layer, according to the amount of selected frequency resources and the remaining PDB of SL data available in the logical channel(s) allowed on the carrier. The UE may use the selected resource to select a set of periodic resources spaced by the resource reservation interval for transmissions of PSCCH and PSSCH corresponding to the number of transmission opportunities of MAC PDUs. The UE may consider the first set of transmission opportunities as the initial transmission opportunities and the other set(s) of transmission opportunities as the retransmission opportunities. The UE may consider the sets of initial transmission opportunities and retransmission opportunities as the selected sidelink grant. The UE may consider the set as the selected sidelink grant. The UE may use the selected sidelink grant to determine the set of PSCCH durations and the set of PSSCH durations.

The UE may for each PSSCH duration and/or for each sidelink grant occurring in this PSSCH duration, select a MCS table allowed in the pool of resource which is associated with the sidelink grant. The UE may determine/set the resource reservation interval to a selected value (e.g., 0 or more). In an example, if the configured sidelink grant has been activated and this PSSCH duration corresponds to the first PSSCH transmission opportunity within this period of the configured sidelink grant, the UE may set the HARQ Process ID to the HARQ Process ID associated with this PSSCH duration and, if available, all subsequent PSSCH duration(s) occurring in this period for the configured sidelink grant. The UE may flush the HARQ buffer of Sidelink process associated with the HARQ Process ID. The UE may deliver the sidelink grant, the selected MCS, and the associated HARQ information to the Sidelink HARQ Entity for this PSSCH duration.

The MAC entity may include at most one Sidelink HARQ entity for transmission on SL-SCH, which maintains a number of parallel Sidelink processes. The (maximum) number of transmitting Sidelink processes associated with the Sidelink HARQ Entity may be a value (e.g., 16). A sidelink process may be configured for transmissions of multiple MAC PDUs. For transmissions of multiple MAC PDUs with Sidelink resource allocation mode 2, the (maximum) number of transmitting Sidelink processes associated with the Sidelink HARQ Entity may be a second value (e.g., 4). A delivered sidelink grant and its associated Sidelink transmission information may be associated with a Sidelink process. Each Sidelink process may support one TB.

For each sidelink grant and for the associated Sidelink process, the Sidelink HARQ Entity may obtain the MAC PDU to transmit from the Multiplexing and assembly entity, if any. The UE may determine Sidelink transmission information of the TB for the source and destination pair of the MAC PDU. The UE may set the Source Layer-1 ID to the 8 LSB of the Source Layer-2 ID of the MAC PDU, and set the Destination Layer-1 ID to the 16 LSB of the Destination Layer-2 ID of the MAC PDU. The UE may set the following information of the TB: cast type indicator, HARQ feedback enabler/disabler, priority, NDI, RV. The UE may deliver the MAC PDU, the sidelink grant and the Sidelink transmission information of the TB to the associated Sidelink process. The MAC entity of the UE may instruct the associated Sidelink process to trigger a new transmission or a retransmission.

In sidelink resource allocation mode 1, for sidelink dynamic grant, the PSSCH transmission may be scheduled by a DCI (e.g., DCI format 3_0). In sidelink resource allocation mode 1, for sidelink configured grant type 2, the configured grant may be activated by a DCI (e.g., DCI format 3_0). In sidelink resource allocation mode 1, for sidelink dynamic grant and sidelink configured grant type 2 the "Time gap" field value m of the DCI may provide an index m+1 into a slot offset table (e.g., the table may be configured by higher layer parameter sl-DCI-ToSL-Trans). The table value at index m+1 may be referred to as slot offset $K_{SL}$. The slot of the first sidelink transmission scheduled by the DCI may be the first SL slot of the corresponding resource pool that starts not earlier than $$T_{DL} - \frac{T_{TA}}{2} + K_{SL} \times T_{slot},$$

where $T_{DL}$ is the starting time of the downlink slot carrying the corresponding DCI, $T_{TA}$ is the timing advance value corresponding to the TAG of the serving cell on which the DCI is received and $K_{SL}$ is the slot offset between the slot of the DCI and the first sidelink transmission scheduled by DCI and $T_{slot}$ is the SL slot duration. The "Configuration index" field of the DCI, if provided and not reserved, may indicate the index of the sidelink configured type 2. In sidelink resource allocation mode 1, for sidelink configured grant type 1, the slot of the first sidelink transmissions may follow the higher layer configuration.

The resource allocation unit in the frequency domain may be the sub-channel. The sub-channel assignment for sidelink transmission may be determined using the "Frequency resource assignment" field in the associated SCI. The lowest sub-channel for sidelink transmission may be the sub-channel on which the lowest PRB of the associated PSCCH is transmitted. For example, if a PSSCH scheduled by a PSCCH would overlap with resources containing the PSCCH, the resources corresponding to a union of the PSCCH that scheduled the PSSCH and associated PSCCH DM-RS may not be available for the PSSCH.

The redundancy version for transmitting a TB may be given by the "Redundancy version" field in the $2^{nd}$ stage SCI (e.g., SCI format 2-A or 2-B). The modulation and coding scheme $I_{MCS}$ may be given by the 'Modulation and coding scheme' field in the $1^{st}$ stage SCI (e.g., SCI format 1-A). The UE may determine the MCS table based on the following: a pre-defined table may be used if no additional MCS table is configured by higher layer parameter sl-MCS-Table; otherwise an MCS table is determined based on the 'MCS table indicator' field in the $1^{st}$ stage SCI (e.g., SCI format 1-A). The UE may use $I_{MCS}$ and the MCS table determined according to the previous step to determine the modulation order ($Q_m$) and Target code rate (R) used in the physical sidelink shared channel.

The UE may determine the TB size (TBS) based on the number of REs ($N_{RE}$) within the slot. The UE may determine the number of REs allocated for PSSCH within a PRB ($N_{RE}'$) by $$N_{RE}' = N_{sc}^{RB}\left(N_{symb}^{sh} - N_{symb}^{PSFCH}\right) - N_{oh}^{PRB} - N_{RE}^{DMRS},$$

where $$N_{sc}^{RB} = 12$$

is the number of subcarriers in a physical resource block;

$$N_{symb}^{sh} = sl\text{-}LengthSymbols - 2,$$

where sl-LengthSymbols is the number of sidelink symbols within the slot provided by higher layers $$N_{symb}^{PSFCH} = 3 \text{ if } 'PSFCH$$

overhead indication' field of SCI format 1-A indicates "1", and $$N_{symb}^{PSFCH} = 0$$

otherwise, if higher layer parameter sl-PSFCH-Period is 2 or 4. If higher layer parameter sl-PSFCH-Period is 0, $$N_{symb}^{PSFCH} = 0.$$

If higher layer parameter sl-PSFCH-Period is 1, $$N_{symb}^{PSFCH} = 3.$$

$$N_{oh}^{PRB}$$

is the overhead given by higher layer parameter sl-X-Overhead.

$$N_{RE}^{DMRS}$$

is given by higher layer parameter sl-PSSCH-DMRS-TimePattern. The UE may determine the total number of REs allocated for PSSCH ($N_{RE}$) by $$N_{RE} = N_{RE}' \cdot n_{PRB} - N_{RE}^{SCI,1} - N_{RE}^{SCI,2},$$

where $n_{PRB}$ is the total number of allocated PRBs for the PSSCH;

$$N_{RE}^{SCI,1}$$

is the total number of REs occupied by the PSCCH and PSCCH DM-RS;

$$N_{RE}^{SCI,2}$$

is the number of coded modulation symbols generated for $2^{nd}$-stage SCI transmission (prior to duplication for the $2^{nd}$ layer, if present). The UE may determine the TBS based on the total number of REs allocated for PSSCH ($N_{RE}$) and/or the modulation order ($Q_m$) and Target code rate (R) used in the physical sidelink shared channel.

For the single codeword q=0 of a PSSCH, the block of bits $$b^{(q)}(0), \ldots, b^{(q)}(M_{bit}^{(q)} - 1),$$

where $$M_{bit}^{(q)} = M_{bit,SCI2}^{(q)} + M_{bit,data}^{(q)}$$

is the number of bits in codeword q transmitted on the physical channel, may be scrambled prior to modulation (e.g., using a scrambling sequence based on a CRC of the PSCCH associated with the PSSCH). For the single codeword q=0, the block of scrambled bits may be modulated, resulting in a block of complex-valued modulation symbols $$d^{(q)}(0), \ldots, d^{(q)}(M_{symb}^{(q)} - 1),$$

where $$M_{symb}^{(q)} = M_{symb,1}^{(q)} + M_{symb,2}^{(q)}$$

Layer mapping may be done with the number of layers $v \in \{1, 2\}$, resulting in $$x(i) = [x^{(0)}(i) \ldots x^{(v-1)}(i)]^T, \quad i = 0, 1, \ldots, M_{symb}^{layer} - 1.$$

The block of vectors $[x^{(0)}(i) \ldots x^{(v-1)}(i)]^T$ may be pre-coded where the precoding matrix W equals the identity matrix and $$M_{symb}^{ap} = M_{symb}^{layer}.$$

For each of the antenna ports used for transmission of the PSSCH, the block of complex-valued symbols $$z^{(p)}(0), \ldots, z^{(p)}(M_{symb}^{ap} - 1)$$

may be multiplied with the amplitude scaling factor $$\beta_{DMRS}^{PSSCH}$$

in order to conform to the transmit power and mapped to resource elements $(k', l)_{p,\mu}$ in the virtual resource blocks assigned for transmission, where k'=0 is the first subcarrier in the lowest-numbered virtual resource block assigned for transmission. The mapping operation may be done in two steps: first, the complex-valued symbols corresponding to the bit for the $2^{nd}$-stage SCI in increasing order of first the index k' over the assigned virtual resource blocks and then the index l, starting from the first PSSCH symbol carrying an associated DM-RS, wherein the corresponding resource elements in the corresponding physical resource blocks are not used for transmission of the associated DM-RS, PT-RS, or PSCCH; secondly, the complex-valued modulation symbols not corresponding to the $2^{nd}$-stage SCI shall be in increasing order of first the index k' over the assigned virtual resource blocks, and then the index I with the starting position, wherein the resource elements are not used for $2^{nd}$-stage SCI in the first step; and/or the corresponding resource elements in the corresponding physical resource blocks are not used for transmission of the associated DM-RS, PT-RS, CSI-RS, or PSCCH.

The resource elements used for the PSSCH in the first OFDM symbol in the mapping operation above, including DM-RS, PT-RS, and/or CSI-RS occurring in the first OFDM symbol, may be duplicated in the OFDM symbol immediately preceding the first OFDM symbol in the mapping (e.g., for AGC training purposes).

Virtual resource blocks may be mapped to physical resource blocks according to non-interleaved mapping. For non-interleaved VRB-to-PRB mapping, virtual resource block n is mapped to physical resource block n.

For a PSCCH, the block of bits b (0), . . . , b ($M_{bit}$−1), where $M_{bit}$ is the number of bits transmitted on the physical channel, may be scrambled prior to modulation, resulting in a block of scrambled bits $\tilde{b}(0)$, . . . , $\tilde{b}(M_{bit}$−1) according to $\tilde{b}(i)=(b(i)+c(i))$ mod 2. The block of scrambled bits $\tilde{b}(0)$, . . . , $\tilde{b}(M_{bit}$−1) may be modulated using QPSK, resulting in a block of complex-valued modulation symbols $d(0)$, . . . , $d(M_{symb}$−1) where $M_{symb}=M_{bit}/2$. The set of complex-valued modulation symbols $d(0)$, . . . , $d(M_{symb}$−1) may be multiplied with the amplitude scaling factor $$\beta_{DMRS}^{PSCCH}$$

in order to conform to the transmit power and mapped in sequence starting with $d(0)$ to resource elements $(k, l)_{p,\mu}$ assigned for transmission, and not used for the demodulation reference signals associated with PSCCH, in increasing order of first the index k over the assigned physical resources, and then the index I on antenna port p (e.g., p=2000).

The resource elements used for the PSCCH in the first OFDM symbol in the mapping operation above, including DM-RS, PT-RS, and/or CSI-RS occurring in the first OFDM symbol, may be duplicated in the immediately preceding OFDM symbol (e.g., for AGC training purposes).

For sidelink resource allocation mode 1, a UE upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The UE may not be required to decode more than one PSCCH at each PSCCH resource candidate. For sidelink resource allocation mode 2, a UE upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The UE may not be required to decode more than one PSCCH at each PSCCH resource candidate. A UE may be required to decode neither the corresponding second SCI (e.g., SCI formats 2-A and/or 2-B) nor the PSSCH associated with a first SCI (e.g., SCI format 1-A) if the first SCI indicates an MCS table that the UE does not support.

Throughout this disclosure, a (sub) set of symbols of a slot, associated with a resource pool of a sidelink BWP, that is (pre-)configured for sidelink communication (e.g., transmission and/or reception) may be referred to as 'sidelink symbols' of the slot. The sidelink symbols may be contiguous/consecutive symbols of a slot. The sidelink symbols may start from a sidelink starting symbol (e.g., indicated by an RRC parameter), e.g., sidelink starting symbol may be symbol #0 or symbol #1, and so on. The sidelink symbols may comprise one or more symbols of the slot, wherein a parameter (e.g., indicated by RRC) may indicate the number of sidelink symbols of the slot. The sidelink symbols may comprise one or more guard symbols, e.g., to provide a time gap for the UE to switch from a transmission mode to a reception mode. For example, the OFDM symbol immediately following the last symbol used for PSSCH, PSFCH, and/or S-SSB may serve as a guard symbol. As shown in FIG. 19, the sidelink symbols may comprise one or more PSCCH resources/occasions and/or one or more PSCCH resources and/or zero or more PSFCH resources/occasions. The sidelink symbols may comprise one or more AGC symbols.

An AGC symbol may comprise duplication of (content of) the resource elements of the immediately succeeding/following symbol (e.g., a TB and/or SCI may be mapped to the immediately succeeding symbol). In an example, the AGC symbol may be a dummy OFDM symbol. In an example, the AGC symbol may comprise a reference signal. For example, the first OFDM symbol of a PSSCH and its associated PSCCH may be duplicated (e.g., in the AGC symbol that is immediately before the first OFDM symbol of the PSSCH). For example, the first OFDM symbol of a PSFCH may be duplicated (e.g., for AGC training purposes).

In a sidelink slot structure configuration, the first symbol is used for automatic gain control (AGC) a nd the last symbol is used for a gap. During an AGC symbol, a receiving and/or sensing UE may perform AGC training. For AGC training, a UE detects the energy/power of a signal in the channel during the AGC symbol and applies a hardware gain to maximize the signal amplitude to the dynamic range of the analog to digital convertor (ADC) at the receiver. The receiver may determine a gain for a received signal, and an AGC duration allows time for the receiver to determine the gain and apply the gain (e.g., hardware gain component) such that when the receiver receives the data (e.g., in the next symbol(s)), the gain of the amplifier has already been adjusted.

For sidelink communication, the transmitter UE may not map data/control information to the AGC symbol. The AGC symbol may not be used for communication and sending information other than energy. The AGC symbol may be a last symbol prior to an earliest symbol of a transmission, such that a gap between AGC symbol and signal/channel transmission is minimized and an accurate gain is determined for receiving the following signal/channel. For example, the AGC symbol, as shown in FIG. 19, maybe a symbol immediately preceding the first/earliest symbol of a resource used for a transmission via a channel (e.g., PSCCH and/or PSSCH and/or PSFCH transmission).

In an example, the AGC symbol may comprise duplication of resource elements of the next (immediately following) OFDM symbol. In an example, the AGC symbol may comprise any signal, e.g., a per-defined signal/sequence and/or dummy information. The purpose of the AGC symbol is to allow the receiver UE to perform AGC training and adjust the hardware gain for a most efficient reception of the following signal.

Throughout this disclosure, the "AGC symbol" may be referred to as "duplicated symbol" and/or "duplication" and/or "the symbol used for duplication" and/or "the immediately preceding symbol comprising the duplication of a first symbol".

The MAC may perform multiplexing/demultiplexing of SL logical channels and/or mapping between SL logical channels and SL transport channels. SL transport channels may comprise sidelink broadcast channel (SL-BCH) and sidelink shared channel (SL-SCH). The multiplexing/demultiplexing may include multiplexing/demultiplexing of data units, belonging to the one or more SL logical channels, into/from SL Transport Blocks (TBs) delivered to/from the PHY. The multiplexing/demultiplexing may comprise multiplexing/demultiplexing of SL control information (e.g., SL MAC control elements or SL MAC-CEs) from MAC-control unit. The MAC may be configured to perform scheduling, scheduling information reporting, and priority handling between UEs by means of dynamic scheduling, error correction through Hybrid Automatic Repeat Request (HARQ) (e.g., one HARQ entity per carrier in case of Carrier Aggregation (CA)), priority handling between SL logical channels of the UE by means of logical channel prioritization (LCP), and/or padding. The MAC may support one or more numerologies and/or transmission timings. In an example, mapping restrictions in a logical channel prioritization may control which numerology and/or transmission timing a SL logical channel may use.

The MAC may provide the following services and functions over the PC5 interface: Radio resource selection (referring to FIG. 24 and FIG. 25), Packet filtering, Priority handling between uplink and sidelink transmissions for a given UE, and/or Sidelink CSI reporting. With LCP restrictions in MAC, only sidelink logical channels belonging to the same destination may be multiplexed into a MAC PDU for every unicast, groupcast and broadcast transmission which is associated to the destination. NG-RAN may control whether a sidelink logical channel can utilize the resources allocated to a configured sidelink grant Type 1. For transmissions to RX UE(s) using SL DRX operation, LCP ensures that a TX UE transmits data in the active time of the RX UE(s). For packet filtering, a SL-SCH MAC header including portions of both Source Layer-2 ID and a Destination Layer-2 ID is added to each MAC PDU. LCID included within a MAC subheader uniquely identifies a logical channel within the scope of the Source Layer-2 ID and Destination Layer-2 ID combination.

The PHY may perform mapping of SL transport channels to SL physical channels and digital and analog signal processing functions for sending and receiving information over the air interface. These digital and analog signal processing functions may include, for example, coding/decoding and modulation/demodulation. The PHY may perform multi-antenna mapping. The PHY may provide one or more SL transport channels as a service to the MAC.

For one or more PDUs associated with one SCI, MAC shall consider only logical channels with the same Source Layer-2 ID-Destination Layer-2 ID pair for one of unicast, groupcast and broadcast which is associated with the pair. Multiple transmissions for different Sidelink processes may be allowed to be independently performed in different PSSCH durations. Sidelink data for discovery and sidelink data for non-discovery transmitted by a UE may not be multiplexed into the same TB because they are always associated with different destination L2 IDs.

When mapping SL logical channels and/or MAC-CEs to SL transport channels, the MAC layer may perform logical channel prioritization (LCP). The sidelink Logical Channel Prioritization procedure is applied whenever a new transmission is performed. RRC controls the scheduling of sidelink data by signaling for each logical channel: a logical channel priority (e.g., via sl-Priority) where an increasing priority value indicates a lower priority level; a sidelink Prioritized Bit Rate (sPBR) (e.g., via sl-PrioritisedBitRate); and a sidelink Bucket Size Duration (sBSD) (e.g., via sl-BucketSizeDuration). RRC additionally controls the LCP procedure by configuring mapping restrictions for each logical channel: sl-configuredGrantType1Allowed which sets whether a configured grant Type 1 can be used for sidelink transmission; sl-AllowedCG-List which sets the allowed configured grant(s) for sidelink transmission; and sl-HARQ-FeedbackEnabled which sets whether the logical channel is allowed to be multiplexed with logical channel(s)

with sl-HARQ-FeedbackEnabled set to enabled or disabled. The following UE variable is used for the Logical channel prioritization procedure: SBj which is maintained for each logical channel j. The MAC entity shall initialize SBj of the logical channel to zero when the logical channel is established. For each logical channel j, the MAC entity may increment SBj by the product sPBR×T before every instance of the LCP procedure, where T is the time elapsed since SBj was last incremented; if the value of SBj is greater than the sidelink bucket size (i.e. sPBR×sBSD): set SBj to the sidelink bucket size.

For each SCI corresponding to a new transmission, the UE may select a Destination UE/ID (e.g., associated with sidelink discovery, and/or associated to one of unicast, groupcast and broadcast), and having at least one of the MAC CE and/or the logical channel. The at least one MAC-CE and/or logical channel may have the highest priority (e.g., based on the RRC parameter indicating the corresponding logical channel priority), among the logical channels and MAC CE(s), if any, for the SL grant associated to the SCI. SL data for sidelink communication may be available for transmission in the logical channels. SBj>0, in case there is any logical channel having SBj>0. In case the SL grant is a Configured Grant Type 1, an RRC parameter indicates that multiplexing the respective logical channel in CG type 1 is allowed (e.g., sl-configuredGrantType1Allowed, if configured, is set to true). sl-AllowedCG-List, if configured, may include the configured grant index associated to the SL grant. sl-HARQ-FeedbackEnabled may be set to disabled, if PSFCH is not configured for the SL grant associated to the SCI.

The UE may select the logical channels satisfying the following conditions among the logical channels belonging to the selected Destination: SL data is available for transmission, and/or sl-configuredGrantType1Allowed, if configured, is set to true in case the SL grant is a Configured Grant Type 1; and/or sl-AllowedCG-List, if configured, includes the configured grant index associated to the SL grant. If PSFCH is configured for the sidelink grant associated to the SCI and the UE is capable of PSFCH reception, the RRC parameter indicating HARQ feedback enablement of the logical channel (e.g., sl-HARQ-FeedbackEnabled) may be set to enabled, if sl-HARQ-FeedbackEnabled is set to enabled for the highest priority logical channel satisfying the above conditions, or the RRC parameter indicating HARQ feedback enablement of the logical channel (e.g., sl-HARQ-FeedbackEnabled) may be set to disabled, if sl-HARQ-FeedbackEnabled is set to disabled for the highest priority logical channel satisfying the above conditions. Else, if PSFCH is not configured for the sidelink grant associated to the SCI or the UE is not capable of PSFCH reception, the RRC parameter indicating HARQ feedback enablement of the logical channel (e.g., sl-HARQ-FeedbackEnabled) is set to disabled. HARQ feedback enabled/disabled indicator may be set to disabled for the transmission of a MAC PDU only carrying CSI reporting MAC CE or Sidelink DRX Command MAC CE or Sidelink Inter-UE Coordination Request MAC CE or Sidelink Inter-UE Coordination Information MAC CE.

For each SCI corresponding to a new transmission, the UE may allocate resources to the logical channels as follows: one or more logical channels selected for the SL grant with SBj>0 are allocated resources in a decreasing priority order (e.g., order of logical channel priority indicated by the RRC configuration parameters). If the sPBR of a logical channel is set to infinity, the MAC entity shall allocate resources for all the data that is available for transmission on the logical channel before meeting the sPBR of the lower priority logical channel(s). The UE decrements SBj by the total size of MAC SDUs served to logical channel j above. If any resources remain, all the selected logical channels are served in a strict decreasing priority order (e.g., regardless of the value of SBj) until either the data for that logical channel or the SL grant is exhausted, whichever comes first. Logical channels configured with equal priority may be served equally.

The UE may prioritize logical channels in accordance with the following order (highest priority listed first): data from SCCH; Sidelink CSI Reporting MAC CE; Sidelink Inter-UE Coordination Request MAC CE and Sidelink Inter-UE Coordination Information MAC CE; Sidelink DRX Command MAC CE; and data from any STCH. In an example, the priority order between Sidelink Inter-UE Coordination Request MAC CE and Sidelink Inter-UE Coordination Information MAC CE may be up to UE implementation.

The MAC entity may multiplex one or more MAC CEs and one or more MAC SDUs in a MAC PDU, based on the logical channel prioritization procedure above.

A MAC SDU may comprise one or more SCCH SDUs (e.g., data from one or more SL control (SCCH) logical channels) associated with one or more SL SRBs. For example, data from a SL SRB may be multiplexed/inserted in a SCCH SDU. A MAC SDU may comprise one or more STCH SDUs (e.g., data from one or more SL traffic (STCH) logical channels) associated with one or more SL DRBs. For example, data from a SL DRB may be multiplexed/inserted in a STCH SDU.

A SL MAC PDU may consist of one SL-SCH subheader and one or more MAC subPDUs (e.g., MAC SDU and/or MAC-CE and/or padding). Each MAC subPDU may consist of one of the following: A MAC subheader only (including padding); A MAC subheader and a MAC SDU; A MAC subheader and a MAC CE; A MAC subheader and padding. The MAC SDUs may be of variable sizes. Each MAC subheader (e.g., except SL-SCH subheader) may correspond to either a MAC SDU, a MAC CE, or padding.

The data unit from MAC layer (MAC PDU) to PHY layer (PHY SDU) may be referred to as a transport block (TB). Throughout this disclosure, the terms MAC PDU and PHY SDU and TB may be used interchangeably.

Sidelink supports SL DRX for unicast, groupcast, and broadcast. SL DRX parameters (e.g., on-duration, inactivity-timer, retransmission-timer, cycle) may be defined/configured for SL to determine the SL active time for SL DRX. During the SL active time, the UE may perform SCI monitoring for data reception (e.g., PSCCH and $2^{nd}$ stage SCI on PSSCH). The UE may skip monitoring of SCI for data reception during SL DRX inactive time.

The SL active time of the RX UE may include the time in which any/at least one of its applicable SL on-duration timer(s), SL inactivity-timer(s) and/or SL retransmission timer(s) (for any of unicast, groupcast, or broadcast) are running. For example, one or more slots associated with announced periodic transmissions by the TX UE and the time in which a UE is expecting CSI report following a CSI request (for unicast) are considered as SL active time of the RX UE. The time for the unicast link establishment procedure and the time for the PC5 RRC reconfiguration with initial SL DRX configuration procedure are considered as SL active time of the RX UE.

The TX UE may maintain a set of timers corresponding to the SL DRX timers in the RX UE(s) for each pair of source/destination L2 ID for unicast or destination L2 ID for groupcast/broadcast. When data is available for transmission to one or more RX UE(s) configured with SL DRX, the TX UE may select resources taking into account the active time of the RX UE(s) determined by the timers maintained at the TX UE.

The UE may determine from SIB12 whether the gNB supports SL DRX or not.

For unicast, SL DRX may be configured per pair of source and destination (e.g., source L2 ID and destination L2 ID).

The UE may maintain a set of SL DRX timers for each direction per pair of source L2 ID and destination L2 ID. The SL DRX configuration for a pair of source/destination L2 IDs for a direction may be negotiated between the UEs, e.g., in the AS layer. For SL DRX configuration of each direction, one UE is the TX UE and the other is the RX UE. The RX UE may send assistance information, which includes its desired SL on-duration timer, SL DRX start offset, and SL DRX cycle, to the TX UE. The mode 2 TX UE may use the assistance information to determine the SL DRX configuration for the RX UE. The TX UE (e.g., in RRC_IDLE/RRC_INACTIVE/OOC, or in RRC_CONNECTED) using mode 2 resource allocation, may determine the SL DRX Configuration for the RX UE, e.g., regardless of whether assistance information is provided or not. For a TX UE in RRC_CONNECTED and using mode 1 resource allocation, the SL DRX configuration for the RX UE may be determined by the serving gNB of the TX UE. The TX UE may send the SL DRX configuration to be used by the RX UE to the RX UE. The RX UE may accept or reject the SL DRX configuration.

When the TX UE is in RRC_CONNECTED and using mode 1 resource allocation, the TX UE may report the received assistance information or the received SL DRX configuration reject information to its serving gNB supporting SL DRX. The Tx UE may send the SL DRX configuration to the RX UE, e.g., upon receiving the SL DRX configuration in dedicated RRC signaling from the gNB. When the RX UE is in RRC_CONNECTED and using mode 1 resource allocation, the RX UE may report the received SL DRX configuration to its serving gNB supporting SL DRX, e.g. for alignment of the Uu and SL DRX configurations.

SL on-duration timer, SL inactivity-timer, SL HARQ RTT timer, and SL HARQ retransmission timer may be supported/configured in unicast. SL HARQ RTT timer and SL HARQ retransmission timer may be maintained per SL process at the RX UE. In addition to (pre) configured values for each of these timers, SL HARQ RTT timer value may be derived from the retransmission resource timing when SCI indicates more than one transmission resource. SL HARQ RTT timer may be set to different values to support both HARQ enabled and HARQ disabled transmissions.

SL DRX MAC CE may be used for SL DRX operation in unicast, e.g., only in unicast.

For groupcast/broadcast, SL DRX may be configured commonly among multiple UEs, e.g., based on QoS profile and/or Destination L2 ID. Multiple SL DRX configurations may be supported for each of groupcast/broadcast.

SL on-duration timer, SL inactivity-timer, SL HARQ RTT and SL retransmission timers may be supported/configured for groupcast. Only SL on-duration timer may be supported/configured for broadcast. SL DRX cycle, SL on-duration, and SL inactivity timer (only for groupcast) may be configured per QoS profile. The starting offset and slot offset of the SL DRX cycle may be determined based on the destination L2 ID. The SL HARQ RTT timer (only for groupcast) and SL HARQ retransmission timer (only for groupcast) may not be configured per QoS profile or per destination L2 ID. For groupcast, the RX UE may maintain a SL inactivity timer for each destination L2 ID, and select the largest SL inactivity timer value, e.g., if multiple SL inactivity timer values associated with different QoS profiles are configured for that L2 ID. For groupcast and broadcast, the RX UE may maintain a single SL DRX cycle (e.g., selected as the smallest SL DRX cycle of any QoS profile of that L2 ID) and single SL on-duration (e.g., selected as the largest SL on-duration of any QoS profile of that L2 ID) for each destination L2 ID, e.g., when multiple QoS profiles are configured for that L2 ID.

For groupcast, SL HARQ RTT timer and SL retransmission timer may be maintained per SL process at the RX UE. SL HARQ RTT timer may be set to different values to support both HARQ enabled and HARQ disabled transmissions.

A default SL DRX configuration, common between groupcast and broadcast, may be used/configured for a QoS profile which is not mapped onto any non-default SL DRX configuration(s). The default SL DRX configuration for groupcast and broadcast may be used for discovery message in sidelink discovery and/or relay discovery messages and/or for Direct Link Establishment Request message.

In-coverage TX UEs and RX UEs in RRC_IDLE/RRC_I-NACTIVE may obtain their SL DRX configuration from SIB (e.g., SIB12). UEs (TX and/or RX) in RRC_CON-NECTED may obtain the SL DRX configuration from SIB (e.g., SIB12), and/or from dedicated RRC signaling during handover (e.g., RRC reconfiguration message). For the out of coverage case, the UE may obtain SL DRX configuration from pre-configuration.

For groupcast, the TX UE may restart its timer corresponding to the SL inactivity timer for the destination L2 ID (used for determining the allowable transmission time) upon reception of new data with the same destination L2 ID.

TX profile may be used to ensure compatibility for groupcast and broadcast communication between UEs supporting/not-supporting SL DRX functionality. A TX profile is provided by upper layers to AS layer and identifies one or more sidelink feature group(s). Multiple TX profiles with the support of SL DRX and without the support of SL DRX can be associated to a destination L2 ID. For a given destination L2 ID, all TX and RX UEs may be configured with the same set of TX profile(s). A UE assumes SL DRX for the given destination L2 ID when the associated TX profiles correspond to support of SL DRX. A UE assumes no SL DRX for the given destination L2 ID if there is no associated TX profile. An RX UE determines that SL DRX is used if all destination L2 IDs of interest are assumed to support SL DRX. For groupcast, when the UE is in RRC_CON-NECTED and using mode 1 resource allocation, the UE reports each destination L2 ID and associated SL DRX on/off indication to the gNB supporting SL DRX.

Alignment of Uu DRX and SL DRX for a UE in RRC_CONNECTED is supported for unicast, groupcast, and broadcast. Alignment of Uu DRX and SL DRX at the same UE is supported. In addition, for mode 1 scheduling, the alignment of Uu DRX of the TX UE and SL DRX of the RX UE is supported. Alignment may comprise of either full overlap and/or partial overlap in time between Uu DRX and SL DRX. For SL RX UEs in RRC_CONNECTED, alignment is achieved by the gNB.

Figure 28:
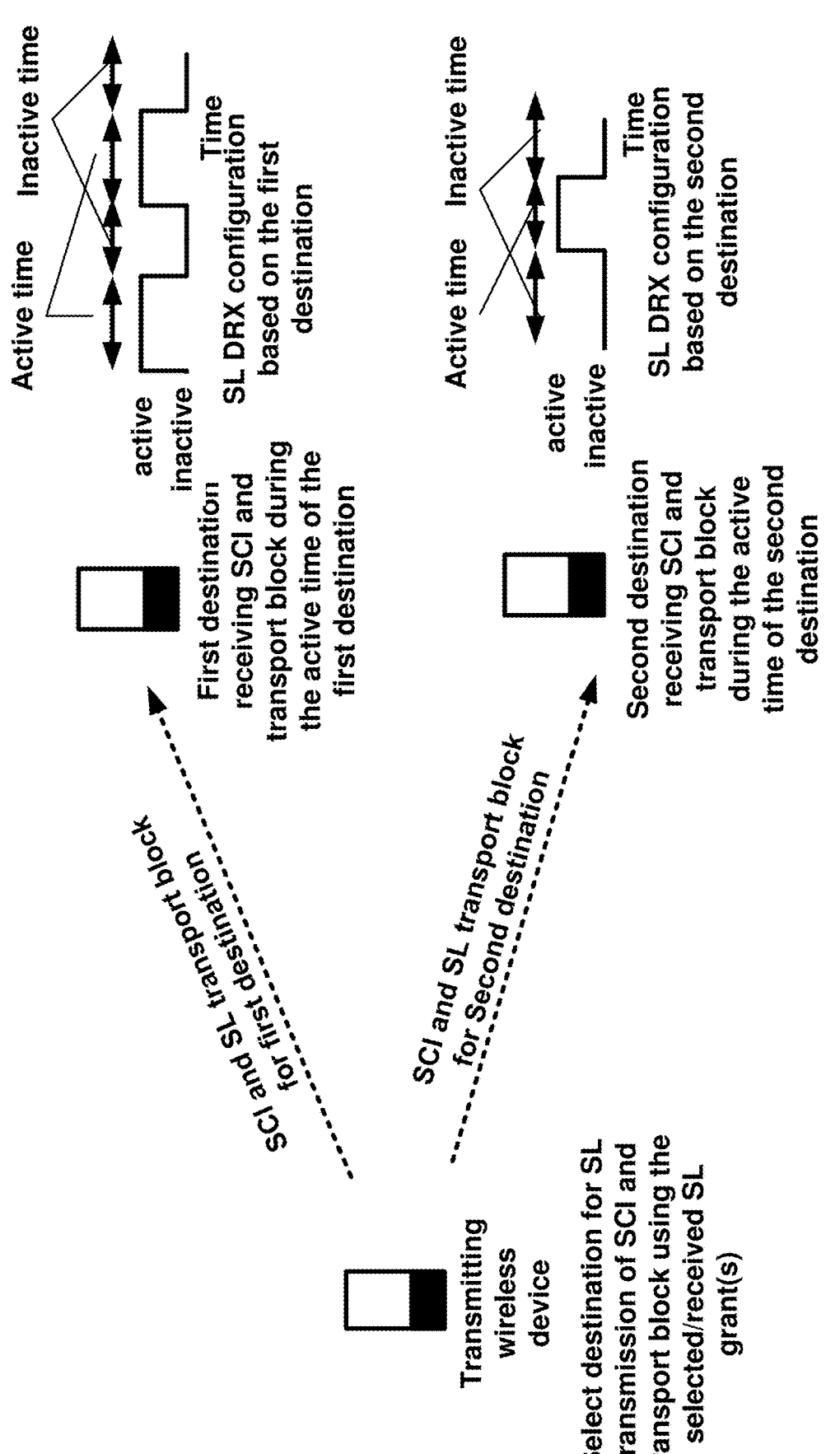
FIG. 28 illustrates an example configuration of a sidelink resource pool in a frequency band as per an aspect of an example embodiment of the present disclosure.

FIG. 28 illustrates an example of the sidelink resource allocation as per an aspect of an embodiment of the present disclosure. The example may be based on a sidelink resource allocation mode 1 and/or sidelink resource allocation mode 2. A transmitting wireless device may select, among a plurality of destinations (e.g., among a plurality of receiving wireless devices), a destination (e.g., a receiving wireless device) for SL transmission. For example, the transmitting wireless device may schedule the SL transmission using a grant received from a base station (e.g., mode 1). For example, the grant from the base station may not be associated with a particular destination (e.g., the first destination and/or the second destination in FIG. 28) of a SL transmission. For example, the grant may not comprise a destination ID (e.g., identifier of a receiving wireless device and/or a group identifier of one or more receiving wireless device) of the SL transmission. The transmitting wireless device may select the destination for the SL transmission, e.g., after or in response to receiving the grant from the base station. The transmitting wireless device may determine active time (e.g., DRX active time) when a SL DRX operation is configured. For example, the active time comprises one or more times (e.g., time duration, time interval, time window and/or the like). For example, the transmitting wireless device may select the first destination to transmit, via and/or using the grant (e.g., and/or a respective SL grant) a respective SCI and/or a transport block. The selecting the first destination may be in response to a time domain resource allocation indicated by the grant (e.g., and/or the respective SL grant) being in the SL DRX active time of the first destination. For example, the transmitting wireless device may not select the second destination to transmit, via and/or using the grant (e.g., and/or a respective SL grant), a respective SCI and/or a transport block, e.g., in response to the time domain resource allocation indicated by the grant (e.g., and/or the respective SL grant) being outside the SL DRX active time of the second destination. For example, the transmitting wireless device may select the second destination to transmit, via and/or using the grant (e.g., and/or a respective SL grant), a respective SCI and/or a transport block. The selecting the second destination may be in response to a time domain resource allocation indicated by the grant (e.g., and/or the respective SL grant) being in the SL DRX active time of the second destination. For example, the transmitting wireless device may not select the first destination to transmit, via and/or using the grant (e.g., and/or a respective SL grant), a respective SCI and/or a transport block, e.g., in response to the time domain resource allocation indicated by the grant (e.g., and/or the respective SL grant) being outside the SL DRX active time of the first destination.

In the example embodiment(s) of the presence disclosure, a grant (e.g., DCI format 3_0) that the transmitting wireless device receives, e.g., via a Uu interface, from a base station may be referred to as an SL grant (e.g., a first-stage SCI and/or a second-stage SCI) that the transmitting wireless device transmits, for SL transmission, to the receiving wireless device. For example, example embodiment(s) of the presence disclosure may refer the grant as the SL grant, e.g., if the transmitting wireless device determines one or more first field values of the SL grant based on one or more second fields of the grant. For example, the one or more first field values indicate at least one of: a value of a priority of the SL transmission, a frequency resource assignment of the SL transmission (e.g., PSSCH), a time resource assignment of the SL transmission (e.g. PSSCH), a resource reservation period, a DMRS pattern of the PSSCH, a second-stage SCI format, a value of a Beta_offset indicator, a value of a number of DMRS port for SL transmission (e.g., PSSCH), a modulation and coding scheme of the SL transmission (e.g., PSSCH), a value of PSFCH overhead indication, a value of HARQ process number for the SL transmission (e.g., an SL TB of PSSCH), a value of new data indicator, a redundancy version of the SL transmission (e.g., an SL TB of PSSCH), a source ID (e.g., Source Layer-1 ID and/or Source Layer-2 ID) of the transmitting wireless device, a destination ID (e.g., Destination Layer-1 ID and/or Destination Layer-2 ID) of the receiving wireless device, a value of HARQ feedback enabled/disabled indicator indicating whether a HARQ feedback of the SL transmission (e.g., an SL TB of PSSCH) is enabled or disabled, a value of a cast type indicator, an indication of a CSI request, and/or a zone identifier. For example, the one or more second values may indicate at least one of: a resource pool index indicating the number of resource pools for transmission configured by the higher layer parameter (e.g., sl-TxPoolScheduling), a time gap, a HARQ process number (e.g., of the SL transmission), a new data indicator indicating whether the SL transmission of the HARQ process number is a new transmission or a retransmission, a lowest index of the subchannel allocation to the initial transmission (e.g., SL transmission), a value of a frequency resource assignment field of SL grant (e.g., SCI format 1-A), a value of a time resource assignment field of SL grant (e.g., SCI format 1-A), a value of a PSFCH-to-HARQ feedback timing indicator indicating a PSFCH resource for a PSFCH transmission with HARQ-ACK information in response to a PSSCH transmission or reception, a value of PUCCH resource indicator indicating a PUCCH resource to transmit HARQ-ACK information to the base station for a PSSCH transmission with HARQ-ACK information in response to a PSSCH transmission, a value of configuration index, a value of a counter sidelink assignment index.

The example of FIG. 28 may be based on sidelink resource allocation mode 2 as per an aspect of an embodiment of the present disclosure. For example, a transmitting wireless device configured (e.g., selecting) the sidelink resource allocation mode 2 may determine an SL grant based on configuration parameters associated with the sidelink resource allocation mode 2. For example, the transmitting wireless device configured (e.g., selecting) the sidelink resource allocation mode 2 may determine the SL grant without receiving a grant from a base station. The transmitting wireless device may select, among a plurality of destinations (e.g., among a plurality of receiving wireless devices), a destination (e.g., a receiving wireless device) for SL transmission. For example, the transmitting wireless device may determine one or more field values of the SL grant. For example, the transmitting wireless device may determine a destination ID (e.g., identifier of a receiving wireless device and/or a group identifier of one or more receiving wireless device) of the SL grant for the SL transmission. A transmitting wireless device may determine active time (e.g., DRX active time) of a particular destination (e.g., a first destination and/or a second destination in FIG. 28), e.g., if the transmitting wireless device transmits configuration parameters of SL DRX operation to the particular destination. For example, the active time comprises one or more times (e.g., time duration, time interval, time window and/or the like). For example, the transmitting wireless device may select the first destination to transmit, via and/or using the SL grant a respective SCI and/or a transport block. The selecting the first destination may be in response to a time domain resource allocation indicated by the SL grant being in the SL DRX active time of the first destination. For example, the transmitting wireless device may not select the second destination to transmit, via and/or using the SL grant, a respective SCI and/or a transport block, e.g., in response to the time domain resource allocation indicated by the SL grant being outside the SL DRX active time of the second destination. For example, the transmitting wireless device may select the second destination to transmit, via and/or using the SL grant, a respective SCI and/or a transport block. The selecting the second destination may be in response to a time domain resource allocation indicated by the SL grant being in the SL DRX active time of the second destination. For example, the transmitting wireless device may not select the first destination to transmit, via and/or using the SL grant, a respective SCI and/or a transport block, e.g., in response to the time domain resource allocation indicated by the SL grant being outside the SL DRX active time of the first destination.

For example, the transmitting wireless device may transmit, to the receiving wireless device and/or via a PSCCH, the first-stage SCI (e.g., the SL grant and/or SCI format 1-A). For example, the first-stage SCI may comprise scheduling information of PSSCH. The PSSCH may comprise the second-stage SCI and/or a sidelink transport block (TB) (e.g., SL-SCH) of the SL transmission. For example, the transmitting wireless device may transmit, to the receiving wireless device and/or via the PSSCH, the second-stage SCI (e.g., the sidelink grant, SCI format 2-A, SCI format 2-B, and/or SCI format 2-C) in which one or more field values are determined based on the grant received from the base station. For example, the transmitting wireless device may transmit, to the receiving wireless device and/or via the PSSCH, the sidelink TB (e.g., SL-SCH) of the SL transmission.

A wireless device may receive, from a base station, configuration parameters of SL sensing operation of the wireless device, e.g., for an SL resource allocation mode 2 operation. The configuration parameters may indicate a starting time of an SL sensing window, a duration (e.g., size, and/or length) of an SL sensing window, and/or a periodicity of an SL sensing window. The wireless device may monitor one or more time slots during the sidelink sensing window to determine whether SL resources associated with the one or more time slots are available or not for an SL transmission. During the SL sensing window of the wireless device, the wireless device may monitor, decode, and/or receive an SL grant on PSCCH (e.g., first-stage SCI) and performs Reference Signal Received Power (RSRP) measurements for its own sidelink transmission. The wireless device may perform sensing operation outside of an SL DRX active time and/or within the SL DRX active time of SL DRX.

A wireless device (e.g., an MAC entity of the wireless device) may be configured by RRC (e.g., RRC layer of the wireless device) with a DRX functionality. For example, the wireless device may receive one or more messages comprising one or more configuration parameters of the DRX operation (e.g., the DRX functionality). For example, the one or more messages may comprise at least one of following: RRC message, RRC reconfiguration message, and/or broadcast/multicast message, PC5 RRC message, and/or PC5 RRC reconfiguration message. For example, DRX functionality controls the UE's PDCCH monitoring activity for the MAC entity's one or more RNTIs. For example, the one or more RNTIs comprise at least one of following: C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI, and/or one or more RNTIs associated with the SL transmission/reception. For example, the one or more RNTIs associated with the SL transmission/reception may comprise SL-RNTI, SLCS-RNTI and SL Semi-Persistent Scheduling V-RNTI. When using DRX operation, the wireless device may monitor PDCCH, PSFCH, PSCCH, and/or PSSCH according to requirements found in example embodiment(s) of the present specification. The wireless device may receive one or more configuration parameters of the DRX operation. The wireless device may be configured with (e.g., may start) the DRX operation in response to receiving the one or more configuration parameters. The wireless device may monitor the PDCCH, PSFCH, PSCCH, and/or PSSCH discontinuously using the DRX operation, e.g., when in RRC_CONNECTED, if DRX is configured, for all the activated Serving Cells, specified in this clause; otherwise the wireless device may monitor the PDCCH, PSFCH, PSCCH, and/or PSSCH.

A wireless device may receive message(s) (e.g., RRC message and/or system information). The message(s) may comprise configuration parameters associated with DRX operation. For example, the configuration parameters for the DRX procedure may comprise parameters to control DRX operation. For example, drx-onDuration Timer may indicate the duration at the beginning of a DRX cycle and/or drx-SlotOffset may indicate the delay before starting the drx-onDurationTimer and/or drx-InactivityTimer may indicate the duration after the PDCCH occasion in which a PDCCH indicates a new UL or DL transmission for the MAC entity and/or drx-RetransmissionTimerDL may indicate the maximum duration until a DL retransmission is received and/or drx-RetransmissionTimerUL may indicate the maximum duration until a grant for UL retransmission is received and/or drx-LongCycleStartOffset may indicate the Long DRX cycle and drx-StartOffset which defines the subframe where the Long and Short DRX cycle starts and/or drx-ShortCycle may indicate the Short DRX cycle and/or drx-ShortCycle Timer may indicate the duration the UE shall follow the Short DRX cycle and/or drx-HARQ-RTT-TimerDL may indicate the minimum duration before a DL assignment for HARQ retransmission is expected by the MAC entity and/or drx-HARQ-RTT-TimerUL may indicate the minimum duration before a UL HARQ retransmission grant is expected by the MAC entity and/or drx-RetransmissionTimerSL may indicate the maximum duration until a grant for SL retransmission is received and/or drx-HARQ-RTT-TimerSL may indicate the minimum duration before a SL retransmission grant is expected by the MAC entity and/or ps-Wakeup may indicate the configuration to start associated drx-onDurationTimer in case DCP is monitored but not detected and/or ps-TransmitOtherPeriodicCSI may indicate the configuration to report periodic CSI that is not L1-RSRP on PUCCH during the time duration indicated by drx-onDurationTimer in case DCP is configured but associated drx-onDurationTimer is not started and/or ps-TransmitPeriodicL1-RSRP may indicate the configuration to transmit periodic CSI that is L1-RSRP on PUCCH during the time duration indicated by drx-onDurationTimer in case DCP is configured but associated drx-onDurationTimer is not started.

A wireless device may receive, from a base station, one or more messages comprising one or more configuration parameters of the DRX operation for a Uu interface between the base station and the wireless device. The one or more parameters may indicate a plurality of DRX groups (e.g., two DRX groups). The one or more parameters may comprise a plurality of DRX group configuration parameters. Each of the plurality of DRX group configuration parameters may comprise one or more DRX configuration parameters of a respective DRX group of the plurality of DRX groups. For example, each of the plurality of DRX groups is associated with at least one of the plurality of DRX group configuration parameters. For example, one or more configuration parameters indicate which DRX group of the plurality of DRX group is associated with which DRX configuration parameters of the plurality of DRX group configuration parameters. The wireless device may configure only one DRX group and all Serving Cells belong to that one DRX group when RRC does not configure a secondary DRX group. Each Serving Cell is uniquely assigned to either of the two groups when two DRX groups are configured. The wireless device may be separately configured the DRX parameters for each DRX group. For example, drx-onDurationTimer, drx-InactivityTimer. The DRX parameters may be common to the DRX group. For example, drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

A wireless device may determine Active Time (e.g., DRX active time), e.g., of the Uu interface, for one or more cells in a DRX group, e.g., when DRX operation is configured. For example, the Active time comprises one or more times (e.g., time duration, time interval, time window and/or the like). For example, the one or more times comprise a time while drx-onDurationTimer is running. For example, the one or more times comprise a time while drx-InactivityTimer (e.g., for the DRX group) is running. For example, the one or more times comprise a time while drx-RetransmissionTimerDL and/or drx-RetransmissionTimerUL is running. For example, the one or more times comprise a time while drx-RetransmissionTimerSL (e.g., on any serving cell in the DRX group) is running. For example, the one or more times comprise a time while ra-ContentionResolutionTimer. For example, the wireless device may start ra-ContentionResolutionTimer in response to transmitting Msg 3 1313 (e.g., in FIG. 13A). A wireless device (e.g., an MAC entity of the wireless device) may perform when DRX is configured. For example, a wireless device, e.g., if the wireless device receives a MAC PDU in a configured downlink assignment, may start the drx-HARQ-RTT-TimerDL for the corresponding HARQ process in the first symbol after the end of the corresponding transmission carrying the DL HARQ feedback. For example, a wireless device, e.g., if the wireless device receives a MAC PDU in a configured downlink assignment, may stop the drx-RetransmissionTimerDL for the corresponding HARQ process. For example, a wireless device may start the drx-HARQ-RTT-TimerUL for the corresponding HARQ process in the first symbol after the end of the first transmission (within a bundle) of the corresponding PUSCH transmission and/or stop the drx-RetransmissionTimerUL for the corresponding HARQ process at the first transmission (within a bundle) of the corresponding PUSCH transmission. For example, a wireless device start the drx-RetransmissionTimerUL for the corresponding HARQ process in the first symbol after the expiry of drx-HARQ-RTT-TimerUL. For example, a wireless device may receive a DRX Command MAC CE or a Long DRX Command MAC CE, stop drx-onDurationTimer for each DRX group and/or stop drx-InactivityTimer for each DRX group. For example, a wireless device may start or restart drx-ShortCycleTimer for this DRX group in the first symbol after the expiry of drx-InactivityTimer and/or use the Short DRX cycle for this DRX group, e.g., if drx-Inactivity Timer for a DRX group may expire, and/or if the short DRX cycle is configured. For example, a wireless device may use (e.g., determine to use) the Long DRX cycle for this DRX group, e.g., if drx-InactivityTimer for a DRX group may expire, and/or if the short DRX cycle is configured. For example, a wireless device may start or restart drx-ShortCycleTimer for this DRX group in the first symbol after the expiry of drx-InactivityTimer, e.g., if the wireless device receives a DRX Command MAC CE and/or if the short DRX cycle is configured. For example, the wireless device may use (e.g., determine to use) the Short DRX cycle for this DRX group, e.g., if the wireless device receives a DRX Command MAC CE and/or if the short DRX cycle is configured. For example, a wireless device may use (e.g., determine to use) the Long DRX cycle for this DRX group, e.g., if the wireless device receives a DRX Command MAC CE and/or if the short DRX cycle is configured. For example, a wireless device may use the Long DRX cycle for this DRX group, e.g., drx-ShortCycleTimer for a DRX group expires. For example, a wireless device may receive a Long DRX Command MAC CE. The wireless device may stop drx-ShortCycleTimer for each DRX group and/or use the Long DRX cycle for each DRX group, e.g., in response to receiving the Long DRX Command MAC CE.

A wireless device (e.g., an MAC entity of the wireless device) may be configured by RRC (e.g., RRC layer of the wireless device) with a sidelink discontinuous reception (SL DRX) functionality. For example, SL DRX functionality controls the UE's SCI (e.g., first-stage SCI and second-stage SCI) monitoring activity for SL unicast, for SL groupcast transmission and SL broadcast transmission. When using SL DRX operation, the wireless device may monitor first-stage SCI and/or second-stage SCI according to requirements found in example embodiment(s) of the present specification. The wireless device may receive message(s) (e.g., RRC message and/or system information). The message(s) may comprise configuration parameters associated with DRX operation. For example, the configuration parameters for the DRX procedure may comprise parameters to control DRX operation. For example, sl-drx-onDurationTimer may indicate the duration at the beginning of a SL DRX cycle and/or drx-SlotOffset may indicate the delay before starting the sl-drx-onDurationTimer and/or sl-drx-Inactivity Timer may indicate the duration after the first slot of SCI (e.g., first-stage SCI and second-stage SCI) reception in which a SCI indicates a new SL transmission for the MAC entity and/or sl-drx-Retransmission Timer may indicate the maximum duration until a SL retransmission is received and/or sl-drx-StartOffset may indicate the (e.g., symbol/slot) where the SL DRX cycle starts and/or sl-drx-Cycle may indicate the Sidelink DRX cycle and/or sl-drx-HARQ-RTT-Timer may indicate the minimum duration before a SL HARQ retransmission is expected by the MAC entity.

A wireless device may determine an SL DRX active time (e.g., SL DRX active time) when a SL DRX operation is configured. For example, the SL DRX active time comprises one or more times (e.g., time duration, time interval, time window and/or the like). For example, the one or more times comprise a time while a sl-drx-onDurationTimer is running. For example, the one or more times comprise a time while a sl-drx-Inactivity Timer is running. For example, the one or more times comprise a time while a sl-drx-Retransmission-Timer is running. For example, the one or more periods comprise a period sl-LatencyBoundCSI-Report configured by RRC in case SL-CSI reporting MAC CE is not received. For example, the one or more times comprise a time while the time between the transmission of the request of SL-CSI reporting and the reception of the SL-SCI reporting MAC CE in case SL-CSI reporting MAC CE is received. Examples of active time in sidelink resource allocation mode 1 and sidelink resource allocation mode 2 are shown in FIGS. 23 and 24, respectively.

In an example, the wireless device may transition from an SL DRX active time to a non-SL DRX active time and/or vice versa. For example, the non-SL DRX active time may be refer to a time outside the SL DRX active time. In an example, the wireless device may maintain (e.g., keep and/or continue) an SL DRX active time, e.g., an event (e.g., a condition) determining the SL DRX active time occurs. For example, the event may comprise the wireless device (re-)starting SL DRX timer (e.g., sl-drx-onDurationTimer, sl-drx-InactivityTimer, and/or sl-drx-RetransmissionTimer) during the SL DRX active time according to the example embodiment of the present disclosure.

A wireless device (e.g., an MAC entity of the wireless device) may be configured one or multiple SL DRX configurations. For example, each of the one or multiple SL DRX configurations comprise a respective identifier. The wireless device may use the identifier to identify a particular SL DRX configurations of the one or multiple SL DRX configurations. For example, multiple SL DRX Cycles that are mapped with multiple SL-QoS-Profiles of a Destination Layer-2 ID and interested cast type is associated to groupcast and broadcast. For example, the wireless device may select sl-drx-Cycle whose length of the sl-drx-cycle is the shortest one among multiple SL DRX Cycles that are mapped with multiple SL-QoS-Profiles of Destination Layer-2 ID. A wireless device (e.g., an MAC entity of the wireless device) may be configured with one or multiple SL DRX. A wireless device may (re-)start a sl-drx-HARQ-RTT-Timer during the SL DRX operation. The sl-drx-HARQ-RTT-Timer may be expired. For example, the wireless device may (re-)start the sl-drx-RetransmissionTimer for the corresponding Sidelink process in the first [slot/symbol] after the expiry of sl-drx-HARQ-RTT-Timer, e.g., if the data of the corresponding Sidelink process (e.g., operating according to the example embodiment of the present disclosure) was not successfully decoded for unicast, and/or if the HARQ feedback (i.e., negative acknowledgement) is not transmitted due to UL/SL prioritization. A wireless device (e.g., an MAC entity of the wireless device) may be configured with one or multiple SL DRX configurations. For example, a SL DRX configuration of the one or more multiple SL DRX configuration may indicate a respective SL DRX cycle. For example, the SL DRX cycle may repeat with a periodicity respective to the SL DRX configuration. For example, the wireless device may determine a SL DRX cycle based on a reference formula. For example, the reference formula may be [(reference transmission time interval of subframe number×10)+the subframe number] modulo (sl-drx-Cycle)=sl-drx-StartOffset. For example, the wireless device may start sl-drx-onDurationTimer after sl-drx-Slot-Offset from the beginning of the subframe (indicated by the subframe number), e.g., if the reference transmission time interval and the subframe number satisfy [(reference transmission time interval of subframe number×10)+the subframe number] modulo (sl-drx-Cycle)=sl-drx-StartOffset. For example, the reference transmission time interval may comprise a SFN (system frame number). For example, the reference transmission time interval may comprise a DFN (Direct Frame Number). When the wireless device selects GNSS as the synchronization reference source, the DFN, the subframe number within a frame and slot number within a frame used for sidelink communication may be derived from the current UTC time, by the following formulae:

$$DFN = \text{Floor } (0.1^*(Tcurrent - Tref - \text{Offset}DFN)) \text{ mod } 1024$$

$$\text{SubframeNumber} = \text{Floor } (Tcurrent - Tref - \text{Offset}DFN) \text{ mod } 10$$

$$\text{SlotNumber} = \text{Floor } ((Tcurrent - Tref - \text{Offset}DFN)^*2\mu) \text{ mod } (10^*2\mu)$$

Where:
Tcurrent may be the current UTC time obtained from GNSS. This value may be expressed in milliseconds; Tref may be the reference UTC time 00:00:00 on Gregorian calendar date 1 Jan. 1900 (midnight between Thursday, Dec. 31, 1899 and Friday, Jan. 1, 1900). This value may be expressed in milliseconds; and OffsetDFN may be the value sl-OffsetDFN if configured, otherwise it may be zero. This value may be expressed in milliseconds.

A wireless device (e.g., an MAC entity of the wireless device) may be configured one or multiple SL DRX configurations. A wireless device may be in SL DRX active time (e.g., DRX active time) when a SL DRX operation is configured. For example, the wireless device may monitor the SCI (i.e., first-stage SCI and second-stage SCI) in the SL DRX active time. The SCI may indicate a new SL transmission. For example, the wireless device may start or restart sl-drx-InactivityTimer for the corresponding Source Layer-1 ID and Destination Layer-1 ID pair, e.g., after the first slot of SCI reception, e.g., if the wireless device may be in SL DRX active time, if the SCI may indicate a new SL transmission, if Source Layer-1 ID of the SCI may be equal to the 8 LSB of the intended Destination Layer-2 ID, if Destination Layer-1 ID of the SCI may be equal to the 8 LSB of the intended Source Layer-2 ID, and/or if the cast type indicator in the SCI may be set to unicast. For example, the wireless device may start or restart sl-drx-InactivityTimer for the corresponding Destination Layer-1 ID after the first slot of SCI reception, e.g., if the wireless device may be in SL DRX active time, if the SCI may indicate a new SL transmission, if Destination Layer-1 ID of the SCI (i.e., second-stage SCI) is equal to the intended Destination Layer-1 ID, if the cast type indicator in the SCI is set to groupcast. For example, the wireless device may select sl-drx-InactivityTimer whose length of the sl-drx-Inactivity Timer is the largest one among multiple SL DRX Inactivity timers that are mapped to multiple SL-QoS-Profiles of Destination Layer-2 ID associated with the Destination Layer-1 ID of the SCI, e.g., if the SCI may indicate a new SL transmission, if Destination Layer-1 ID of the SCI (i.e., second-stage SCI) is equal to the intended Destination Layer-1 ID, if the cast type indicator in the SCI is set to groupcast.

A wireless device (e.g., an MAC entity of the wireless device) may (re-)start the sl-drx-HARQ-RTT-Timer for the corresponding Sidelink process in the first slot after the end of the corresponding transmission carrying the SL HARQ feedback, e.g., if the wireless device may be in SL DRX active time, if the wireless device receives an SCI indicating a SL transmission (e.g., a new SL transmission and/or a SL retransmission), and/or if HARQ feedback is enabled by the SCI and the cast type indicator in the SCI is set to unicast. A wireless device (e.g., an MAC entity of the wireless device) may (re-)start the sl-drx-HARQ-RTT-Timer for the corresponding Sidelink process in the first slot after the end of the corresponding resource carrying the SL HARQ feedback when the SL HARQ feedback is not transmitted due to UL/SL prioritization, e.g., if the wireless device may be in SL DRX active time, if the wireless device receives an SCI indicating a SL transmission (e.g., a new SL transmission and/or a SL retransmission), and/or if HARQ feedback is enabled by the SCI and the cast type indicator in the SCI is set to unicast. A wireless device (e.g., an MAC entity of the wireless device) may start the sl-drx-HARQ-RTT-Timer for the corresponding Sidelink process in the first slot after the end of the corresponding PSFCH transmission carrying the HARQ feedback, e.g., if the wireless device may be in SL DRX active time, if the wireless device receives an SCI indicating a SL transmission (e.g., a new SL transmission and/or a SL retransmission), and/or if HARQ feedback is enabled by the SCI and the cast type indicator in the SCI is set to groupcast and if positive-negative acknowledgement or negative-only acknowledgement is selected. The wireless device may (re-)start the sl-drx-HARQ-RTT-Timer for the corresponding Sidelink process in the first slot after the end of the corresponding PSFCH resource carrying the HARQ feedback when the HARQ feedback is not transmitted due to UL/SL prioritization, e.g., if the wireless device may be in SL DRX active time, if the wireless device receives an SCI indicating a SL transmission (e.g., a new SL transmission and/or a SL retransmission), and/or if HARQ feedback is enabled by the SCI and the cast type indicator in the SCI is set to groupcast and if positive-negative acknowledgement or negative-only acknowledgement is selected. A wireless device (e.g., an MAC entity of the wireless device) may (re-)start the sl-drx-HARQ-RTT-Timer for the corresponding Sidelink process, e.g., if the wireless device may be in SL DRX active time, if the wireless device receives an SCI indicating a SL transmission (e.g., a new SL transmission and/or a SL retransmission), and/or if HARQ feedback has been disabled for the MAC PDU. A wireless device (e.g., an MAC entity of the wireless device) may stop the sl-drx-RetransmissionTimer for the corresponding Sidelink process, e.g., if the wireless device may be in SL DRX active time, if the wireless device receives an SCI indicating a SL transmission (e.g., a new SL transmission and/or a SL retransmission).

A wireless device (e.g., an MAC entity of the wireless device) may stop sl-drx-onDurationTimer for the Source Layer-2 ID and Destination Layer-2 ID pair of a unicast, e.g., if the wireless device receive a SL DRX Command MAC CE is received for the Source Layer-2 ID and Destination Layer-2 ID pair of a unicast. The wireless device may stop sl-drx-InactivityTimer for the Source Layer-2 ID and Destination Layer-2 ID pair of a unicast, e.g., if the wireless device receive a SL DRX Command MAC CE is received for the Source Layer-2 ID and Destination Layer-2 ID pair of a unicast.

The amount of data traffic carried over cellular networks is expected to increase for many years to come. The number of users/devices is increasing, and each user/device accesses an increasing number and variety of services, e.g., video delivery, large files, images. This requires not only high capacity in the network, but also provisioning of very high data rates to meet customer expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

Similar to the LAA feature introduced in LTE, the NR-U (e.g., in Rel-16 and Rel-17), the motivation and primary use of unlicensed spectrum is to expand 3GPP technologies into more vertical domains to support wider applications, enabling new services and creating more wireless product types. By not restricting to always rely on operator licensed carriers or dedicated carriers for V2X/D2D or Public Safety, which may not be always available depending on network deployment and availability, if devices are able to communicate directly with each other or sending out messages/signals on a frequency spectrum that is always readily available, this can be used to create exciting new services, applications and even saving lives in disaster areas (e.g. recent devastating flooding events in the US and China).

For example, sidelink in unlicensed spectrum, or a.k.a. SL-U, may be used in following applications and/or services. For example, for applications such as augmented reality (AR)/virtual reality (VR) interactive and gaming services, which often demands very low latency and high data rate communication over sidelink directly between devices. In another example, SL over unlicensed is also ideal for smart home applications, where tens of low-cost devices connecting to a central node like a customer premise equipment (CPE) within a home network to gain access to internet or just directly communicating with each other to share contents such as movies, videos, music, etc. When there are hundreds or thousands of these devices located within a cell area, it is not expected that all of these devices are to be connected to the mobile network and/or need to have the capability of supporting the Uu interface. Therefore, in order to enable these types of applications and expanding the usage of sidelink, the making use of unlicensed bands is the only choice. For wearable devices such as smart watches, bands, etc., it is already common not to have the capability to connect to a mobile network. In this case, unlicensed spectrum and sidelink connection to a smartphone is the only way for gaining access to the Internet. In another example, out of coverage network areas, such as disaster zones, rural sites, mines, deep basements, coast lines, or dangerous areas where unmanned vehicles, robots or UAVs needs to gain access into, unlicensed spectrum and NR sidelink communication is an ideal combination. In another example, IIoT/smart factory application is equally able to take an advantage of sidelink communication utilizing unlicensed spectrum. For traffic offloading from the Uu interface to sidelink in unlicensed band in a factory setting where not all communication data needs to go through a base station. Especially for coordination data messages between factory/warehouse moving equipment such that they don't collide with each other or to perform a synchronized movement between wheels. When the factory/warehouse is operating NR-U, the sidelink operation in the licensed spectrum can be dynamically control by the gNB as well. In another example, even for the cellular V2X (C-V2X) application, the current allocation of ITS spectrum in 5.9 GHz band dedicated for V2X communication only has very limited spectrum bandwidth. In some regions, total of 30 MHz while others have at most 40 MHz of bandwidth is allocated. This allocated bandwidth is to be shared at least between LTE and NR V2X. It is a well-known problem that this limited bandwidth allocation will not be able to support high data rate applications such as extended sensor data sharing and fully autonomous driving. With the local/regional regulators to increase the ITS bandwidth or designating additional spectrum for C-V2X, utilizing unlicensed spectrum is a viable option via SL carrier aggregation, where a vehicle UE transmits its essential/safety message data on the ITS band and the high data rate imaging over the unlicensed spectrum.

Increased sidelink data rate is motivated by applications such as sensor information (video) sharing between vehicles with high degree of driving automation. Commercial use cases could require data rates in excess of what is currently possible. Increased data rate can be achieved with the support of sidelink carrier aggregation and/or sidelink over unlicensed spectrum. Furthermore, by enhancing the FR2 sidelink operation, increased data rate can be more efficiently supported on FR2. While the support of new carrier frequencies and larger bandwidths would also allow to improve its data rate, the main benefit would come from making sidelink more applicable for a wider range of applications. More specifically, with the support of unlicensed spectrum and the enhancement in FR2, sidelink will be in a better position to be implemented in commercial devices since utilization of the ITS band is limited to ITS safety related applications.

Sidelink communication(s), e.g., in FIG. 17, may use radio resource(s) in an unlicensed band. For example, a sidelink BWP may be (pre-)configured in an unlicensed band/carrier. For example, a sidelink resource pool of the sidelink BWP may be (pre-)configured in an unlicensed band. For example, a base station may configure the sidelink BWP and/or the sidelink resource pool of the sidelink BWP in an unlicensed band. A first communication (e.g., UL and/or DL transmission) between a first device (e.g., a base station) and a second device (e.g., a first wireless device) via Uu interface and a second communication (e.g., sidelink transmission) between the second device (e.g., the first wireless device) and a third device (e.g., a second wireless device) via a sidelink may be performed in a same band or in different spectrum bands. For example, a wireless device may receive, from the base station, configuration parameters of communications via Uu interface and configuration parameters of communications via a sidelink. The configuration parameters may indicate that communications via Uu interface and via a sidelink are configured/scheduled in a same unlicensed band. The configuration parameters may indicate that communications via Uu interface and via a sidelink are configured/scheduled in different unlicensed bands. The configuration parameters may indicate that communications via Uu interface are configured/scheduled in a licensed band, while the communications via a sidelink are configured/scheduled in an unlicensed band. The configuration parameters may indicate that communications via Uu interface are configured/scheduled in an unlicensed band, while the communications via a sidelink are configured/scheduled in a licensed band.

In an example embodiment, Listen-before-talk (LBT) may be required for transmission in an unlicensed/shared band. A cell configured in unlicensed/shared cell may be referred to as an unlicensed/shared cell. The unlicensed/shared cell may be referred to as a LAA cell and/or a NR-U cell. The unlicensed/shared cell may be operated as non-standalone with an anchor cell in a licensed band or standalone without an anchor cell in a licensed band. LBT may comprise a clear channel assessment (CCA). For example, a carrier that is configured in the unlicensed/shared cell may be referred to as an unlicensed carrier. The base station may configure a cell on the carrier. For example, the unlicensed/shared cell may be configured on the unlicensed carrier.

For example, in an LBT procedure, equipment may apply a CCA before using the unlicensed/shared cell or channel. The CCA may comprise an energy detection (ED) that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed/shared bands, such as the 5 GHz unlicensed/shared band. Apart from regulatory requirements, carrier sensing via LBT may be one way for fairly sharing the unlicensed/shared spectrum among different devices and/or networks attempting to utilize the unlicensed/shared spectrum.

In an example embodiment, discontinuous transmission on an unlicensed/shared band with limited maximum transmission duration may be enabled. Some of these functions may be supported by one or more signals to be transmitted from the beginning of a discontinuous downlink transmission and/or a sidelink transmission in the unlicensed/shared band. Channel reservation may be enabled by the transmission of signals, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed/shared band with the discontinuous downlink transmission and/or sidelink transmission may comprise one or more of the following: detection of the downlink transmission and/or sidelink transmission in unlicensed/shared band (comprising cell identification) by wireless devices; time & frequency synchronization of wireless devices.

In an example embodiment, downlink/uplink and/or sidelink transmission and frame structure design for operation in an unlicensed/shared band may employ subframe, slot, mini-slot, and/or symbol boundary alignment according to timing relationships, e.g., across serving cells (e.g., configured on one or more carriers) aggregated by carrier aggregation. This may not imply that base station transmissions start at the subframe, (mini-)slot, and/or symbol boundary. The operation via the unlicensed/shared band may support transmitting PDCCH, PDSCH, PSBCH, PSCCH, PSSCH, and/or PSFCH, for example, when not all OFDM symbols are available for transmission in a slot according to LBT.

An LBT procedure may be employed for fair and friendly coexistence of a 3GPP system (e.g., LTE and/or NR) with other operators and/or radio access technologies (RATs), e.g., WiFi, and/or the like, operating in unlicensed/shared band. For example, a node attempting to transmit on a carrier in unlicensed/shared band may perform a CCA as a part of an LBT procedure to determine if a channel is free (e.g., idle) for use. For example, the channel may be confined within a range of frequency. For example, a regulation of a country may indicate the range of frequency that requires the LBT procedure to use the channel in the unlicensed/shared bands. For example, the channel may be 20 MHz or a multiple of 20 MHz. The channel may be referred to as an LBT band, a subband, and/or the like. The LBT procedure may comprise an ED performed by the node to determine if the channel is being free (e.g., idle) or used (e.g., occupied) for use. The wireless device may perform the ED for the range of frequency comprising the channel. For example, regulatory requirements in some regions, e.g., in Europe, specify an ED threshold such that if a node measures, detects, and/or receives energy greater than the ED threshold, the node determines that the channel is being used/occupied, e.g., by another node(s) (and/or is not free or idle for use/access). While nodes may follow such regulatory requirements, a node may optionally use a lower ED threshold for ED than that specified by regulatory requirements. A radio access technology (e.g., WiFi, LTE and/or NR) may employ a mechanism to adaptively change the ED threshold. For example, NR-U may employ a mechanism to adaptively lower the ED threshold from an upper bound. An adaptation mechanism may not preclude static or semi-static setting of the ED threshold. In an example, Category 4 LBT (CAT4 LBT) mechanism or other type of LBT mechanisms may be implemented.

In an example, if the detected energy during a CCA (e.g., initial CCA) period is lower than an ED threshold, the device may access the channel for a period referred to as Channel Occupancy Time (COT). Otherwise, the device may start an extended CCA period, in which the detected energy is again compared against the ED threshold until channel access is granted. The regulation may specify the CCA slot duration (e.g., 9 µs in the 5 GHz band, and 5 µs in the 60 GHz band), the initial and extended CCA check times (e.g., a multiple of 5 µs for initial CCA and 8+m×5 µs for extended CCA in the 60 GHz band, where m controls the backoff), and the ED threshold (e.g., −72 dBm for a 20 MHz channel bandwidth in the 5 GHz band, and −47 dBm for 40 dBm of radiated power in the 60 GHz band).

In an example, a LBT failure of a LBT procedure on the channel in an unlicensed band may indicate a channel access failure on the channel. For example, a LBT failure of a LBT procedure on the channel may indicate that the channel is not idle or is busy (e.g., occupied by another device(s) during one or more sensing slot durations (e.g., CCA periods) before a transmission via the channel (e.g., or immediately before the transmission via the channel). In an example, a LBT success of a LBT procedure on the channel may indicate a channel access success of the channel. In an example, a LBT success of a LBT procedure on the channel may indicate that the channel is idle during one or more sensing slot durations (e.g., CCA periods) before a transmission via the channels (e.g., or immediately before the transmission via channels).

Various example LBT mechanisms may be implemented. In an example, for some signals, in some implementation scenarios, in some situations, and/or in some frequencies no LBT procedure may be performed by the transmitting entity. An LBT procedure referred in example embodiment(s) may comprise Category 1 LBT, Category 2 LBT, Category 3 LBT, and/or Category 4 LBT. A type of an LBT (e.g., Category 1 LBT, Category 2 LBT, Category 3 LBT, and/or Category 4 LBT) may be indicated In an example, Category 1 (CAT1 LBT, e.g., no LBT) may be implemented in one or more cases. For example, a channel in unlicensed/shared band may be hold by a first device (e.g., for uplink, downlink, and/or sidelink transmissions). The first device may share the channel with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) without performing the CAT1 LBT.

In an example, Category 2 (CAT2 LBT that may be referred to as one-shot LBT and/or a short LBT) may be implemented. The Category 2 may be an LBT without random back-off. The duration of time determining that the channel is idle may be deterministic (e.g., by a regulation). A transmitting device (e.g., a base station in Uu interface, a wireless device in Uu interface, and/or a transmitting device in a sidelink communication) may transmit a grant (e.g., uplink grant and/or a sidelink grant) indicating a type of LBT (e.g., CAT2 LBT) to a receiving device (e.g., a base station in Uu interface, a wireless device in Uu interface, and/or a receiving device in a sidelink communication).

In an example, Category 3 (CAT3, e.g. LBT with random back-off with a contention window of fixed size) may be implemented. The LBT procedure may have the following procedure as one of its components. The transmitting device may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting device transmits on the channel.

In an example, Category 4 (CAT4, e.g. LBT with random back-off with a contention window of variable size) may be implemented. The transmitting device may draw a random number N within a contention window. The size of contention window may be specified by the minimum and maximum value of N. The transmitting device may vary the size of the contention window when drawing the random number N. The random number N may be used in the LBT procedure to determine the duration of time that the channel is sensed to be idle before the transmitting device transmits on the channel.

In an example, a transmission burst(s) may comprise a continuous (unicast, multicast, broadcast, and/or combination thereof) transmission on a carrier component (CC). A first transmission burst(s) may be a continuous transmission from a first device (e.g., a base station in Uu interface, a wireless device in Uu interface, and/or a transmitting device in a sidelink communication) to a second device (e.g., a base station in Uu interface, a wireless device in Uu interface, and/or a receiving device in a sidelink communication) on the channel of the CC in an unlicensed/shared band. A second transmission burst(s) may be a continuous transmission from the second device (e.g., a base station in Uu interface, a wireless device in Uu interface, and/or a transmitting device in a sidelink communication) to the first device (e.g., a base station in Uu interface, a wireless device in Uu interface, and/or a receiving device in a sidelink communication) on the channel of the CC in the unlicensed/shared band. In an example, the first transmission burst(s) and the second transmission burst(s) on the channel in the unlicensed/shared band may be scheduled in a TDM manner over the same unlicensed/shared band. Switching between the first transmission burst and the second transmission burst(s) may require an LBT (e.g., CAT1 LBT, CAT2 LBT, CAT3 LBT, and/or CAT4 LBT). For example, an instant in time may be part of the first transmission burst or the second transmission burst.

COT sharing may comprise a mechanism by which one or more devices share a channel, in an unlicensed/shared band, that is sensed as idle by at least one of the one or more devices. For example, one or more first devices may occupy the channel via an LBT (e.g., the channel is sensed as idle based on CAT4 LBT) and one or more second devices may use and/or share, for a transmission of the one or more second devices, the channel using a particular type of an LBT within a maximum COT (MCOT) limit.

In an example, various of LBT types may be employed for Channel occupancy time (COT) sharing. A transmitting device (e.g., a base station in Uu interface, a wireless device in Uu interface, and/or a transmitting device in a sidelink communication) may transmit a grant (e.g., uplink grant and/or a sidelink grant) to a receiving device (e.g., a base station in Uu interface, a wireless device in Uu interface, and/or a receiving device in a sidelink communication). For example, the grant (e.g., uplink grant and/or a sidelink grant) may indicate a trigger of the COT sharing and/or a type of LBT (e.g., CAT1 LBT, CAT2 LBT, CAT2 LBT, and/or CAT2 LBT) to be used for the receiving device during the COT acquired and/or shared by the transmitting device.

In an example, a regulation of certain region(s), e.g., Europe and Japan may prohibit continuous transmission in the unlicensed band and may impose limits on the COT, e.g., the maximum continuous time a device may use the channel. The maximum continuous time in which the device gains an access based on LBT procedure and uses the channel may be referred to as a maximum channel occupancy time (MCOT). The MCOT in the 5 GHz band may be limited to a certain period, e.g., 2 ms, 4 ms, or 6 ms, depending on the channel access priority class, and it may be increased up to 8-10 ms. The MCOT in the 60 GHz band may be 9 ms. For example, the regulation (e.g., for the 5 GHz and 60 GHz bands) may allow the device (e.g., a wireless device of a Uu interface and/or a transmitting wireless device in a sidelink communication) to share the COT with the associated devices. For example, the associated device may be a wireless device and/or a base station in the Uu interface. For example, the associated device may be a wireless device of the sidelink (e.g., unicast, multicast, and/or broadcast) communication. For example, the device may get an (e.g., initial) access to the channel through the LBT procedure, e.g., for COT (or MCOT). The device may transmit, to the associated device, a control message and/or a control signal indicating sharing the COT (or MCOT) with the associated device and/or remaining time of the COT, and starting/ending times (e.g., in terms of symbol(s), slot(s), SFN(s), and/or a combination thereof) of the COT that the associated device to use/share the channel. The associated device may skip (e.g., may not perform) the CCA check and/or may perform Category 1 LBT procedure on the channel during the shared COT. The associated wireless device may transmit data via the channel during the shared COT based on a particular LBT type. The particular LBT type may comprise Category 1, Category 2, Category 3, and/or Category 4. For example, the MCOT may be defined and/or configured per priority class, logical channel priority, and/or device specific.

In an example, a first device may gain an access through the LBT procedure for a first (e.g., UL, DL, and/or sidelink) transmission in an unlicensed band. If the first device shares, with a second device, the channel, the second device may perform a second (e.g., UL, DL, and/or sidelink) transmission with a dynamic grant and/or a configured grant (e.g., Type 1 and/or Type2) with a particular LBT (e.g., CAT2 LBT) that the second device performs on a channel shared by a first device. The second device may use and/or occupy, e.g., by performing UL, DL, and/or sidelink transmission, the channel during the COT. For example, the first device performing the first transmission based on a configured grant (e.g., Type 1, Type2, autonomous UL) may transmit a control information (e.g., DCI, UCI, SCI, and/or MAC CE) indicating the COT sharing. The COT sharing may comprise switching, within a (M) COT, from the first transmission (e.g., UL, DL, and/or sidelink transmission) of the first device to the second transmission (e.g., UL, DL, and/or sidelink transmission) of the second device. A starting time of the second transmission in the COT sharing, e.g., triggered by the first device, may be indicated in one or more ways. For example, one or more parameters in the control information may indicate the starting time of the COT sharing at which the second device starts to access the channel and/or an ending time of the COT sharing at which the second device terminates/ends to use the channel. For example, resource configuration(s) of configured grant(s) may indicate the starting time and/or the ending time.

In an example, single and/or multiple switching of transmissions within a shared COT may be supported. For example, a switching of transmissions within the shared COT may comprise switching from the first transmission (e.g., UL, DL, and/or sidelink transmission) of the first device to the second transmission (e.g., UL, DL, and/or sidelink transmission) of the second device within the shared COT. A type of LBT required/performed, by the second device, for the second transmission may be different depending on a time gap between the first transmission and the second transmission. The time gap may be referred to as a COT gap. For example, the second wireless device may perform CAT1 LBT (e.g., may not perform or may skip LBT procedure) for the second transmission switched from the first transmission within the shared COT, e.g., if the time gap is less than a first time value, e.g., 16 μs. For example, the second wireless device may perform CAT2 LBT for the second transmission switched from the first transmission within the shared COT, e.g., if the time gap is longer than the first time value and does not exceed a second time value, e.g., 25 μs. For example, the second wireless device may perform CAT2 LBT for the second transmission switched from the first transmission within the shared COT, e.g., if the time gap exceeds the second time value. For example, the second wireless device may perform CAT4 LBT for the second transmission switched from the first transmission within the shared COT, e.g., if the time gap exceeds the second time value.

A sidelink resource of a sidelink communication may be configured in an unlicensed band. For example, a first wireless device may perform, during a period in one or more symbols, an LBT procedure on a channel comprising a sidelink resource (e.g., comprising PSBCH, PSCCH, PSSCH, and/or PSFCH) via which the first wireless device schedules (or is scheduled) to transmit a data and/or a signal to a second wireless device. For example, the LBT procedure may start during a first symbol that is at least one symbol or a certain period (e.g., in terms of u or ms) before and/or prior to a starting symbol of the sidelink resource (and/or a starting symbol of the transmission of the data and/or the signal). For example, the LBT procedure may end before and/or prior to the starting symbol of the sidelink resource (and/or the starting symbol of the transmission of the data and/or the signal). The wireless device may not transmit, via the sidelink resource (e.g., comprising PSBCH, PSCCH, PSSCH, and/or PSFCH), the data and/or the signal to the second wireless device, e.g., in response to the LBT procedure indicating the channel is busy. The wireless device may transmit, via the sidelink resource (e.g., comprising PSBCH, PSCCH, PSSCH, and/or PSFCH), the data and/or the signal to the second wireless device, e.g., in response to the LBT procedure indicating the channel is idle.

For example, the first wireless device may determine an AGC symbol located before or prior to a starting symbol of the PSBCH, PSCCH, PSSCH, and/or PSFCH via which the first wireless device schedules (or is scheduled) to transmit the data and/or the signal to the second wireless device. For example, the AGC symbol may be located one symbol before the starting symbol of sidelink resource (e.g., PSBCH, PSCCH, PSSCH, and/or PSFCH). Referring to FIG. 19, the AGC symbol is the second symbol in the slot (e.g., one symbol before a starting symbol (e.g., the third symbol in the slot) of a PSCCH (in the third, fourth and the fifth symbols in a subchannel in the slot) and/or a starting symbol (e.g., the third symbol in the slot) of PSSCH (e.g., from the third symbol to the eighth symbol in the slot), and/or a starting symbol (e.g., the tenth symbol in the slot) of a PSFCH (e.g., the eleventh symbol in the slot). For example, the first wireless device may start the LBT procedure at least one symbol or a certain period (e.g., in terms of μ or ms) before and/or prior to a starting symbol of the AGC symbol. For example, the first wireless device may end the LBT procedure at least one symbol or a certain period (e.g., in terms of μ or ms) before and/or prior to a starting symbol of the AGC symbol. For example, referring to FIG. 19, the first wireless device may start the LBT procedure.

For example, the LBT procedure may start during a first symbol that is at least one symbol or a certain period (e.g., in terms of μ or ms) before and/or prior to a starting symbol of the AGC symbol (e.g., located one symbol before the PSCCH, PSSCH, and/or PSFCH in FIG. 19). For example, the LBT procedure may end before and/or prior to the starting symbol. The wireless device may not transmit, via the AGC symbol, an AGC signal (e.g., that is for the second wireless device to determine/adjust/train parameter values of its AGC) to the second wireless device, e.g., in response to the LBT procedure indicating the channel is busy. The wireless device may transmit, via the AGC symbol, the AGC signal to the second wireless device, e.g., in response to the LBT procedure indicating the channel is idle.

A wireless device may receive message(s) comprising configuration parameters of one or more sidelink resource pools configured in an unlicensed spectrum. The wireless device may select and/or determine a sidelink resource pool from the one or more sidelink resource pools for a sidelink transmission and/or a sidelink reception in the unlicensed spectrum. The wireless device may select and/or a sidelink resource from the sidelink resource pool for the sidelink transmission and/or sidelink reception in the unlicensed spectrum.

In an example, a first wireless device may be a transmitting wireless device of one or more sidelink transmissions. A second wireless device may be a receiving wireless device of the one or more sidelink transmissions. For example, the second wireless device may be a desired/intended receiver of the one or more sidelink transmissions. For example, a SCI (e.g., a second-stage SCI) scheduling the one or more sidelink transmissions may comprise/indicate an ID (e.g., destination ID) of the second wireless device indicating that the second wireless device is a desired/intended/destination receiver of the one or more sidelink transmissions. For example, the second wireless device may not be a desired/intended receiver of the one or more sidelink transmissions, e.g., if a SCI (e.g., a second-stage SCI) scheduling the one or more sidelink transmissions may not comprise/indicate an ID (e.g., destination ID) of the second wireless device. For example, the second wireless device that is not a desired/intended receiver of the one or more sidelink transmissions may be a device that monitors and/or receives the SCI (e.g., comprising an ID (e.g., destination ID) of another wireless device) transmitted by the first wireless devices using the one or more sidelink resource pools. In an example, the one or more sidelink transmissions may comprise PSCCH and/or PSSCH transmissions. In an example, the one or more sidelink transmissions may comprise one or more unicast transmissions, one or more groupcast transmissions, and/or one or more broadcast transmissions.

A base station and/or a wireless device may transmit a message to the first wireless device. The message may comprise an RRC message, SIB, a MAC CE, DCI, and/or SCI. The message may comprise a field indicating/config-uring one or more sidelink resource pools in a sidelink BWP. The message may further indicate/configure (e.g., frequency location of) the sidelink BWP in a frequency band, e.g., an unlicensed band. In an example, the sidelink BWP may be in an unlicensed/shared spectrum/carrier/band/cell with a plurality of RATs (e.g., wifi, etc.). The one or more sidelink resource pools and/or sidelink BWP may be pre-configured to the first wireless device. A bandwidth of the frequency band may be at least as wide as (e.g., wider than or equal to) a minimum regularized bandwidth in a respective unlicensed band. In an example, the message transmitted by the base station and/or the wireless device may comprise/indicate a threshold indicating a bandwidth (e.g., a minimum band-width). The bandwidth indicated by the threshold may be wider than or equal to the minimum regularized bandwidth in the unlicensed spectrum. In an example, the threshold indicating the bandwidth may be pre-configured to the first wireless device. In an example, the frequency band may have a frequency band identifier (ID)/index. Each of the one or more sidelink resource pools (e.g., in the frequency band) may have a sidelink resource pool ID/index. The message, received by the first wireless device and/or the second wireless device from the base station and/or the wireless device, may comprise/indicate/configure the frequency band ID/index and the sidelink resource pool ID/index for the each of the one or more sidelink resource pools in the frequency band. The message may comprise/indicate/con-figure a mapping (e.g., an association) between the fre-quency band and the one or more sidelink resource pools in the frequency band. The mapping may indicate that the ID/index of the frequency band is associated with the IDs/Indexes of the one or more sidelink resource pools in the frequency band. In an example, the frequency ID/index, the sidelink resource pool IDs/indexes of the one or more sidelink resource pools in the frequency band, and/or the mapping between the frequency band and the one or more sidelink resource pools in the frequency band may be pre-configured to the first wireless device and/or the second wireless device. The first wireless device may select, from the one or more sidelink resource pools, a sidelink grant comprising one or more resources for the one or more sidelink transmissions. The first wireless device may select the sidelink grant based on a resource selection procedure in the frequency band (e.g., unlicensed band). In an example, the resource selection procedure may comprise at least one of sensing procedures and/or actions described in FIG. 25, FIG. 26, and/or FIG. 27.

A sidelink resource pool may be confined within an unlicensed band. The unlicensed band may comprise a channel having a bandwidth (e.g., a range of frequency) requiring an LBT procedure. For example, a wireless device determine/select the sidelink resource pool and determine/select a sidelink resource among one or more sidelink resources of the sidelink resource pool. The wireless device may perform the LBT on the channel. The bandwidth may comprise one or more subchannel of the sidelink resource. The sidelink BWP comprising the sidelink resource pool may be confined in the unlicensed band. The sidelink BWP comprising the sidelink resource pool may be confined in the unlicensed band.

Figure 29:
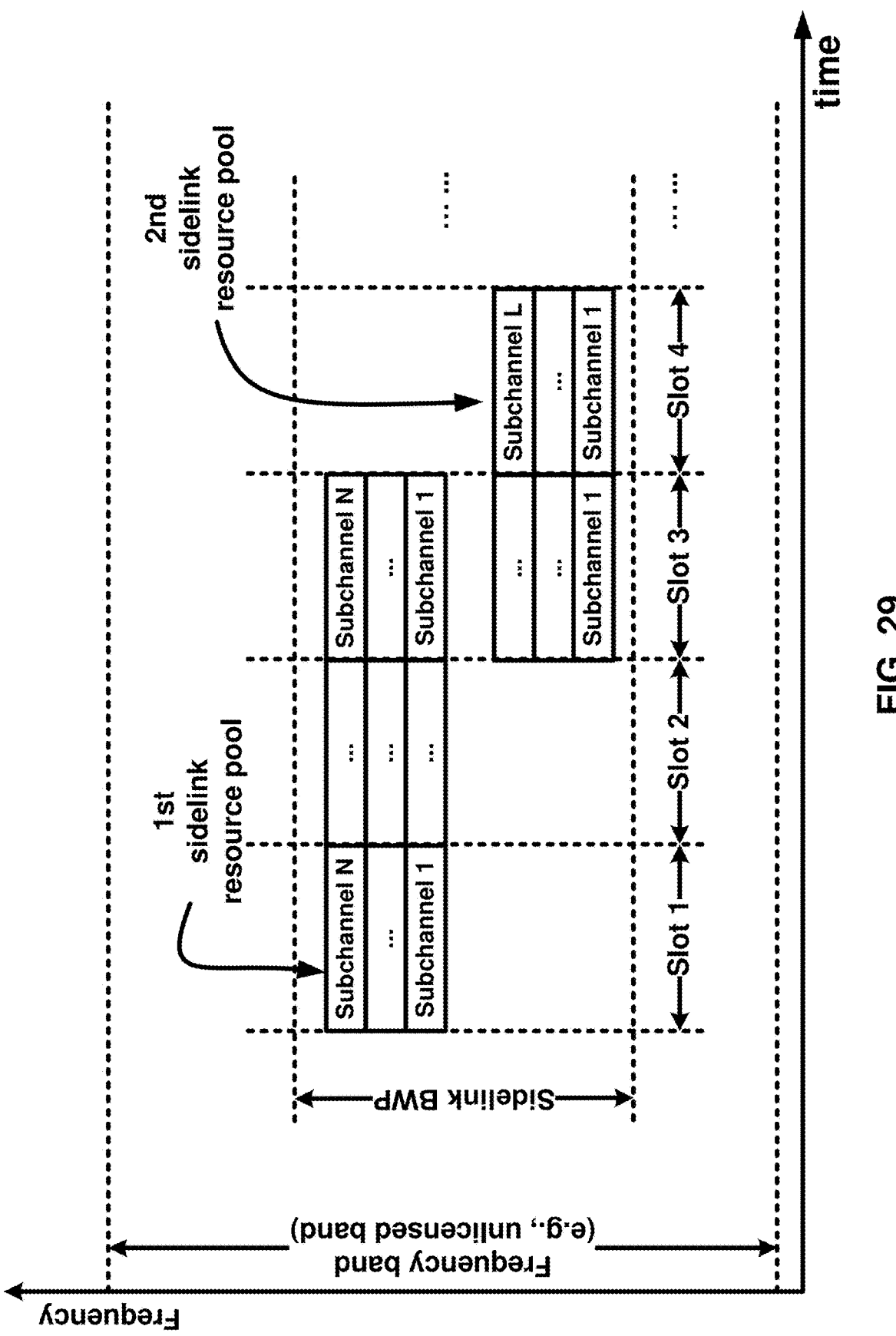
FIG. 29 illustrates an example configuration of a sidelink resource pool in a frequency band as per an aspect of an example embodiment of the present disclosure.

FIG. 29 illustrates an example configuration of a sidelink resource pool in a frequency band as per an aspect of an example embodiment of the present disclosure. In FIG. 29, a sidelink resource pool may refer to the one in FIG. 18. For example, a wireless device may receive a message (e.g., RRC message and/or a SIB) from a base station and/or another wireless device. The message may comprise con-figuration parameters of sidelink BWP. The configuration parameters may indicate a bandwidth (e.g., and/or frequency size) of the sidelink BWP. The configuration parameters may indicate a first sidelink resource pool is configured in the sidelink BWP. The configuration parameters may indicate that the sidelink BWP is confined and/or configured in a particular frequency band (e.g., unlicensed band). For example, the size of the sidelink BWP may be equal to or smaller than a minimum regularized bandwidth for which the wireless device performs an LBT procedure to gain access on a channel. For example, the size of the sidelink BWP may be smaller than or equal to 20 MHz, e.g., the particular frequency band is an unlicensed band in 5 GHz, 6 GHZ, and/or FR1 band. For example, the configuration parameters may further indicate a second sidelink resource pool is configured in the sidelink BWP. A first sidelink resource of the first sidelink resource pool may overlap in time with a second sidelink resource of the second sidelink resource pool, e.g., Slot 3 in FIG. 29.

Figure 30:
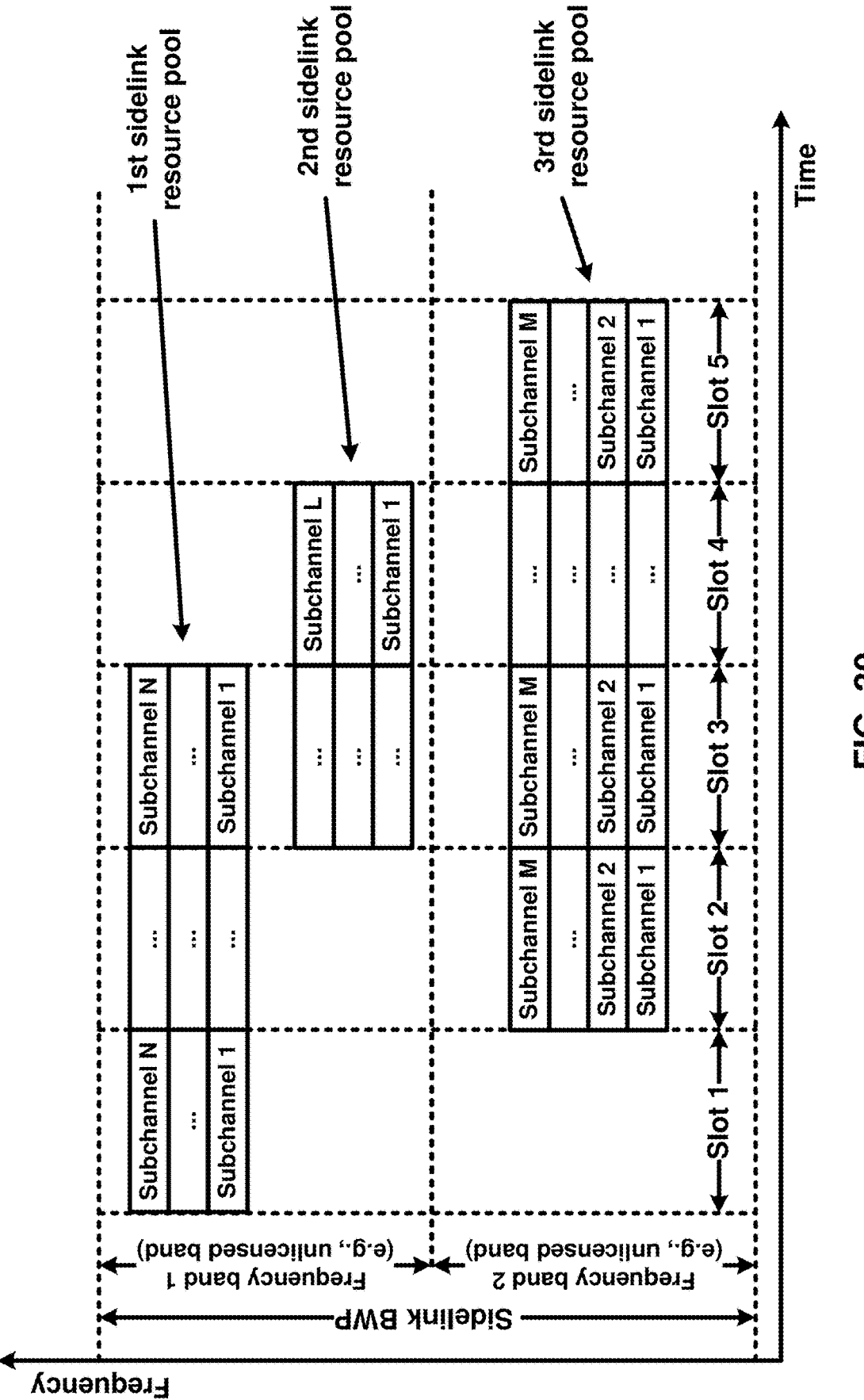
FIG. 30 illustrates an example configuration of a sidelink resource pool in a frequency band as per an aspect of an example embodiment of the present disclosure.

FIG. 30 illustrates an example configuration of a sidelink resource pool in a frequency band as per an aspect of an example embodiment of the present disclosure. In FIG. 30, a sidelink resource pool may refer to the one in FIG. 18. For example, a wireless device may receive a message (e.g., RRC message and/or a SIB) from a base station and/or another wireless device. The message may comprise con-figuration parameters of sidelink BWP. The configuration parameters may indicate a bandwidth (e.g., and/or frequency size) of the sidelink BWP. For example, the sidelink BWP may be a wideband sidelink BWP that has a bandwidth larger than a minimum regularized bandwidth for which the wireless device performs an LBT procedure to gain access on a channel. For example, the sidelink BWP may be larger than 20 MHz. The configuration parameters may indicate that one or more sidelink resource pools are configured in the sidelink BWP. The configuration parameters may indi-cate that each of the one or more sidelink resource pools is confined and/or configured in a respective frequency band (e.g., unlicensed band). In FIG. 30, three sidelink resource pools are in a sidelink BWP. The sidelink BWP may comprise a frequency band 1 (e.g., unlicensed band 1) and a frequency band 2 (e.g., unlicensed band 2). The first sidelink resource pool and the second sidelink resource pool may be confined in the frequency band 1. The third sidelink resource pool may be confined in the frequency band 2. The frequency band 1 (e.g., unlicensed band 1) and the frequency band 2 (e.g., unlicensed band 2) may require different and/or independent LBT procedures. For example, the wireless device may perform a first LBT procedure that may indicate a channel of frequency band 1 being idle in Slot 3. For example, the wireless device may transmit, in response to the channel of frequency band 1 being idle in Slot 3, a sidelink data via a sidelink resource selected from the first sidelink resource pool or the second sidelink resource pool that are configured in the frequency band 1. For example, the wireless device may not transmit, in response to the channel of frequency band 1 being idle in Slot 3, a sidelink data via a sidelink resource selected from the third sidelink resource pool that are configured in the frequency band 2. Transmit-ting a sidelink data via a sidelink resource selected from the third sidelink resource pool that are configured in the frequency band 2 may require a second LBT procedure.

For operation of sidelink in unlicensed spectrum (SL-U), multi-consecutive slots transmission (MCSt) and/or sidelink burst transmission may be supported. MCSt may be used to reduce the need and/or frequency of UE performing LBT to access the channel once it has acquired a COT, to retain the COT to transmit UE's data as much as possible, and/or to be able to transmit UE's data as soon as possible in the following slot.

Figures 31A, 31B:
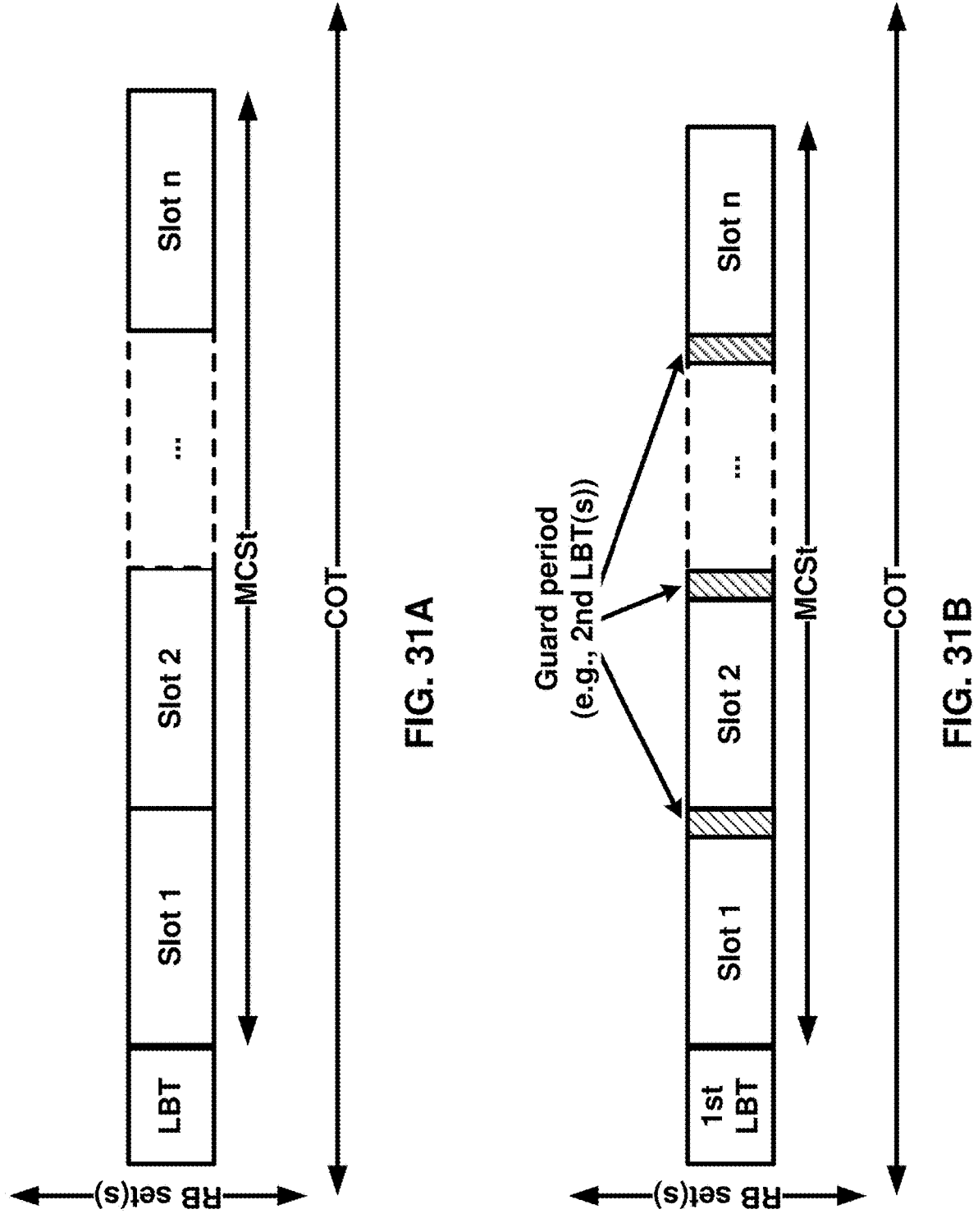
FIG. 31A and FIG. 31B illustrate examples of a multi-consecutive (e.g., multiple consecutive) slots transmission (MCSt) on an unlicensed/shared spectrum/band/cell/carrier.

FIG. 31A and FIG. 31B illustrate examples of a multi-consecutive (e.g., multiple consecutive) slots transmission (MCSt) on an unlicensed/shared spectrum/band/cell/carrier.

In an example of FIG. 31A, a MCSt may comprise n consecutive time slots in time domain. The n consecutive time slots may be physical consecutive time slots or logical consecutive time slots in a resource pool. The n consecutive time slots may be within one or more COT duration (e.g., within MCOT). The MCSt may comprise one or more RB sets (e.g., LBT subbands) in frequency domain.

For example, a physical slot may be any slot comprising 14 OFDM symbols based on the given numerology (based on the SCS of the SL BWP). For example, a logical slot may be a physical slot that is configured for sidelink operation. For example, some physical slots may not be configured for SL operation and may not be logical slots.

In an example, any two adjacent time slots of the n consecutive time slots for the MCSt may not have a time gap (e.g., guard period) in between. In an example, a time gap between any two adjacent time slots of the n consecutive time slots for the MCSt may not be larger than a threshold (e.g., 16 us or 25 us, etc.). Based on the regulations of unlicensed spectrum, if the time gap between any two transmissions is longer than the threshold, the transmissions are considered as two separate transmissions (e.g., not consecutive/contiguous transmissions and/or not a burst transmission), and the transmitter must perform separate LBT procedures (e.g., separate/independent Type 1 LBT procedures) for each of the transmissions. While, for any two transmissions without a gap between them and/or with a gap shorter than the threshold between them, a single LBT procedure (e.g., Type 1 LBT procedure) may be performed at/for the earliest transmissions and the following consecutive transmissions in the burst may follow with no LBT procedure or short LBT procedure (e.g., Type 2A/2B/2C LBT procedure). Therefore, the transmitter UE may have a higher chance of successfully accessing the channel and transmitting multiple transmissions in a burst and contiguously using consecutive resources without gaps (or gaps shorter than the threshold). MCSt resources or MCSt occasion may be configured and/or used to facilitate such burst transmission using consecutive resources and based on a single LBT procedure (e.g., a single Type 1 LBT procedure, if any).

In the example of FIG. 31A, before performing the MCSt during the n consecutive time slots, a transmitting wireless device of the MCSt performs a LBT procedure (e.g., Type 1 LBT procedure) over the one or more RB sets of the MCSt. In an example, the transmitting wireless device may transmit one or more TBs via the MCSt resource using the n consecutive time slots based on a LBT success of the LBT procedure (e.g., idle channel) over the one or more RB sets of the MCSt. In an example, the transmitting wireless device may not transmit one or more TBs via the MCSt using the n consecutive time slots based on a LBT failure of the LBT procedure (e.g., busy channel) over the one or more RB sets of the MCSt. In an example, the transmitting wireless device may transmit one or more TBs via a remainder of the MCSt resources using the n−1 consecutive time slots (e.g., slot 2 to slot n) based on a LBT failure of the first LBT procedure over the one or more RB sets of the MCSt prior to slot 1, and based on a LBT success of a second LBT procedure over the one or more RB sets of the MCSt prior to slot 2. The wireless device may have up to n chances of LBT procedures for transmitting via at least one slot of the MCSt resource (e.g., for starting the burst transmission via MCSt). The LBT procedure may be a Type 1 (e.g., for COT initializing) or a Type 2 (e.g., for COT sharing) channel access procedure.

The transmitting wireless device may not perform a LBT procedure during the MCSt based on no/zero time gap (e.g., guard period) between any two adjacent time slots of the n consecutive time slots in the MCSt. The transmitting wireless device may perform a short LBT procedure (e.g., Type 2A/2B/2C LBT) during the MCSt based on no/zero/small (e.g., less than a threshold) time gap (e.g., guard period) between any two adjacent time slots of the n consecutive time slots in the MCSt. In an example, the MCSt may comprise a plurality of RB sets (e.g., LBT subbands) in frequency domain. The transmitting wireless device may perform a LBT procedure for each of the plurality of RB sets before transmitting the MCSt via the plurality of RB sets. The transmitting wireless device may determine a LBT success for the plurality of RB sets based on the LBT procedure for the each of the plurality of RB sets being succeed.

In an example of FIG. 31B, a MCSt may comprise n consecutive time slots in time domain. The n consecutive time slots may be physical consecutive time slots or logical consecutive time slots in a resource pool. The n consecutive time slots may be within a COT duration (e.g., within MCOT). The MCSt may comprise one or more RB sets (e.g., LBT subbands) in frequency domain. Two adjacent time slots of the n consecutive time slots for the MCSt may have a time gap (e.g., guard period/empty resource without transmission/reception) in between. An earlier time slot of the two adjacent time slots may comprise the one or more RB sets in frequency domain. A later time slot of the two adjacent time slots (e.g., after the earlier time slot of the two adjacent time slots) may comprise the one or more RB sets or a subset of the one or more RB sets in frequency domain. The later time slot of the two adjacent time slots (e.g., after the earlier time slot of the two adjacent time slots) may not have more RB set than the one or more RB sets of the earlier time slot of the two adjacent time slots.

Before transmitting via the MCSt during the n consecutive time slots, a transmitting wireless device of the MCSt may perform a first LBT procedure over the one or more RB sets of the MCSt. In an example, the transmitting wireless device may transmit via the MCSt using the n consecutive time slots based on the first LBT procedure being successful (e.g., indicating idle channel) over the one or more RB sets of the MCSt. In an example, the transmitting wireless device may not transmit via the MCSt using the n consecutive time slots based on the first LBT procedure being failed (e.g., indicating busy/occupied channel) over the one or more RB sets of the MCSt. The first LBT procedure may be a Type 1 (e.g., for COT initializing) or a Type 2 (e.g., Type 2A/2B/2C for COT sharing) channel access procedure. The transmitting wireless device may perform a second LBT procedure during the MCSt based on the time gap (e.g., the guard period) between any two adjacent time slots of the n consecutive time slots in the MCSt. In an example, the second LBT procedure may be a Type 1 (e.g., for COT initializing) or a Type 2 (e.g., 2A/2B/2C for COT sharing)

channel access procedure based on a length/duration of the time gap. In an example, the MCSt may comprise a plurality of RB sets (e.g., LBT subbands) in frequency domain. The transmitting wireless device may perform a LBT procedure for each of the plurality of RB sets before transmitting the MCSt via the plurality of RB sets. The transmitting wireless device may determine a LBT success for the plurality of RB sets based on the LBT procedure for the each of the plurality of RB sets being succeed.

A transmitting UE (e.g., Tx UE) may determine a MCSt resource (e.g., multiple consecutive single-slot resources for MCSt) comprising transmission resources/occasions in multiple (e.g., a plurality of) consecutive slots. Referring to FIG. 19, a transmission resource/occasion may be a time and frequency resource for transmission of a TB and/or one or more SCIs via PSSCH and/or PSCCH in a slot. For example, the MCSt resource may comprise multiple consecutive single-slot resources for transmission of/via PSSCH/PSCCH. A single-slot resource may be a time/frequency resource within a slot for transmission of a TB/SCI via PSSCH/PSCCH.

In an example, the UE may receive an RRC message comprising sidelink configuration parameters that indicate a SL resource pool. The SL configuration parameters may comprise configuration parameters of PSSCH and PSCCH in the resource pool, e.g., indicating time resources (e.g., number of symbols in a slot) and/or frequency resources (e.g., number of RBs and/or interlaces) for PSSCH/PSCCH transmission occasions. The SL configuration parameters may indicate configuration of MCSt. For example, the SL configuration parameters may comprise a parameter indicating that MCSt is enabled in the resource pool. For example, the SL configuration parameters may comprise a parameter indicating a number, M (e.g., maximum or minimum number), of slots and/or transmission resources/occasions in a MCSt. For example, the UE may determine that a MCSt comprises (up to) M slots or PSSCH/PSCCH transmission resources/occasions.

The UE may determine a MCSt resource. A MCSt resource may comprise (up to) M consecutive/adjacent PSSCH/PSCCH transmission resources/occasions. A PSSCH/PSCCH transmission resource/occasion may be a single-slot transmission resource/occasion for transmission of a TB and/or SCI(s). In an example, the UE may receive a DCI (e.g., DCI format 3_0) indicating the MCSt resource, e.g., when operating in mode 1. In an example, the UE may select the MCSt resource based on an MCSt resource selection procedure or based on M single-slot resource selection procedure, e.g., when operating in mode 2.

In an example, the MCSt resource may be for transmission (e.g., repetition or retransmission) of a single TB. For example, the DCI and/or higher layer (e.g., RRC parameters) may indicate that the MCSt resource is for a single TB transmission. The UE may determine a first TB (MAC PDU) and map the first TB to each of the M transmission occasions of the MCSt resource. For example, the UE may transmit the first TB and M−1 repetitions of the first TB via the MCSt resource.

In an example, the MCSt resource may be for transmission of multiple TBs. For example, the DCI and/or higher layer (e.g., RRC parameters) may indicate that the MCSt resource is for multiple TB transmission. The UE may determine M TBs (MAC PDUs) and map each TB of the M TBs to one or more of the M transmission occasions of the MCSt resource. For example, the UE may transmit M TBs via the MCSt resource. For example, the UE may transmit a first TB via a first transmission occasion of the MCSt in a first slot, a second TB via a second transmission occasion of the MCSt in a second slot, and so on.

Figure 32:
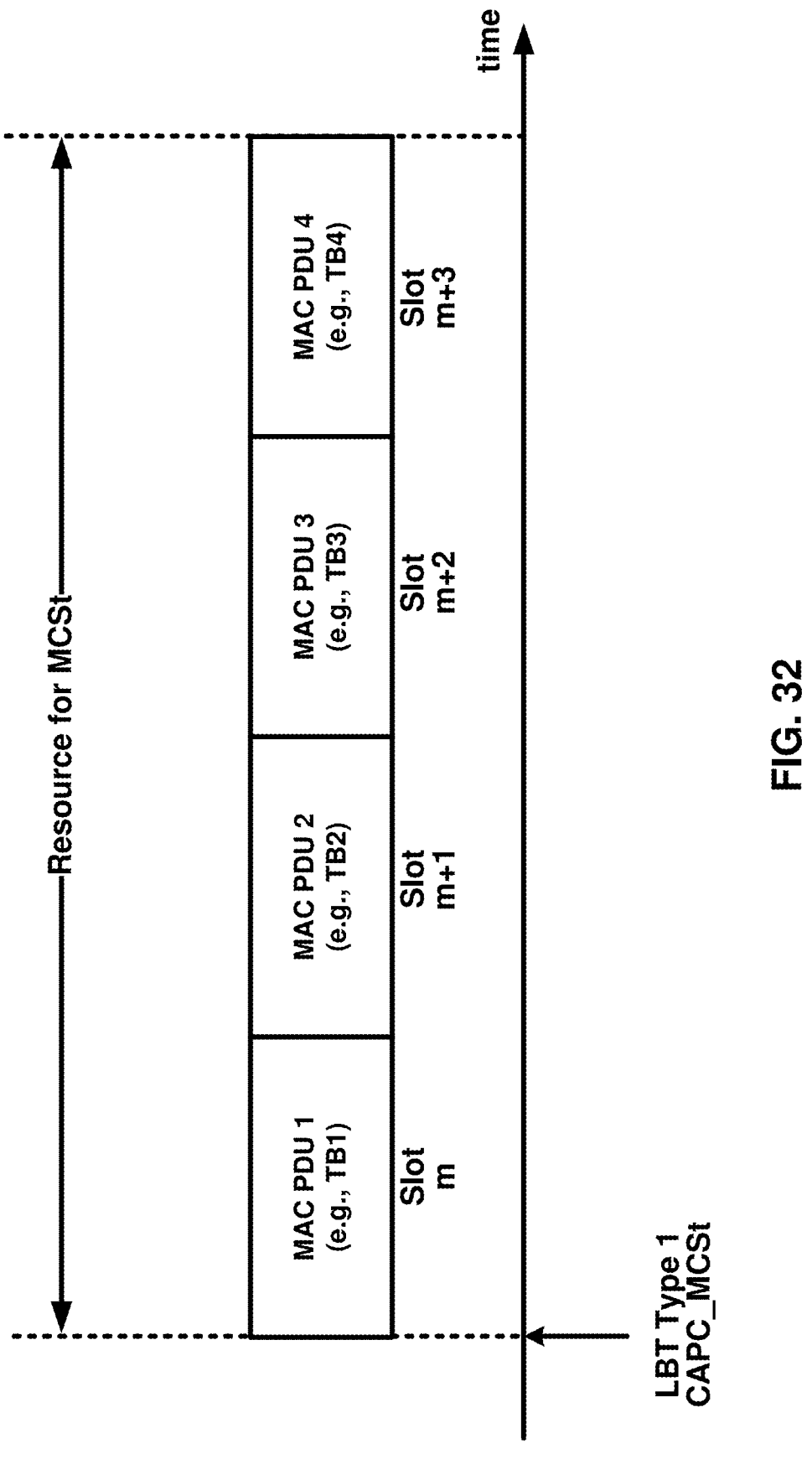
FIG. 32 shows an example of MCSt with multiple TBs.

FIG. 32 shows an example of MCSt with multiple TBs. In this example, the UE determines time/frequency resources for a MCSt, e.g., a MCSt resource/occasion. A MCSt resource (e.g., MCSt occasion) may comprise multiple consecutive single-slot resources. For example, the UE may receive a DCI comprising a sidelink grant. The sidelink grant may comprise a MCSt resource. For example, the UE may select a MCSt resource. For example, the UE may select multiple consecutive single-slot resources for the MCSt (e.g., the MCSt resource). In the example of FIG. 32, the MCSt resource comprises four single-slot PSSCH/PSCCH transmission resources in four consecutive slots: slot m to slot m+3. In this example, the UE generates a first MAC PDU (MAC PDU 1 or TB1) for/corresponding to the first single-slot PSSCH transmission occasion in slot m. The UE generates a second MAC PDU (MAC PDU 2 or TB2) for/corresponding to the second single-slot PSSCH transmission occasion in slot m+1. The UE generates a third MAC PDU (MAC PDU 3 or TB3) for/corresponding to the third single-slot PSSCH transmission occasion in slot m+2. The UE generates a fourth MAC PDU (MAC PDU 4 or TB4) for/corresponding to the fourth single-slot PSSCH transmission occasion in slot m+3.

Each of the multiple (M) TBs or MAC PDUs transmitted via the MCSt resource may comprise data (e.g., traffic data and/or control data) of/from different logical channels. For example, the UE may multiplex data (e.g., MAC SDU(s) from a first logical channel in a first TB of the MCSt. For example, the UE may multiplex data (e.g., MAC SDU(s)) from a second logical channel and a third logical channel in a second TB of the MCSt. For example, the UE may multiplex data (e.g., MAC SDU(s) from a fourth logical channel and a MAC-CE in a third TB of the MCSt. For example, the UE may multiplex only MAC-CEs in a fourth TB of the MCSt. In an example, the first logical channel may be a sidelink traffic channel (STCH) or a sidelink control channel (SCCH). In an example, the second logical channel may be a sidelink traffic channel (STCH) or a sidelink control channel (SCCH). In an example, the third logical channel may be a sidelink traffic channel (STCH) or a sidelink control channel (SCCH). Each MAC SDU that is multiplexed in any TB of the multiple TBs that will be transmitted by MCSt (MCSt resource) may comprise sidelink traffic data from at least one SL traffic channel (STCH) or may comprise sidelink control data/message from at least one SL control channel (SCCH). Each MAC SDU that is multiplexed in any TB of the multiple TBs that will be transmitted by MCSt (MCSt resource) may comprise sidelink traffic data from at least one SL data radio bearer (SL DRB) or may comprise sidelink control data/message from at least one SL signaling radio bearer (SL SRB). For example, one or more first MAC SDUs, of a plurality of MAC SDUs of the multiple TBs/MAC PDUs that will be transmitted by MCSt, may be SCCH SDUs, and/or one or more second MAC SDUs, of the plurality of MAC SDUs, may be STCH SDUs. For example, the multiple TBs/MAC PDUs of the MCSt may comprise zero or one or more MAC CEs.

In an example, a wireless device (e.g., MAC/L2 layer of the wireless device) may trigger resource selection for a MCSt. For example, the MAC entity of the wireless device may be configured, by RRC configuration, with sidelink resource allocation mode 2. The MAC entity of the wireless device may select/determine to create a selected sidelink grant. The selected sidelink grant may be for a MCSt. The selected sidelink grant may comprise a MCSt resource, e.g., multiple consecutive single-slot resources (PSCCH/PSSCH transmission occasions). For example, the MAC entity of the wireless device may select/determine to create one or more consecutive selected sidelink grants for a MCSt. Each selected sidelink grant may comprise a single-slot resource (PSCCH/PSSCH transmission occasion).

For example, the MAC entity of a Tx wireless device may determine that sidelink data is available in one or more logical channels. For example, the MAC entity of the wireless device may determine that sidelink data is available in multiple logical channels. Each logical channel may be configured for and/or associated with a pair of source and destination (e.g., Source Layer-2 ID-Destination Layer-2 ID for unicast, and/or Destination Layer-2 ID for groupcast/ broadcast). Each logical channel may be associated with a destination UE (e.g., destination ID or Destination Layer-2 ID of one or more Rx wireless devices).

For PDU(s) (e.g., MAC PDUs, TB(s) associated with one SCI, the Tx UE may consider only logical channel with the same source-destination pair (e.g., same pair of Source Layer-2 ID-Destination Layer-2 ID) for one of unicast, groupcast, and broadcast which is associated with the pair. For example, a TB/MAC PDU may comprise data of one or more logical channels that are associated (only) with a same destination UE/ID.

In response to determining that SL data is available in multiple logical channels, and/or an RRC/SIB message indicating that MCSt is configured in a sidelink resource pool, the UE may determine to trigger a resource (re-) selection procedure for a MCSt. For example, the UE may determine to transmit a plurality of TBs/MAC PDUs via a MCSt. The plurality of TBs/MAC PDUs may be for different Rx UEs and/or destination IDs. For example, each TB of the plurality of TBs may comprise data of one or more logical channels that are associated with a destination UE/destination ID.

The resource (re-)selection procedure for MCSt may comprise determining and/or selecting a MCSt resource. A MCSt resource may comprise/be multiple consecutive resources. Each resource, of the multiple consecutive resources, may be a PSCCH/PSSCH transmission occasion. Each resource may be a single-slot resource. The MCSt resource may be a multi-slot resource. The MCSt resource may comprise/be a multi-slot resource, comprising multiple consecutive single-slot resources. The MCSt resource may comprise/be multiple consecutive single-slot resources. Each single-slot resource may comprise/be one or more subchannels/interlaces (e.g., consecutive subchannels/interlaces) of a resource pool in a slot. Each single-slot resource may be a PSCCH/PSSCH transmission occasion.

Throughout this disclosure, the terms MCSt resource, resources for MCSt, resource for MCSt, multiple consecutive resources, multi-consecutive slot resources for MSCt, and multi-slot consecutive resources, may be used interchangeably.

The resource (re-)selection procedure for MCSt may comprise determining and/or selecting resources for a MCSt. In resource allocation mode 2, the higher (e.g., MAC) layer may request the UE to determine a set/subset of resources from which the higher layer may select resources for PSSCH/PSCCH transmission(s). To trigger this procedure, the higher layer provides the following parameters for this PSSCH/PSCCH transmission(s). For example, the MAC entity of the wireless device may trigger the PHY/L1 layer of the wireless device for reporting a set/subset of candidate resources for MCSt. For example, the MAC entity may provide/indicate to the PHY/L1 layer one set of parameters for the resource selection procedure (e.g., for the MCSt or for the MCSt resource selection procedure). For example, the PHY/L1 layer may determine the set/subset of resources (e.g., candidate resources for MCSt) to be reported to higher layers (e.g., MAC Layer) based on the one set of parameters. The set of parameters may comprise at least one of: the resource pool from which the resources are to be reported; a priority (e.g., L1 priority, $prio_{TX}$); the remaining packet delay budget (PDB); the number of sub-channels to be used for the PSSCH/PSCCH transmission(s) in a slot, $L_{subCH}$; and the resource reservation interval, $P_{rsvp\_TX}$, in units of msec.

In an example, the MAC entity may determine one set of parameters for a plurality of TBs. In an example, the MAC entity may determine one set of parameters for a plurality of PSCCH/PSSCH transmissions; e.g., based on the sidelink data available in a plurality of logical channels. For example, the MAC entity may group/classify one or more TBs/PSCCH/PSSCH transmissions for a MCSt. For example, the one or more TBs/PSCCH/PSSCH transmissions may be associated with the same set of parameters, e.g., same priority and/or same PDB and/or same number of sub-channels and/or same reservation period, etc. In an example, the UE (e.g., the MAC) may determine the same set of parameters based on one or more set of parameters associated with each of the one or more TBs/PSCCH/ PSSCH transmissions (e.g., by averaging).

In an example, the MAC entity may trigger the PHY/L1 to report a set of MCSt candidate resources (e.g., multi-consecutive slot resources for MSCt). For example, the MAC entity may indicate a size/length of the MCSt to the PHY/L1. A size/length of the MCSt may indicate a number of consecutive resources (e.g., single-slot resources) for the MCSt. The size/length of MCSt may be referred to as M. The size/length of the MCSt may indicate a number of consecutive slots (e.g., single-slot resources) for the MCSt. The size/length of the MCSt may indicate a number of consecutive resources (e.g., single-slot resources) for one or more TB/PSCCH/PSSCH transmissions. The size/length of MCSt, e.g., M, may be an integer between 1 and a maximum allowable value, e.g., M_max. For example, the maximum allowable value for the size/length of MCSt may be pre-defined (e.g., 4 or 8 or etc.). For example, the maximum allowable value for the size/length of MCSt may be indicated/configured by RRC signaling. For example, the maximum allowable value for the size/length of MCSt may be based on a numerology of the resource pool and/or BWP and/or carrier.

The UE (e.g., the PHY/L1 layer of the UE) may determine a set/subset of candidate resources, $S_A$, for MCSt. In an example, the UE may report to the higher/MAC layers candidate MCSt/multi-slot resources in $S_A$. A candidate MCSt resource consists of a set of resources that are consecutive in time. A candidate multi-slot resource consists of a set of single-slot resources that are consecutive in time. For example, a candidate MCSt resource may comprise M consecutive resource. For example, a candidate multi-slot resource may comprise M consecutive single-slot resource. M may be an integer number, e.g., size/length of the MCSt, indicated by higher layers (e.g., MAC or RRC). The set of candidate resources may comprise one or more MCSt/multi-slot resources, determined based on sensing. The sensing may be based on the set of parameters indicated by higher layers (e.g., MAC or RRC). In an example, the set of single-slot resources within a candidate multi-slot resource may have a same $L_{subCH}$ size. In an example, the set of single-slot resources within a candidate multi-slot resource may have different $L_{subCH}$ sizes.

The MAC entity may select one of the candidate resources for MCSt from the set of candidate MCSt/multi-slot resources indicated by the physical layer. The MAC entity may determine/select the set/plurality of consecutive resources (e.g., single-slot resources) for transmission of one or more TBs (e.g., PSCCH/PSSCH transmissions) via the MCSt. The UE (e.g., the MAC entity of the UE) may determine/select a set of periodic resources for the PSCCH/PSSCH transmissions corresponding to a number of trans-mission opportunities of MAC PDUs. The UE (e.g., the MAC entity of the UE) may determine/consider the set/plurality of consecutive resources as a selected MCSt grant. The UE may use the selected MCSt grant to determine a set of PSCCH durations and a set of PSSCH durations. For example, the UE may determine: a first set of PSCCH durations and a first set of PSSCH durations for a first TB/PSCCH/PSSCH transmission via a first resource (single-slot resource, comprising periodic resources) of the MCSt resource/grant; a second set of PSCCH durations and a second set of PSSCH durations for a second TB/PSCCH/PSSCH transmission via a second resource (single-slot resource, comprising periodic resources) of the MCSt resource/grant; and so on. In an example, the second TB may be a repetition of the first TB. The UE (e.g., the MAC entity of the UE) may determine/consider the set/plurality of consecutive resources as a set/multiple selected grants for MCSt. The UE may use the selected MCSt grant(s) to transmit the one or more TBs via the set of PSCCH durations and the set of PSSCH durations.

In an example, the MAC entity may trigger the PHY/L1 to report a set of candidate resources (e.g., single-slot resources). The UE (e.g., the PHY/L1 layer of the UE) may determine a set/subset of candidate resources, $S_A$. In an example, the UE may report to the higher/MAC layers candidate single-slot resources in $S_A$. For example, there may be no guarantee that the set of candidate resources comprise one or more MCSt/multi-slot resources, compris-ing multiple consecutive resources (e.g., single-slot resources) for MCSt.

The MAC entity may select one of the candidate resources for MCSt, if available/found, from the set of candidate resources indicated by the physical layer. The MAC entity may select one or more of the candidate resources that are consecutive in time (e.g., in logical slots). The MAC layer of the UE may a set of single-slot resources that are consecutive in logical slots. For example, the MAC entity may consider the set of consecutive resources as a MCSt/multi-slot resource. For example, the MAC entity may use the set of consecutive resources for a MCSt.

The MAC entity of the UE may select a destination associated to one of unicast, groupcast and broadcast, that is in the SL Active time for a SL transmission occasion, e.g., if SL DRX is applied/configured for the destination. The MAC entity of the UE may select a destination associated to one of unicast, groupcast and broadcast, that has at least one of the MAC CE and the logical channel with the highest priority, among the logical channels that satisfy one or more conditions and MAC CE(s), if any, for a SL grant associated to a SCI. For example, SL data may be available for transmission in the logical channels; and/or SBj>0, in case there is any logical channel having SBj>0; and/or sl-configuredGrantType1Allowed, if configured, is set to true in case the SL grant is a Configured Grant Type 1; and/or sl-AllowedCG-List, if configured, includes the con-figured grant index associated to the SL grant; and/or sl-HARQ-FeedbackEnabled is set to disabled, if PSFCH is not configured for the SL grant associated to the SCI.

In existing technologies, and for operation with SL DRX, when the MAC entity of UE triggers PHY/L1 of UE for reporting a set/subset of candidate resources, the MAC entity indicates to the physical layer the sidelink DRX active time of the destination UE. For example, the MAC entity may determine that one or more SL DRX(s) operation are configured to the destination ID/UE(s) receiving SL-SCH data. The MAC entity may indicate to the physical layer SL DRX Active time of the destination ID of UE(s) receiving SL-SCH data. In existing technologies, the UE (e.g., the physical layer of the UE) may determine that the set of candidate resources comprises at least one candidate resource within the indicated SL DRX active time of the destination ID/UE. For example, referring to FIG. 26 and FIG. 27, after initializing the set and exclusion steps, and if sidelink DRX active time of Rx UE is provided by the higher layer, the UE checks/determines whether there is any can-didate single-slot resource remained within the sidelink DRX active time in the set $S_A$. For example, if there is no candidate single-slot resource remained within the sidelink DRX active time in the set $S_A$, the UE (e.g., based on its implementation) additionally selects and includes at least one candidate single-slot resources within the sidelink DRX active time in the set $S_A$. Therefore, the PHY ensures/guarantees that the set of candidate resources that is reported to the higher layers includes at least one candidate single-slot resource within the sidelink DRX active time. In exist-ing technologies, the MAC layer selects a resource (e.g., single-slot resource), for a PSCCH/PSSCH transmission and from the set of candidate resources, that is within the SL DRX active time of the destination UE/ID. For example, the MAC layer selects the time and frequency resources for a transmission opportunity from the resources indicated by the physical layer which occur within the SL DRX Active time of the destination UE selected for indicating to the physical layer the SL DRX Active time.

The TX UE may select initial transmission resource only in the RX UE's active time where SL DRX timers are running now or will be running in future (e.g., at least on-duration timer, and/or for all cast types). For example, for each SL grant, the Tx UE may use the grant if it is in active time of at least one destination. For example, the Tx UE may skip/drop the grant if it is not in active time of at least one destination. For example, the Tx UE may trigger resource reselection if the grant is not in active time of at least one destination.

The UE transmitting SL-SCH Data (e.g., Tx UE, source UE/ID) may keep aligned with its intended UE receiving the SL-SCH Data (e.g., Rx UE, destination UE/ID) regarding the SL DRX Active time. The UE transmitting SL-SCH Data may determine the SL DRX Active time based on SL DRX timers that are running (e.g., sl-drx-onDuration Timer, sl-drx-InactivityTimer, sl-drx-Retransmission Timer) and/or will be running in the future (e.g., sl-drx-onDuration Timer, sl-drx-InactivityTimer, sl-drx-Retransmission Timer) at the UE(s) receiving SL-SCH data (e.g., the destination UE(s)/ID). The UE may select resource for the initial transmission of groupcast within the time when sl-drx-onDuration Timer and/or sl-drx-InactivityTimer of the destination is running In existing technologies, if PSCCH duration(s) and PSSCH duration(s) for initial transmission of a MAC PDU (e.g., of a dynamic sidelink grant and/or a configured sidelink grant) is not in SL DRX Active time of the desti-nation that has data to be sent, the Tx UE may ignore/skip/drop the grant. For example, the grant may be received from the base station (e.g., mode 1). For example, the grant may be selected by the UE (e.g., mode 2). In existing technologies, if PSCCH duration(s) and PSSCH duration(s) (e.g., $2^{nd}$ stage SCI on the PSSCH) for transmissions of a MAC PDU of any selected sidelink grant(s) are not in SL DRX Active time of the destination that has data to be sent, the Tx UE may clear the selected sidelink grant associated to the sidelink process and/or trigger the TX resource (re-)selection.

In the present disclosure, a destination (e.g., referred to as a destination UE, a destination ID/UE in the present disclosure) may refer to a network logical entity that receives a sidelink data (e.g., PSSCH), a sidelink control signal (e.g., PSCCH), and/or a sidelink feedback signal (e.g., PSFCH). For example, the destination may has (e.g., is assigned from an upper layer with) a unique destination identifier (e.g., Layer-2 ID). A transmission (TB/PSCCH/PSSCH) may be to one destination ID. For example, a Rx UE may be configured/associated with one or more destination IDs (e.g., one destination ID per service/application). For example, one or more Rx UEs may be configured/associated with a same destination ID (e.g., in groupcast and/or broadcast). A destination ID may be of/associated with one or more UEs. Throughout this disclosure, the terms a destination, a destination UE, a destination identifier (ID), a destination ID of one or more UEs, a destination Layer-2 ID, may be used interchangeably. Throughout this disclosure, the term "destination" may be used to refer to a "destination ID". Throughout this disclosure, a "destination ID" may refer to "destination UE(s)". In some instances, a "destination UE" may refer to a "destination ID".

For MCSt in mode 2, the MAC entity of the UE may determine that SL data is available in multiple logical channels, e.g., each logical channel corresponding to a destination. For example, the MAC entity may determine to transmit multiple TBs/MAC PDUs, comprising the sidelink data available in the multiple logical channels, each to a different destination. For example, SL DRX may be configured in the destinations receiving the SL-SCH data. Based on existing technologies, the PHY layer of the UE guarantees that the set of candidate resources, $S_A$, includes at least one candidate resource within the SL DRX active time of the destination UE, and the MAC selects a resource, from the set, that occurs within the DRX active. However, in case of MCSt, the destinations of a MCSt may have different DRX active times. Existing technologies fail to address the resource selection for MCSt in conjunction with SL DRX operation. It is not clear that based on existing technologies, what active time should be used to determine the set of candidate resources, and what conditions should the set of candidate resource and/or the selected resource meet to enable transmission of multiple TBs (PSCCH/PSSCHs) to multiple destinations within their active times. For example, existing technologies cannot guarantee to determine the set of consecutive resources such that there is a candidate MCSt resource within SL DRX active times of corresponding destination UE(s). And thus, the likelihood of finding consecutive resources, within respective active times, for MCSt may be very low. There is a need to enhance the PHY sensing and/or MAC selection procedure to enable selecting MCSt resources within active times of respective destination UEs.

For example, if a multi-slot resource is selected for MCSt, and during one of the single-slot resources, within the multi-slot resource, no logical channel is found to have SL data available with a corresponding destination in active time, then the UE may not ignore/skip/drop that single-slot resource and/or trigger resource re-selection in the middle of the multi-slot resource. This may result in breaking the MCSt by a gap of a slot duration which is larger than the allowed gap (e.g., 16 usec or 25 usec), and thus, a COT may be lost and LBT type 1 may be needed for the following transmission, which is against the motivation of using MCSt. Therefore, to enable efficient multi-slot consecutive transmissions in unlicensed band, there is a need to enhance the existing resource selection procedure by taking into account the different DRX active times of different destinations of a MCSt. Embodiments enable a resource selection procedure for MCSt, in PHY and/or MAC of a UE, such that a chance of selecting consecutive resources for MCSt within active times of the destinations is increased.

In an example, existing technologies may require to run the sensing, exclusion, and resource selection procedure for an increased number of times in case of MCSt. This may be ineffective in terms of latency and power consumption. For example, the UE may run the sensing/selection procedure once to determine a first set of candidate resources (e.g., single-slot resources) based on a first active time of a first destination of MCSt. The UE may run the sensing/selection procedure again to determine a second set of candidate resources (e.g., single-slot resources) based on a second active time of a second destination of the MCSt, such that the candidate resources of the first set and the second set are consecutive/adjacent in time. The UE may repeat this procedure, based on existing technologies, until a multi-slot resource of size M is found for MCSt. However, the complexity of the procedure will be dramatically increased, as the UE need to run the same procedure multiple times, and need a large memory to save and process all this information at the same time. Nevertheless, there is no guarantee to finally find the desired result, as the different destinations may not be active in overlapped/adjacent times. There is a need for a simple solution with reduced complexity to enable sensing and resource selection for MCSt. Embodiments propose a solution that enables determining multi-slot candidate resources for MCSt to different destinations by using the sensing and resource selection procedure once. Embodiments considerably reduce the complexity of the MCSt resource selection procedure, and increase the chances of selecting consecutive resources within SL DRX active times of the destination UEs.

In an example, the destinations of a MCSt may have unaligned DRX active times (e.g., no overlap). For example, a first active time of a first destination and a second active time of a second destination may be such that selecting consecutive resources within respective active times is not possible. For example, the first active time and the second active time may not overlap. For example, the first destination and the second destination may not be active in any consecutive/adjacent slots.

Figure 33A:
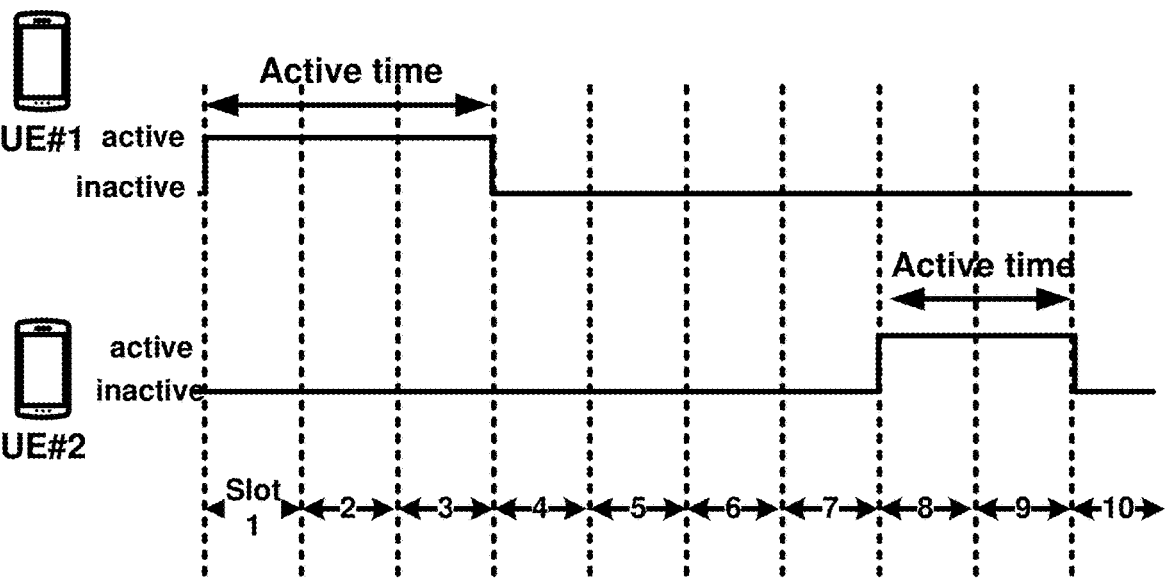
FIG. 33A and FIG. 33B show example of different SL DRX active times of destination UEs.
Figure 33B:
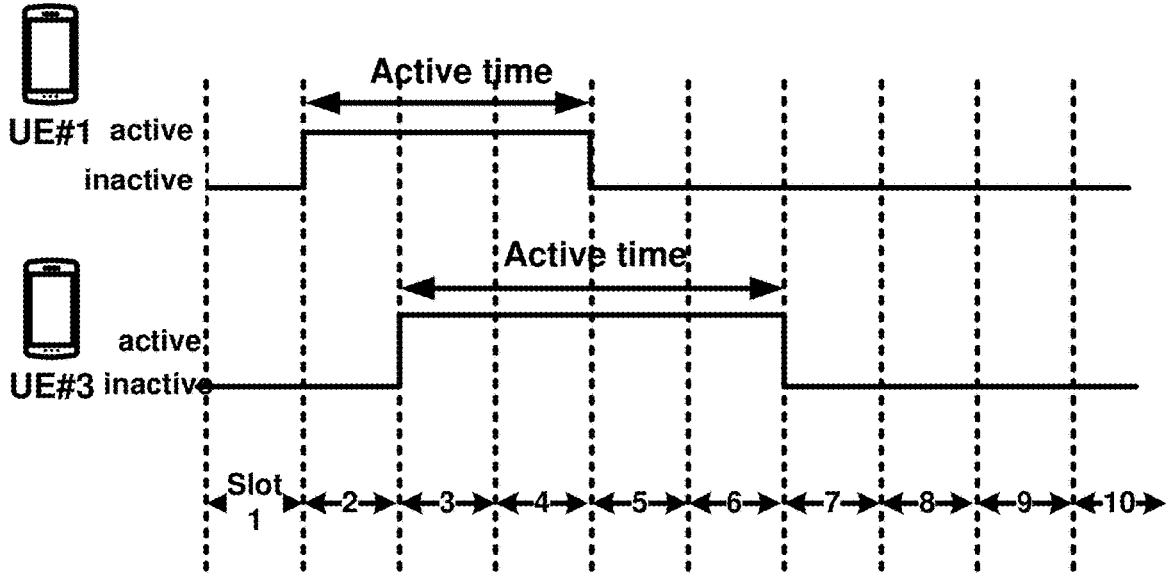

FIG. 33A and FIG. 33B show example of different SL DRX active times of destination UEs. As shown in FIG. 33A, UE #1 (e.g., the first destination ID) may be on/awake/active during slot 2 and slot 3 and slot 4, and UE #2 (e.g., the second destination ID) may be on/awake/active during slot 8 and slot 9. In this example, there are no consecutive/adjacent slots (e.g., at least 2 adjacent slots) such that each of them is within one of the first and the second active time. Therefore, the Tx UE may not be able to select any resource for MCSt, and transmission via MCSt may not be possible to these two destinations. On the other hand, in example of FIG. 33B, UE #1 (e.g., the first destination ID) is on/awake/active during slot 2 and slot 3 and slot 4, and UE #3 (e.g., the third destination ID) is on/awake/active during slot 3 and slot 4 and slot 5 and slot 6. In this example, there are some consecutive/adjacent slots (e.g., at least 2 adjacent slots) such that each of them is within one of the first and the second active time. For example, [slot 2 and slot 3], [slot 3 and slot 4], [slot 4 and slot 5] are examples of 2-slot consecutive resources for MCSt of size 2. For example, [slot 2 and slot 3 and slot 4], [slot 3 and slot 4 and slot 5] are examples of 3-slot consecutive resources for MCSt of size 3 (e.g., the MCSt may include repetition of a TB, or two TBs of a same destination). In example of FIG. 33B, the Tx UE may be able to select consecutive resources for MCSt, and transmission via MCSt may be possible to these two destinations.

Existing technologies do not consider the above issue in selecting resources for MCSt. Thus, although consecutive multi-slot resources may be found, but none of them may provide a multi-slot resource consecutively within DRX active times of the destinations of the MCSt. Embodiment propose a resource selection procedure that increases the likelihood of selecting a multi-slot resource that is consecutively within DRX active times of the destinations of the MCSt. In an embodiment, a UE may determine whether to trigger MCSt/multi-slot resource selection or single-slot resource selection based on the SL DRX active times configured for destinations of logical channels with SL data available. In an embodiment, a UE may determine/select the logical channels for MCSt and/or multi-slot resource selection based on the SL DRX active times configured for destinations of logical channels with SL data available. In an embodiment, a UE may group the logical channels (e.g., TBs and/or set of parameters for resource selection procedure) for MCSt and/or multi-slot resource selection based on the SL DRX active times configured for destinations of logical channels with SL data available. In an embodiment, a UE may determine a size/length of MCSt/multi-slot resource for the MCSt/multi-slot resource selection procedure based on the SL DRX active times configured for destinations of logical channels with SL data available. Embodiments increase the likelihood of successful MCSt within active time of corresponding destinations.

In an embodiment, a UE determines a set of candidate resources for MCSt (e.g., set of multi-slot candidate resources) based on multiple SL DRX active times of destinations. In an embodiment, the MAC entity may indicate multiple SL DRX active times of multiple destinations for MCSt to the PHY/L1 for determining the set of candidate resources. In an embodiment, PHY/L1 determines the set such that it comprises at least one candidate multi-slot resource, comprising multiple consecutive single-slot resources, and each single-slot resource is within at least one of the SL DRX active times. In an embodiment, PHY/L1 determines the set such that it comprises at least one candidate multi-slot resource, comprising multiple consecutive single-slot resources, and each single-slot resource is within one of (a respective and/or distinct) SL DRX active time of the multiple destinations. In an embodiment, PHY/L1 determines the set such that it comprises at least one candidate multi-slot resource, comprising multiple consecutive single-slot resources, and each single-slot resource is within all of the SL DRX active times of the multiple destinations. Embodiments guarantee and/or increase chances that at least one MCSt/multi-slot resource is available for MAC to select for transmission to different destinations.

In an embodiment, a UE determines a set of candidate resources for MCSt (e.g., set of multi-slot candidate resources) based on multiple SL DRX active times of destinations. In an embodiment, the MAC entity may indicate one representative SL DRX active time, of the multiple SL DRX active times of multiple destinations for MCSt, to the PHY/L1 for determining the set of candidate resources. In an embodiment, the representative SL DRX active time may be a first SL DRX active time associated with a destination/logical channel that has a higher/highest priority data (L1 priority and/or CAPC) compared to other destinations/logical channels. In an embodiment, the representative SL DRX active time may be selected randomly from the multiple SL DRX active times. In an embodiment, the representative SL DRX active time may be a union (logical OR) of the multiple SL DRX active times. In an embodiment, the representative SL DRX active time may comprise time slots/symbols/frames/subframes that at least one of the destination UEs/IDs is in SL DRX active time, other time slots/symbols/frames/subframes may be considered as inactive (e.g., if all of the destinations are in SL DRX inactive time). In an embodiment, the representative SL DRX active time may be an intersection (logical AND) of the multiple SL DRX active times. In an embodiment, the representative SL DRX active time may comprise time slots/symbols/frames/subframes that all of the destination UEs/IDs are in SL DRX active time, other time slots/symbols/frames/subframes may be considered as inactive (e.g., if at least one of the destinations is in SL DRX inactive time). Embodiments guarantee and/or increase chances that at least one MCSt/multi-slot resource is available for MAC to select for transmission to different destinations.

In an embodiment, in response to determining that there is no multi-slot resource in the set of candidate resources for MCSt that meets the SL DRX active time condition, the UE may select and include/add at least one resource (e.g., single-slot or multi-slot resource) in the set, such that the SL DRX active time condition is met. In an embodiment, the SL DRX active time condition may be based on the SL DRX active times configured for destinations of logical channels with SL data available for the MCSt. In an embodiment, the SL DRX active time condition may comprise the following: each resource (e.g., single-slot resource) of the MCSt resource (e.g., the multi-slot resource) is within at least one SL DRX active time of the multiple SL DRX active times. In an embodiment, the SL DRX active time condition may comprise the following: each resource (e.g., single-slot resource) of the MCSt resource (e.g., the multi-slot resource) is within one (e.g., respective/distinct) SL DRX active time of the multiple SL DRX active times. In an embodiment, the SL DRX active time condition may comprise the following: each resource (e.g., single-slot resource) of the MCSt resource (e.g., the multi-slot resource) is all of the multiple SL DRX active times. The multiple SL DRX active times may be indicated by MAC to PHY for the resource selection for MCS.

In an embodiment, the MAC entity may select one MCSt/multi-slot resource, form the set of candidate multi-slot resources, that meets the SL DRX active time condition. For example, the MAC entity of the UE may select a MCSt/multi-slot resource such that each resource (e.g., single-slot resource) of the MCSt resource (e.g., the multi-slot resource) is within at least one SL DRX active time of the multiple SL DRX active times. For example, the MAC entity of the UE may select a MCSt/multi-slot resource such that each resource (e.g., single-slot resource) of the MCSt resource (e.g., the multi-slot resource) is within one (e.g., respective/distinct) SL DRX active time of the multiple SL DRX active times.

In an embodiment, a wireless device (UE, e.g., Tx UE) may determine to trigger resource (re-)selection for a MCSt. The UE may determine a plurality of logical channels with SL data available. Each of the plurality of logical channels may be associated with a destination UE. For example, a first logical channel may have SL data for a first destination, a second logical channel may have SL data for a second destination, and so on. The UE may determine a plurality of TBs to be transmitted via the MCSt. For example, the UE may determine/estimate a first number/quantity of TBs (e.g., N) to be transmitted via the MCSt, e.g., based on the SL data available in the plurality of logical channels. The first number/quantity of TBs may be associated/destinated to a second number/quantity of wireless devices (e.g., Rx UEs) and/or destination IDs (e.g., N2 wherein N2=<N). The UE may consider N destinations for the N TBs or PSSCH/PSCCH transmissions via the MCSt, wherein one or more destinations of the N destinations (destination IDs) may be the same.

The UE may determine a plurality of destinations (e.g., destination UE/IDs) for the MCSt. The UE may determine the plurality of destinations for the resource (re-)selection procedure associated with the MCSt. The UE may determine/select time and frequency resources, e.g., consecutive resources in time domain, for the MCSt. For example, each resource, of the consecutive resources of the MCSt, may be used for a PSCCH/PSSCH transmission to one of the destinations (destination UEs/IDs).

The UE may determine a sidelink DRX configuration for each of the plurality of destinations. For example, the UE may configure each destination, of the plurality of destinations, with a SL DRX operation (e.g., based on SL DRX assistance information). The UE may transmit, e.g., via PC5 RRC message/signaling, a SL DRX configuration to the respective Rx UE/destination. For example, the UE may send a first RRC message comprising a first SL DRX configuration to a first destination of the plurality of destinations. For example, the UE may send a second RRC message comprising a second SL DRX configuration to a second destination of the plurality of destinations, and so on. In an example, the base station may transmit RRC messages, to the destinations, comprising respective SL DRX configurations.

A SL DRX configuration may indicate SL DRX active time and/or SL DRX inactive time of the destination (e.g., the Rx UE(s). For example, a first SL DRX configuration of a first destination (Rx UE), may comprise first parameters indicating a first SL DRX on-duration timer and/or a first SL DRX inactivity timer and/or a first SL DRX start offset and/or a first SL DRX cycle. For example, a second SL DRX configuration of a second destination (Rx UE), may comprise second parameters indicating a second SL DRX on-duration timer and/or a second SL DRX inactivity timer and/or a second SL DRX start offset and/or a second SL DRX cycle. The UE (e.g., the Tx UE) and the destination may maintain synched/aligned timers associated with the SL DRX operation of the destination. The UE (e.g., the Tx UE) and the destination may determine a DRX active time of the destination based on the respective SL DRX configuration. For example, the UE may determine a first SL DRX active time of the first destination based on the first SL DRX on-duration timer and/or the first SL DRX inactivity timer. For example, the first SL DRX active time may comprise one or more slots/frames/subframes/symbols that the first SL DRX on-duration timer and/or the first SL DRX inactivity timer are running and/or will be running in the future. For example, the UE may determine a second SL DRX active time of the second destination based on the second SL DRX on-duration timer and/or the second SL DRX inactivity timer. For example, the second SL DRX active time may comprise one or more slots/frames/subframes/symbols that the second SL DRX on-duration timer and/or the second SL DRX inactivity timer are running and/or will be running in the future.

In an embodiment, the UE (e.g., the Tx UE) may determine a size/length for the MCSt, e.g., in SL resource allocation mode 2 and/or mode 1. For example, the UE may trigger resource (re-)selection for the MCSt based on the size/length. The size/length of the MCSt may indicate a number/quantity of consecutive resources (e.g., single-slot resources) that MCSt comprise. For example, the MCSt resource (e.g., a multi-slot resource for the MCSt) may comprise the number/quantity of consecutive resources. For example, the MCSt resource may comprise M (M>1) consecutive/adjacent resources for consecutive transmission of M (M>1) TBs and/or PSCCH/PSSCHs to M (M=<N) destinations. For example, the MCSt resource may comprise M consecutive single-slot resources. For example, the MCSt resource may comprise M consecutive/adjacent slots.

In an embodiment, the UE may determine the size/length of the MCSt (or the MCSt resource), M, based on the plurality of (e.g., N) SL DRX configurations. One or more of the plurality of SL DRX configurations may be the same (e.g., associated with a same destination ID). For example, the UE may determine/estimate N TBs associated with N logical channels (with data available) and/or destinations to be transmitted via MCSt. For each TB/logical channel, the UE may determine a respective SL DRX configuration. The UE may determine a SL DRX active time associated with each TB/logical channel/destination. For the plurality of TBs/logical channels/destinations, the UE may determine a first number, N (N>=1), of a plurality of SL DRX active times. For example, the first number of SL DRX active times may comprise a first active time and a second active time that are the same (e.g., corresponding to a same destination ID).

In an embodiment, the UE may determine the size of the MCSt, M, based on the plurality of SL DRX active times associated with the N TBs/destinations/logical channels with data, e.g., M=<N). In an embodiment, the UE may select one or more of the N TBs/destinations/logical channels with data for the MCSt. For example, the one or more selected TBs/destinations/logical channels may have overlapped and/or contiguous/consecutive/adjacent active times in time domain. For example, the UE may not select, for the MCSt, a TB/destination/logical channel whose SL DRX active time is not overlapped with and/or adjacent to at least one SL DRX active time of another one TB/destination/logical channel. Referring to FIG. 33A and FIG. 33B, the UE may select UE #1 (destination ID #1) and UE #3 (destination ID #3) but not UE #2 (destination ID #2) for the MCSt.

In the example of FIG. 33A and FIG. 33B, the UE may determine/estimate N=3 TBs and/or PSCCH/PSSCH transmissions. For example, the UE may determine N=3 logical channels with data available, comprising a first logical channel associated with a first destination ID (e.g., UE #1), a second logical channel associated with a second destination ID (e.g., UE #2), and a third logical channel associated with a third destination ID (e.g., UE #3). The UE may determine three SL DRX active times associated with the N=3 destinations: a first SL DRX active time associated with UE #1, a second SL DRX active time associated with UE #2, and a third SL DRX active time associated with UE #3.

In an embodiment, the UE may determine whether to transmit the N=3 TBs via MCSt or not based on the three SL DRX active times. For example, the UE may determine to transmit the plurality of TBs via MCSt if at least two of the plurality of SL DRX active times overlap in at least one slot. For example, the UE may determine to transmit the plurality of TBs via MCSt if at least two of the plurality of SL DRX active times overlap in at least two slots. For example, the UE may determine to transmit the plurality of TBs via MCSt if at least two of the plurality of SL DRX active times are adjacent in time domain (e.g., a first slot is in a first active time and a second slot, adjacent to the first slot, is in the second active time). Otherwise, if none of the plurality of SL DRX active times overlap and/or are adjacent in time domain, the UE may not transmit the TBs via MCSt. For example, the UE may transmit the TBs separately, via independent single-slot transmissions.

In the example of FIG. 33A and FIG. 33B, the UE may determine to perform MCSt and/or trigger resource (re-) selection for MCSt (e.g., MCSt resource (re-)selection) based on the first SL DRX active time and the third SL DRX active time overlapping in time domain. For example, as shown in FIG. 33B, the first SL DRX active time and the third SL DRX active time overlap in slot 3 and slot 4, and they are adjacent in slots (2,3) and slots (4,5). The UE may determine to perform MCSt resource selection for data associated with the first destination and the third destination based on the overlap/adjacency of the first SL DRX active time and the third SL DRX active time. For example, the UE may not perform MCSt resource selection for data associated with the second destination because of the second active time not overlapping/being adjacent to any of the first or third active times. In an embodiment, the UE selects the logical channels for MCSt based on the respective active times being overlapped and/or adjacent in time domain. Embodiments increase the chance of finding consecutive resources for MCSt and transmitting MCSt to different destinations within their active times.

In the example of FIG. 33A and FIG. 33B, the UE may determine the size/length of the MCSt to be M=2. For example, the UE may determine the size/length of the MCSt based on the plurality of SL DRX active times associated with the plurality of logical channels with SL data available. For example, the UE may determine the size/length of the MCSt based on a number of slots/subframes/milliseconds that the plurality of SL DRX active times overlap or are adjacent in time domain. In the example of FIG. 33A and FIG. 33B, the UE may determine the size of the MCSt to be M=2 based on finding two consecutive resources/slots within the first SL DRX active time and the third SL DRX active time. For example, the UE determines that the first active time and the third active time are adjacent in slots (2,3) and slots (3,4) and slots (4,5).

In an embodiment, the UE may determine the size of MCSt, M, based on the number of adjacent/consecutive slots overlapping with or within one of the plurality of SL DRX active times (e.g., each slot within a respective/distinct SL DRX active time). For example, in FIG. 33B, the UE may determine, based on the plurality of SL DRX active times, that there is at least one instance of two consecutive slots, wherein a first slot of the two consecutive slots is within the first SL DRX active time and a second slot of the two consecutive slots is within the third SL DRX active time (e.g., slots [2, 3], [3, 4], [4, 5]). The UE may determine, based on the number of consecutive slots, the size of the MCSt to be M=2.

In an embodiment, the UE may determine the size of MCSt, M, based on the number of adjacent/consecutive slots overlapping with or within at least one of the plurality of SL DRX active times (e.g., each slot within a respective/distinct SL DRX active time). For example, in FIG. 33B, the UE may determine, based on the plurality of SL DRX active times, that there is at least one instance of two consecutive slots, wherein a first slot of the two consecutive slots is within at least one of the first SL DRX active time and the third SL DRX active time, and a second slot of the two consecutive slots is within at least one of the first SL DRX active time and the third SL DRX active time (e.g., slots [2, 3], [3, 4], [4, 5], [5, 6]). The UE may determine, based on the number of consecutive slots, the size of the MCSt to be M=2.

In an embodiment, the UE may determine the size of MCSt, M, based on the number of adjacent/consecutive slots overlapping with or within all of the plurality of SL DRX active times (e.g., each slot within a respective/distinct SL DRX active time). For example, in FIG. 33B, the UE may determine, based on the plurality of SL DRX active times, that there is at least one instance of two consecutive slots, wherein a first slot of the two consecutive slots is within the first SL DRX active time and the third SL DRX active time, and a second slot of the two consecutive slots is within the first SL DRX active time and the third SL DRX active time (e.g., slots [3,4]). The UE may determine, based on the number of consecutive slots, the size of the MCSt to be M=2.

The UE may determine the size of MCSt, M, based on a maximum/allowed size/number of consecutive resources/slots for MCSt, e.g., M_max. In an example, M_max may be pre-defined/pre-configured, e.g., per numerology. In an example, M_max may be configured by the Tx UE and/or the base station via RRC signaling. For example, the UE (Tx UE and/or the Rx UE) may receive an RRC message from the base station and/or another UE, comprising SL configurations. The SL configurations may comprise a parameter indicating a value of the M_max (e.g., 4 or 8 or etc.).

In an embodiment, the UE may trigger resource selection/re-selection procedure for MCSt. The resource selection/re-selection procedure may be based on the size of the MCSt. The MAC entity of the UE may indicate a set of parameters of the MCSt (e.g., priority, PDB, subchannel size, reservation period, etc.) to the physical layer of the UE. For example, the plurality of TBs and/or PSCCH/PSSCH transmissions may be associated with a same set of parameters. The UE (e.g., PHY/L1 of the UE) may determine a set of candidate resources for MCSt based on the set of parameters. For example, the UE may initialize the set of candidate resources and/or exclude resources based on the exclusion steps (referring to FIG. 26 and FIG. 27), and determine the set of (remaining) candidate resources for transmitting the plurality of TBs via consecutive resources (e.g., single-slot resources).

In an embodiment, the MAC entity of the UE may indicate the size/length of the MCSt, M, to the physical layer of the UE. The UE (e.g., PHY/L1 of the UE) may determine a set of candidate resources for MCSt based on the size/length of the MCSt, M. For example, the UE may determine the set of (remaining) candidate resources that comprise consecutive resources/slots/single-slot resources for the MSCt. For example, the set of candidate resources may comprise candidate multi-slot/MCSt resources. Each candidate multi-slot/MCSt resource may comprise M consecutive slots/resources/single-slot resources for the MCSt.

In an embodiment, the MAC entity of the UE may indicate the plurality of SL DRX active times, in the plurality of destinations receiving SL data of the plurality of logical channels, to the physical layer of the UE. The UE (e.g., PHY/L1 of the UE) may determine a set of candidate resources for MCSt based on the plurality of SL DRX active times. For example, the UE may determine the set of (remaining) candidate resources that comprise consecutive resources/slots/single-slot resources within the plurality of SL DRX active times for the MSCt.

For example, a candidate resource for the MCSt (e.g., a candidate multi-slot resource or a candidate MCSt resource) may comprise M (e.g., a first number of) consecutive/adjacent resources (e.g., single-slot resources) in time, such that each resource of the consecutive/adjacent resources is within at least one of the plurality of SL DRX active times.

Figure 34:
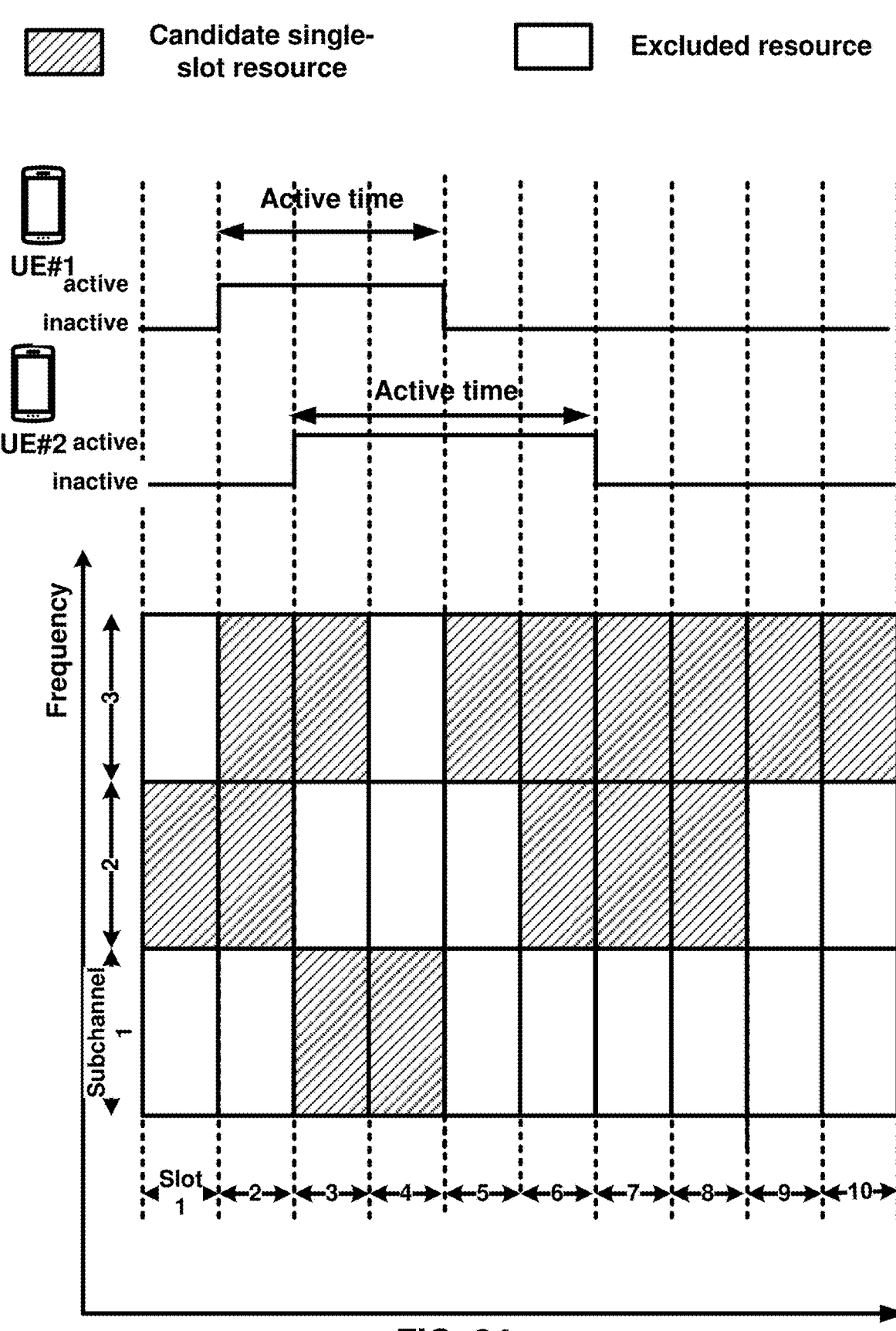
FIG. 34 shows an example of candidate resource set for MCSt with DRX.

FIG. 34 shows an example of candidate resource set for MCSt with DRX. In this example, the UE determines a set of candidate resources for a MCSt of size M=2. The MCSt may be for transmission of a first TB comprising data of a first logical channel associated with a first destination (UE #1), and a second TB comprising data of a second logical channel associated with a second destination (UE #2). The first destination may have a first SL DRX active time. The second destination may have a second SL DRX active time. The UE may determine the set of candidate resources, as shown in FIG. 34. Each candidate resource may be a multi-slot/MCSt resource of size 2. Each candidate resource may comprise two consecutive resources (e.g., single-slot resources).

In an embodiment, the UE determines whether the set of candidate resources comprises at least one candidate multi-slot/MCSt resource (e.g., of size M) within the plurality of SL DRX active times, e.g., such that each slot is within at least one of the plurality of SL DRX active times. For example, in FIG. 34, the UE determines that the set comprises a first candidate multi-slot resource in subchannel #3 and slots (2,3), such that the first resource (in slot 2) is within the first SL DRX active time and the second resource (consecutive to the first resource and in slot 3) is within the second SL DRX active time. For example, in FIG. 34, the UE determines that the set comprises a second candidate multi-slot resource in subchannel #3 and slots (5,6), such that the first resource (in slot 5) is within the second SL DRX active time and the second resource (consecutive to the first resource and in slot 6) is within the second SL DRX active time.

In an embodiment, in response to determining that the set of candidate resources does not comprise a candidate multi-slot/MCSt resource within the plurality of SL DRX active times, the UE may select and/or include/add at least one resource (e.g., single-slot resource or multi-slot resource) to the set, such that the resulting set comprises at least one candidate multi-slot/MCSt resource within the plurality of SL DRX active times. In an embodiment, if there is no candidate multi-slot/MCSt resource remained in the set within the plurality of SL DRX active times, the UE may select and/or include/add at least one candidate resource (e.g., single-slot resource or multi-slot resource) within the plurality of SL DRX active times to the set. The set of candidate resources for MCSt may comprise at least one multi-slot/MCSt candidate resource such that each resource (e.g., single-slot resource) of the multi-slot/MCSt resource is within at least one of the plurality of SL DRX active times.

Figure 35:
FIG. 35 shows an example of including resources in the candidate resource set for MCSt with DRX.

FIG. 35 shows an example of including resources in the candidate resource set for MCSt with DRX. As shown in example, there is no candidate multi-slot resource (comprising two consecutive candidate single-slot resources) within the two DRX active time. The UE may determine/select and include/add the single-slot resource in subchannel #2 and slot 5 in the set, such that the set comprises at least one multi-slot resource with each resource within at least one SL DRX active time.

In an embodiment, the MAC entity of the UE may indicate a union of the plurality of SL DRX active times, in the plurality of destinations receiving SL data of the plurality of logical channels, to the physical layer of the UE. The UE (e.g., PHY/L1 of the UE) may determine a set of candidate resources for MCSt based on the union of the plurality of SL DRX active times. For example, the UE may determine the set of (remaining) candidate resources that comprise consecutive resources/slots/single-slot resources within the union of the plurality of SL DRX active times for the MSCt.

For example, a candidate resource for the MCSt (e.g., a candidate multi-slot resource or a candidate MCSt resource) may comprise M (e.g., a first number of) consecutive/adjacent resources (e.g., single-slot resources) in time, such that each resource of the consecutive/adjacent resources is within the union of the plurality of SL DRX active times.

Figure 36:
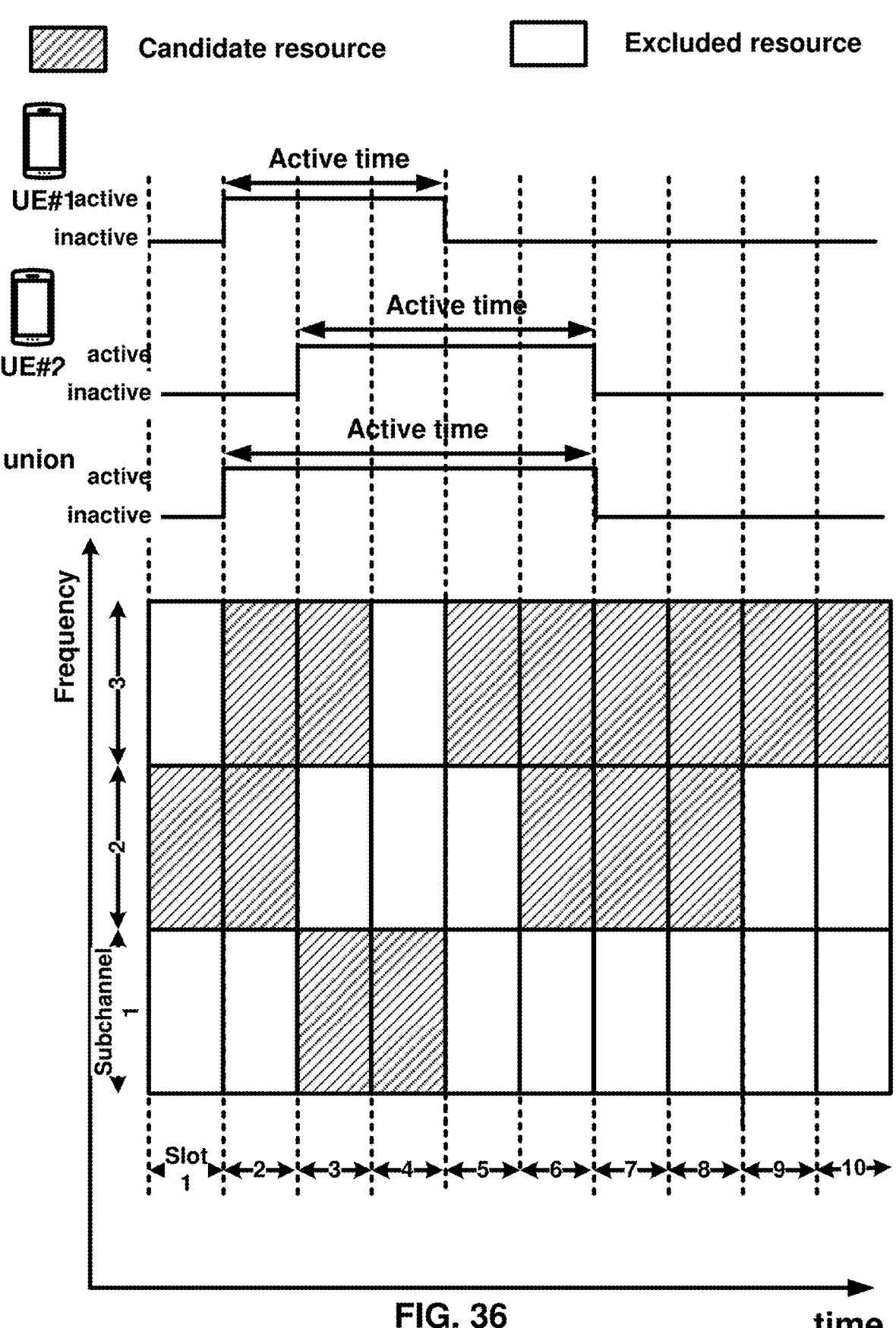
FIG. 36 shows an example of candidate resource set for MCSt with DRX.

FIG. 36 shows an example of candidate resource set for MCSt with DRX. In this example, the UE determines a set of candidate resources for a MCSt of size M=2. The MCSt may be for transmission of a first TB comprising data of a first logical channel associated with a first destination (UE #1), and a second TB comprising data of a second logical channel associated with a second destination (UE #2). The first destination may have a first SL DRX active time. The second destination may have a second SL DRX active time. The UE may determine the set of candidate resources, as shown in FIG. 36. Each candidate resource may be a multi-slot/MCSt resource of size 2. Each candidate resource may comprise two consecutive resources (e.g., single-slot resources).

In an embodiment, the UE determines whether the set of candidate resources comprises at least one candidate multi-slot/MCSt resource (e.g., of size M) within the union of the plurality of SL DRX active times, e.g., such that each slot is within the indicated union active time. For example, in FIG. 36, the UE determines that the set comprises a first candidate multi-slot resource in subchannel #3 and slots (2,3), and a second candidate multi-slot resource in subchannel #3 and slots (5,6), and a third candidate multi-slot resource in subchannel #1 and slots (3,4).

In an embodiment, in response to determining that the set of candidate resources does not comprise a candidate multi-slot/MCSt resource within the union of the plurality of SL DRX active times, the UE may select and/or include/add at least one resource (e.g., single-slot resource or multi-slot resource) to the set, such that the resulting set comprises at least one candidate multi-slot/MCSt resource within the union of the plurality of SL DRX active times. In an embodiment, if there is no candidate multi-slot/MCSt resource remained in the set within the plurality of SL DRX active times, the UE may select and/or include/add at least one candidate resource (e.g., single-slot resource or multi-slot resource) within the union of the plurality of SL DRX active times to the set. The set of candidate resources for MCSt may comprise at least one multi-slot/MCSt candidate resource such that each resource (e.g., single-slot resource) of the multi-slot/MCSt resource is within the indicated union active time.

Embodiments provide a degree of freedom for the MAC entity of the UE to select destinations and/or logical channels (e.g., during the LCP) for transmission of one or more TBs via the MCSt. Embodiments enable the UE to transmit one or more repetitions of a TB, of the plurality of TBs, via the MCSt, e.g., when a first destination is not active in a corresponding slot but a second destination is active.

In an embodiment, the MAC entity of the UE may indicate the plurality of SL DRX active times, in the plurality of destinations receiving SL data of the plurality of logical channels, to the physical layer of the UE. The UE (e.g., PHY/L1 of the UE) may determine a set of candidate resources for MCSt based on the plurality of SL DRX active times. For example, the UE may determine the set of (remaining) candidate resources that comprise consecutive resources/slots/single-slot resources within the plurality of SL DRX active times for the MSCt.

For example, a candidate resource for the MCSt (e.g., a candidate multi-slot resource or a candidate MCSt resource) may comprise M (e.g., a first number of) consecutive/adjacent resources (e.g., single-slot resources) in time, such that each resource of the consecutive/adjacent resources is within all of the plurality of SL DRX active times.

In an embodiment, the UE determines whether the set of candidate resources comprises at least one candidate multi-slot/MCSt resource (e.g., of size M) within the plurality of SL DRX active times, e.g., such that each slot is within all of the plurality of SL DRX active times. For example, in FIG. 34, the UE determines that the set comprises a first candidate multi-slot resource in subchannel #1 and slots (3,4), such that both the first resource (in slot 3) and the second resource (in slot 4) are within the first SL DRX active time and the second SL DRX active time.

In an embodiment, in response to determining that the set of candidate resources does not comprise a candidate multi-slot/MCSt resource within the plurality of SL DRX active times, the UE may select and/or include/add at least one resource (e.g., single-slot resource or multi-slot resource) to the set, such that the resulting set comprises at least one candidate multi-slot/MCSt resource within the plurality of SL DRX active times. In an embodiment, if there is no candidate multi-slot/MCSt resource remained in the set within the plurality of SL DRX active times, the UE may select and/or include/add at least one candidate resource (e.g., single-slot resource or multi-slot resource) within the plurality of SL DRX active times to the set. The set of candidate resources for MCSt may comprise at least one multi-slot/MCSt candidate resource such that each resource (e.g., single-slot resource) of the multi-slot/MCSt resource is within all of the plurality of SL DRX active times.

Figure 37:
FIG. 37 shows an example of including resources in the candidate resource set for MCSt with DRX.

FIG. 37 shows an example of including resources in the candidate resource set for MCSt with DRX. As shown in example, there is no candidate multi-slot resource (comprising two consecutive candidate single-slot resources) within the two DRX active time. The UE may determine/select and include/add two single-slot resources in subchannel #2 and slot 3 and slot 4 in the set, such that the set comprises at least one multi-slot resource with each resource within the two SL DRX active times.

In an embodiment, the MAC entity of the UE may indicate an intersection of the plurality of SL DRX active times, in the plurality of destinations receiving SL data of the plurality of logical channels, to the physical layer of the UE. The UE (e.g., PHY/L1 of the UE) may determine a set of candidate resources for MCSt based on the intersection of the plurality of SL DRX active times. For example, the UE may determine the set of (remaining) candidate resources that comprise consecutive resources/slots/single-slot resources within the intersection (and thus all) of the plurality of SL DRX active times for the MSCt.

For example, a candidate resource for the MCSt (e.g., a candidate multi-slot resource or a candidate MCSt resource) may comprise M (e.g., a first number of) consecutive/adjacent resources (e.g., single-slot resources) in time, such that each resource of the consecutive/adjacent resources is within the intersection of the plurality of SL DRX active times.

In the example of FIG. 37, the intersection of the two SL DRX active times comprises slot #3 and slot #4. Both the first destination and the second destination may be active during the intersection of the two active times.

In an embodiment, the UE determines whether the set of candidate resources comprises at least one candidate multi-slot/MCSt resource (e.g., of size M) within the intersection of the plurality of SL DRX active times, e.g., such that each slot is within the indicated intersection active time. For example, in FIG. 37, the UE determines that the set does not comprise any such candidate resource.

In an embodiment, in response to determining that the set of candidate resources does not comprise a candidate multi-slot/MCSt resource within the intersection of the plurality of SL DRX active times, the UE may select and/or include/add at least one resource (e.g., single-slot resource or multi-slot resource) to the set, such that the resulting set comprises at least one candidate multi-slot/MCSt resource within the intersection of the plurality of SL DRX active times. In an embodiment, if there is no candidate multi-slot/MCSt resource remained in the set within the plurality of SL DRX active times, the UE may select and/or include/add at least one candidate resource (e.g., single-slot resource or multi-slot resource) within the intersection of the plurality of SL DRX active times to the set. The set of candidate resources for MCSt may comprise at least one multi-slot/MCSt candidate resource such that each resource (e.g., single-slot resource) of the multi-slot/MCSt resource is within the indicated intersection active time.

Embodiments provide a guarantee for the MAC entity of the UE that any of the available data/TBs can be multiplexed in and/or transmitted to any of the destinations via the candidate MCSt resources. For example, the MAC entity and/or the HARQ entity may move the plurality of TBs within the consecutive resources of the MCSt on the go, based on all of the destinations being active during any of the slots/resources of the MCSt.

In an embodiment, the MAC entity of the UE may indicate the plurality of SL DRX active times, in the plurality of destinations receiving SL data of the plurality of logical channels, to the physical layer of the UE. The UE (e.g., PHY/L1 of the UE) may determine a set of candidate resources for MCSt based on a first SL DRX active time of the plurality of SL DRX active times. For example, the UE may determine the set of (remaining) candidate resources that comprise consecutive resources/slots/single-slot resources within the first SL DRX active times for the MSCt. The first SL DRX active time may be associated with a destination of a logical channel comprising SL data with the highest priority (e.g., L1 priority and/or CAPC). For example, the plurality of SL DRX active times may comprise the first SL DRX active time and a second SL DRX active time. The first SL DRX active time may be in/for/associated with a first destination UE/ID receiving SL-SCH data of a first logical channel. The second SL DRX active time may be in/for/associated with a second destination UE/ID receiving SL-SCH data of a second logical channel. For example, the SL data in the first logical channel may be associated with a first priority (e.g., L1 priority or CAPC or a MCSt priority). For example, the SL data in the second logical channel may be associated with a second priority (e.g., L1 priority or CAPC or a MCSt priority). For example, the first priority may be higher than the second priority (e.g., lower value of priority index may indicate a higher priority). For example, the UE may determine that the first SL DRX active time is the representative/primary/default active time of the MCSt, based on the first priority being higher than the second priority. For example, the UE may determine that the first SL DRX active time is the representative/primary/default active time of the MCSt, based on the first priority being the highest among a plurality of priorities of the SL data in the plurality of logical channels available for the MCSt.

For example, a candidate resource for the MCSt (e.g., a candidate multi-slot resource or a candidate MCSt resource) may comprise M (e.g., a first number of) consecutive/adjacent resources (e.g., single-slot resources) in time, such that each resource of the consecutive/adjacent resources is within the first (representative) SL DRX active time of the plurality of SL DRX active times.

In an embodiment, the UE determines whether the set of candidate resources comprises at least one candidate multi-slot/MCSt resource (e.g., of size M) within the first/representative SL DRX active time, e.g., such that each slot is within the first/representative SL DRX active time.

In an embodiment, in response to determining that the set of candidate resources does not comprise a candidate multi-slot/MCSt resource within the first/representative SL DRX active time, the UE may select and/or include/add at least one resource (e.g., single-slot resource or multi-slot resource) to the set, such that the resulting set comprises at least one candidate multi-slot/MCSt resource within the first/representative SL DRX active time of the plurality of SL DRX active times. In an embodiment, if there is no candidate multi-slot/MCSt resource remained in the set within the first/representative SL DRX active time, the UE may select and/or include/add at least one candidate resource (e.g., single-slot resource or multi-slot resource) within the first/representative SL DRX active times to the set. The set of candidate resources for MCSt may comprise at least one multi-slot/MCSt candidate resource such that each resource (e.g., single-slot resource) of the multi-slot/MCSt resource is within first/representative SL DRX active time.

In an embodiment, the MAC entity of the UE may determine and/or indicate the first/representative SL DRX active time, of the plurality of SL DRX active times in the plurality of destinations receiving SL data of the plurality of logical channels, to the physical layer of the UE. The UE (e.g., PHY/L1 of the UE) may determine a set of candidate resources for MCSt based on the first/representative SL DRX active time. For example, the UE may determine the set of (remaining) candidate resources that comprise consecutive resources/slots/single-slot resources within the first/representative SL DRX active time for the MSCt.

Embodiments provide a guarantee for the MAC entity of the UE that at least the highest priority data/TB can be multiplexed in and/or transmitted via the candidate MCSt resource.

In an embodiment, the MAC entity of the UE may determine and/or indicate the first/representative SL DRX active time, of the plurality of SL DRX active times in the plurality of destinations receiving SL data of the plurality of logical channels, to the physical layer of the UE. The UE (e.g., PHY/L1 of the UE) may determine a set of candidate single-slot resources based on the first/representative SL DRX active time. For example, the UE may determine the set of (remaining) candidate resources that comprise at least one single-slot resource within the first/representative SL DRX active time. In an embodiment, the PHY/L1 layer may not be aware whether the resource selection is for MCSt or for single-slot transmission. For example, the MAC entity may not indicate any size (M) to the PHY/L1 for the sensing and resource selection procedure.

In an embodiment, the MAC entity of the UE (e.g., the Tx UE) may select (e.g., randomly or based on its implementation) multiple consecutive time and frequency resources for multiple (e.g., M) transmission opportunities for the MCSt. In an embodiment, the MAC entity of the UE may select time and frequency resources for multiple consecutive transmission opportunities for the MCSt. For example, the MAC entity may select a MCSt/multi-slot resource of size M, e.g., comprising M consecutive resources in time domain. For example, the MAC entity may select the MCSt/multi-slot resource (e.g., resource for MCSt) from the set of candidate resources indicated by the physical layer of the UE.

For example, the set may include single-slot candidate resources. The UE/MAC entity may select, from the set of candidate resources, multiple consecutive resources (e.g., single-slot resources). For example, the multiple consecutive resources may occur within the plurality of SL DRX active times associated with the MCSt. For example, each resource of the multiple consecutive resources may occur within at least one SL DRX active time of the plurality of SL DRX active times associated with the MCSt. For example, each resource of the multiple consecutive resources may occur within a first SL DRX active time of the plurality of SL DRX active times associated with the MCSt. For example, the first SL DRX active time may be the active time of a destination UE/ID with the highest priority data in the logical channel. For example, the first SL DRX active time may be the active time of a destination UE/ID that was indicated to the physical layer for sensing/selection procedure. For example, each resource of the multiple consecutive resources may occur within a respective SL DRX active time of the plurality of SL DRX active times associated with the MCSt. For example, a first resource of the multiple consecutive resources may occur within a first SL DRX active time of the plurality of SL DRX active times. For example, a second resource of the multiple consecutive resources may occur within a second SL DRX active time of the plurality of SL DRX active times associated with the MCSt, and so on. For example, each resource of the multiple consecutive resources may occur within all of the plurality of SL DRX active times associated with the MCSt.

For example, the set may include multi-slot/MCSt candidate resources. The UE/MAC entity may select, from the set of candidate resources, a multi-slot/MCSt resource. For example, the multi-slot/MCSt resource may occur within the plurality of SL DRX active times associated with the MCSt. For example, each resource of the multi-slot/MCSt resource may occur within at least one SL DRX active time of the plurality of SL DRX active times associated with the MCSt. For example, each resource of the multi-slot/MCSt resource may occur within a first SL DRX active time of the plurality of SL DRX active times associated with the MCSt. For example, the first SL DRX active time may be the active time of a destination UE/ID with the highest priority data in the logical channel. For example, the first SL DRX active time may be the active time of a destination UE/ID that was indicated to the physical layer for sensing/selection procedure. For example, each resource of the multi-slot/MCSt resource may occur within a respective SL DRX active time of the plurality of SL DRX active times associated with the MCSt. For example, a first resource of the multiple consecutive resources may occur within a first SL DRX active time of the plurality of SL DRX active times. For example, a second resource of the multiple consecutive resources may occur within a second SL DRX active time of the plurality of SL DRX active times associated with the MCSt, and so on. For example, each resource of the multi-slot/MCSt resource may occur within all of the plurality of SL DRX active times associated with the MCSt.

Figure 38:
FIG. 38 shows an example of candidate resource set for MCSt with SL DRX operation.

FIG. 38 shows an example of candidate resource set for MCSt with SL DRX operation. In this example, the UE may determine SL data available in four logical channels of four destinations, each configured with SL DRX operation. The UE may determine the set of candidate resources (e.g., single-slot resources) based on four SL DRX active times associated with the four destinations (e.g., UE #1, UE #2, UE #3 and UE #4), e.g., for a MCSt of size 4. For example, the MAC entity may indicate M=4 (the size of the MCSt) and/or one set of parameters for the MCSt and/or four SL DRX active times of the four destinations of the MCSt to the physical layer. The UE e.g., PHY/L1) may determine whether the set comprises at least one candidate multi-slot resource, comprising four consecutive single-slot resources, within the four SL DRX active times. In the example of FIG. 38, the UE determines that there are no four consecutive single-slot candidate resources in the set such that each slot, of the four candidate slots, is within a respective SL DRX active time of the four destinations. The UE may select and/or add/include one or more single-slot resources (e.g., the resource in subchannel #2 and slot #5 and slot #6) in the set, such that each slot, of the four candidate slots, is within a respective SL DRX active time of the four destinations. As a result, the set may comprise four consecutive single-slot candidate resources within the four indicated DRX active times: resources in subchannel #2 and slots [3, 4, 5, 6], wherein the resource in slot 3 is within SL DRX active time of UE #2, the resource in slot 4 is within SL DRX active time of UE #1, the resource in slot 5 is within SL DRX active time of UE #4, and the resource in slot 6 is within SL DRX active time of UE #4. For example, the set may comprise at least one multi-slot/MCSt candidate resource of size 4, from slot 3 to 6.

Figure 39:
FIG. 39 shows an example of candidate resource set for MCSt with SL DRX operation.

FIG. 39 shows an example of candidate resource set for MCSt with SL DRX operation. In this example, the UE may determine SL data available in four logical channels of four destinations, each configured with SL DRX operation. The UE may determine the set of candidate resources (e.g., multi-slot/MCSt candidate resources) based on four SL DRX active times associated with the four destinations (e.g., UE #1, UE #2, UE #3 and UE #4), e.g., for a MCSt of size 4. For example, the MAC entity may indicate M=4 (the size of the MCSt) and/or one set of parameters for the MCSt and/or four SL DRX active times of the four destinations of the MCSt to the physical layer. The UE e.g., PHY/L1) may determine whether the set comprises at least one candidate multi-slot/MCst resource, comprising four consecutive single-slot resources, within the four SL DRX active times. In the example of FIG. 39, the UE determines that there are no multi-slot candidate resources in the set such that each slot, of the four candidate slots, is within a respective SL DRX active time of the four destinations. The UE may select and/or add/include one or more single-slot resources (e.g., the resource in subchannel #2 and slot #3 and slot #4) in the set, such that each slot, of the four candidate slots, is within a respective SL DRX active time of the four destinations. As a result, the set may comprise a multi-slot candidate resource comprising four consecutive single-slot candidate resources within the four indicated DRX active times: resources in subchannel #2 and slots [3, 4, 5, 6], wherein the resource in slot 3 is within SL DRX active time of UE #4, the resource in slot 4 is within SL DRX active time of UE #2, the resource in slot 5 is within SL DRX active time of UE #3, and the resource in slot 6 is within SL DRX active time of UE #1. As shown in the FIG. 39, in each slot, one or more destinations may be active, so the UE may be able to map one of the active UEs to each slot/resource of the MCSt.

In existing technologies, there are no mechanisms to enable the PHY/L1 layer of the UE to select and include/add resources in the set of candidate resources such that candidate multi-slot/MCst resources are reported to MAC for resource selection within active times of the respective UEs/destination IDs receiving the SL-SCH data.

Figure 40:
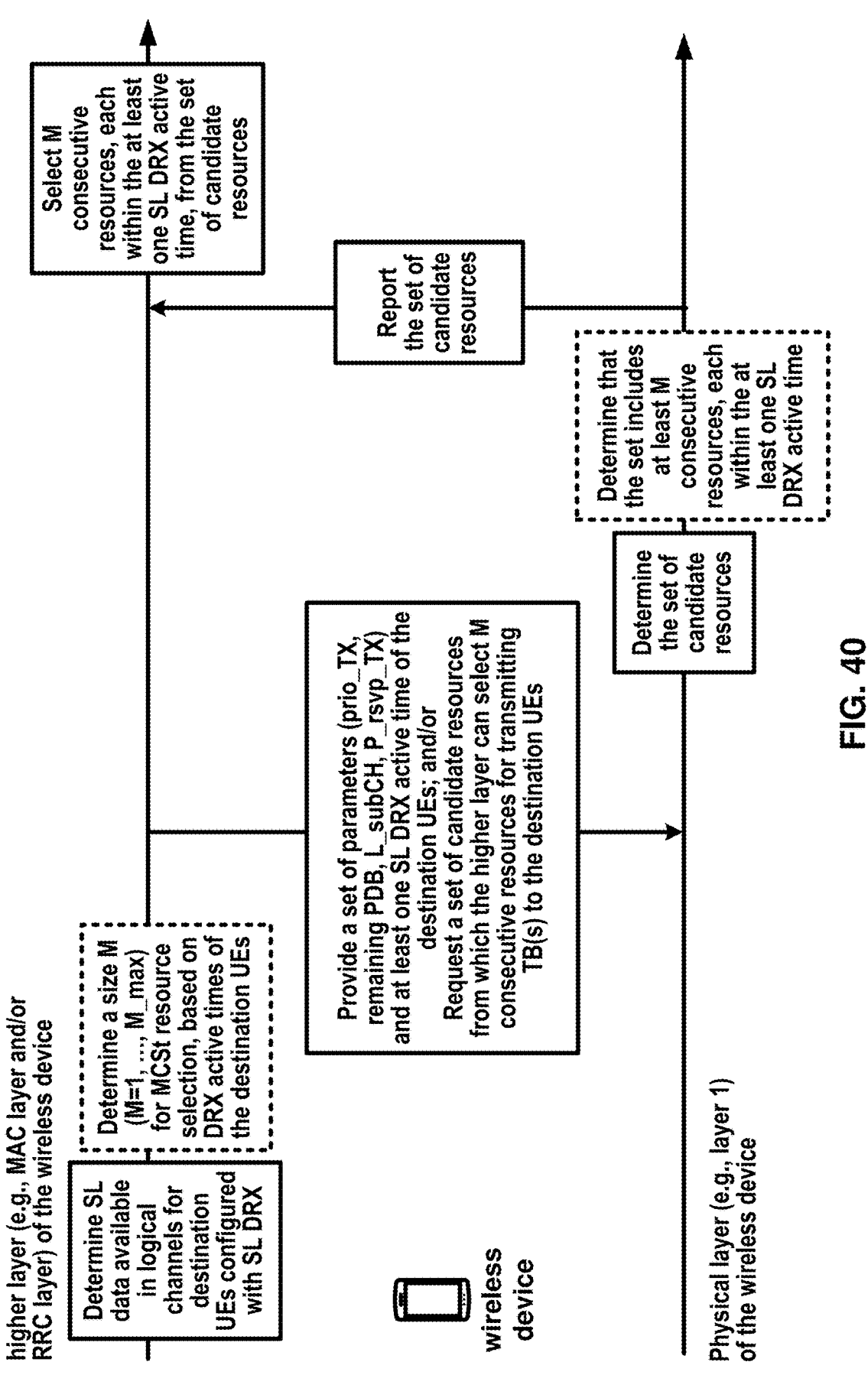
FIG. 40 shows an example of MCSt resource selection procedure.

FIG. 40 shows an example of MCSt resource selection procedure. In this example, the cross-layer signaling between MAC and PHY for MCSt resource selection is illustrated. The higher layer of the UE (e.g., MAC layer and/or RRC layer) may determine SL data is available in one or more logical channels for one or more destination UEs/IDs. The one or more destination UEs/IDs may be configured with SL DRX operation. The higher layer of the UE may (or may not) determine a size M (M=1, . . . , M_max) for MCSt resource selection, based on the one or more SL DRX active times of the one or more destination UEs/IDs. In an example, the size, M, may be pre-defined/pre-configured, or indicated by the base station via RRC signaling. In an example, the maximum allowable size, M_max, may be pre-defined/pre-configured, or indicated by the base station via RRC signaling. The higher layer may indicate/provide to the lower layer (e.g., physical layer, L1) of the UE a set of parameters (e.g., prio_TX, remaining PDB, L_subCH, P_rsvp_TX) and/or at least one SL DRX active time of the one or more destination UEs/IDs. For example, the higher layer may indicate the one or more (up to M) SL DRX active times of the one or more destination UEs/IDs to PHY. For example, the higher layer may indicate a representative/ primary SL DRX active time of the one or more destination UEs/IDs (e.g., the destination with the higher/highest priority data/information/MAC-CE) to PHY. For example, the higher layer may indicate a union of the one or more SL DRX active times of the one or more destination UEs/IDs to PHY. For example, the higher layer may indicate an intersection of the one or more SL DRX active times of the one or more destination UEs/IDs to PHY. The higher layer may request a set of candidate resources from which the higher layer can select M consecutive resources for transmitting TB(s) to the one or more destination UEs/IDs. The lower/ physical layer of the UE may determine the set of candidate resources. The set of candidate resources may comprise multi-slot/MCSt resources, each comprising M consecutive single-slot resources in time domain, and/or same subchannel(s) in the frequency domain. The set of candidate resources may comprise single-slot resources. The lower/ physical layer of the UE may (or may not) determine (e.g., guarantee) that the set includes at least M consecutive resources (e.g., at least one multi-slot/MCSt candidate resource), wherein each resource of the at least M consecutive resources is within the at least one SL DRX active time, indicated by the higher layer. The lower/physical layer of the UE may report the set of candidate resources to the higher layers. The higher layer of the UE (e.g., MAC layer) may select one multi-slot/MCSt resource and/or M consecutive resources from the reported set of candidate resources, wherein each resource of the multi-slot/MCSt resource and/or M consecutive resources is within the at least one SL DRX active time indicated to the physical layer.

In an example, a wireless device may determine a set of candidate resources for a multiple consecutive slot transmission (MCSt) to one or more second wireless devices. The wireless device may determine the set based on a plurality of sidelink discontinuous reception (DRX) active times associated with a plurality of destination identifiers (IDs) of the one or more second wireless devices. The set may comprise a plurality of consecutive resources. A first resource, of the plurality of consecutive resources, may be within a first sidelink DRX active time of the plurality of sidelink DRX active times. A second resource, of the plurality of consecutive resources, may be within a second sidelink DRX active time of the plurality of sidelink DRX active times. The wireless device may transmit, via the plurality of consecutive resources, the MCSt to the one or more second wireless devices.

In an example, a wireless device may determine a set of candidate resources for a multiple consecutive slot transmission (MCSt) to one or more second wireless devices. The wireless device may determine the set based on a plurality of sidelink discontinuous reception (DRX) active times associated with a plurality of destination identifiers (IDs) of the one or more second wireless devices. The set may comprise a plurality of consecutive resources. Each resource of the plurality of consecutive resources may be within at least one DRX active time of the plurality of sidelink DRX active times. The wireless device may transmit, via the plurality of consecutive single slot resources, the MCSt to the one or more second wireless devices.

In an example, the plurality of destination IDs may comprise a first destination ID and a second destination ID. A first resource, of the plurality of consecutive resources, may be within a first sidelink DRX active time associated with the first destination ID. A second resource, of the plurality of consecutive resources, may be within a second sidelink DRX active time associated with the second destination ID.

The wireless device may determine to create a selected sidelink grant for the MCSt. The wireless device may trigger resource selection for the MCSt. The wireless device may determine that sidelink data is available in logical channels for the plurality of destination IDs.

A resource may be a single-slot resource comprising one or more subchannels in a slot. A candidate resource may be a single-slot resource that is determined to be available for transmission. Consecutive resources may comprise two or more single-slot resources that are adjacent in time domain.

The wireless device may determine a size of the MCSt and/or a number of the plurality of consecutive resources based on the plurality of sidelink DRX active times. The size/number may be equal to or larger than a number of consecutive slots. For example, each slot of the consecutive slots may be within at least one of a plurality of sidelink DRX active times. The size/number may be equal to or larger than a number of consecutive slots. For example, each slot of the consecutive slots may be within a respective/distinct sidelink DRX active time of a plurality of sidelink DRX active times. The size/number may be equal to or larger than a number of consecutive slots. The consecutive slots may comprise a first slot within a first sidelink DRX active time, of the plurality of sidelink DRX active times, and a second slot within a second sidelink DRX active time, of the plurality of sidelink DRX active times. The size/number may be equal to or smaller than a maximum size/number for MCSt. One or more radio resource control (RRC) messages (e.g., RRC reconfiguration message and/or SIB message) may comprise sidelink configurations. The one or more RRC messages may indicate the maximum size/number for MCSt. The wireless device may determine the set of candidate resources based on size of the MCSt and/or a number (e.g., minimum number or maximum number) of the plurality of consecutive resources.

The wireless device may determine the set of candidate resources based on a set of parameters associated with a plurality of logical channels and/or physical sidelink shared channel (PSSCH) transmissions via the MCSt. The set of parameters may comprises at least one of: a priority (e.g., physical layer priority and/or channel access priority class, CAPC); a remaining packet delay budget; a number of subchannels; and a resource reservation interval.

The set may comprise one or more candidate multi-slot resources for the MCSt. Each candidate multi-slot resource, of the one or more candidate multi-slot resources, may comprise two or more consecutive single-slot resources. A multi-slot resource may comprise a first quantity of consecutive single-slot resources. The one or more RRC messages may comprise a configuration parameter indicating the first quantity. The first quantity may be pre-defined. The UE may determine the first quantity, e.g., based on the plurality of sidelink DRX active times. The wireless device may determine the set of candidate resources based on the first quantity. The wireless device may determine that the set comprises at least one multi-slot resource, comprising the plurality of consecutive resources, for the MCSt. Each resource, of the plurality of consecutive resources, may be within a respective sidelink DRX active time of the plurality of sidelink DRX active times. Each resource, of the plurality of consecutive resources, may be within the plurality of sidelink DRX active times.

The wireless device may select and include/add, in response to determining that the set does not comprise the at least one multi-slot resource, and/or based on the plurality of sidelink DRX active times, at least one resource in the set of candidate resources. The at least one resource may comprise at least one single-slot resource and/or be within at least one sidelink DRX active time of the plurality of sidelink DRX active times. The at least one resource may comprise at least one single-slot resource and/or be within the plurality of sidelink DRX active times. The at least one resource may comprise at least one multi-slot consecutive resource. Each resource of the at least one multi-slot consecutive resource may be within at least one of the plurality of sidelink DRX active times. Each resource of the at least one multi-slot consecutive resource may be within the plurality of sidelink DRX active times. In response to the including/adding, the set of candidate resources may comprise at least one multi-consecutive slot resource with each single-slot resource, of the at least one multi-consecutive slot resource, being within at least one sidelink DRX active time of the plurality of sidelink DRX active times. In response to the including, the set of candidate resources may comprise at least one multi-consecutive slot resource with each single-slot resource, of the at least one multi-consecutive slot resource, being within a respective sidelink DRX active time of the plurality of sidelink DRX active times. In response to the including, the set of candidate resources may comprise at least one multi-consecutive slot resource with each single-slot resource, of the at least one multi-consecutive slot resource, being within the plurality of sidelink DRX active times. The wireless device may select the plurality of consecutive single slot resources for the MCSt, from the set of candidate resources, based on the plurality of DRX active times.

The wireless device may determine that the set comprises the plurality of consecutive resources comprising at least two consecutive single slot resources, for the MCSt. Each single slot resource, of the at least two consecutive single slot resources, may be within a representative active time of the plurality of sidelink DRX active times. The representative active time may be a third sidelink DRX active time, of the plurality of sidelink DRX active times, associated with a third destination ID of the one or more second wireless devices. The third destination ID may be associated with sidelink data/logical channel having a highest priority of sidelink data/logical channels of the one or more second wireless devices. The representative active time may be/comprise an intersection of the plurality of sidelink DRX active times. The representative active time may be/comprise a union of the plurality of sidelink DRX active times. The wireless device may select the plurality of consecutive resources for the MCSt, from the set of candidate resources, based on the plurality of DRX active times.

The first sidelink DRX active time may be the second sidelink DRX active time. The wireless device may determine a MCSt resource comprising the plurality of consecutive single slot resources. Each of the plurality of sidelink DRX active times may correspond to a destination ID of the plurality of destination IDs. The wireless device may transmit to each of the destination IDs, sidelink DRX configurations indicating a respective sidelink DRX active time of the plurality of sidelink DRX active times. Active time may be/comprise a time duration during which at least one of the DRX inactivity timer and DRX on duration timer is and/or will be running in the future.

The wireless device may determine a plurality of sidelink discontinuous reception (DRX) active times, comprising: a first DRX active time associated with a first destination identifier of one or more second wireless devices; and a second DRX active time associated with a second destination identifier of the one or more second wireless devices. The wireless device may determine for a multiple consecutive slot transmission (MCSt) to the one or more second wireless devices, resources comprising a plurality of consecutive single slot resources. A first single slot resource, of the plurality of consecutive single slot resources, may be within the first DRX active time. A second single slot resource, of the plurality of consecutive single slot resources, may be within the second DRX active time. The wireless device may transmit, via the resource, the MCSt to the plurality of wireless devices.

The wireless device may determine a plurality of sidelink discontinuous reception (DRX) active times, comprising: a first DRX active time of a first destination; and a second DRX active time of a second destination. The wireless device may determine for transmitting sidelink data to a plurality of destinations, comprising the first destination and the second destination, a multiple consecutive slot transmission (MCSt) resource comprising a plurality of consecutive single slot resources. A first single slot resource, of the plurality of consecutive single slot resources, may be within the first DRX active time. A second single slot resource, of the plurality of consecutive single slot resources, may be within the second DRX active time. The wireless device may transmit via the MCSt resource, sidelink data to the plurality of destinations.

The wireless device may determine a plurality of sidelink discontinuous reception (DRX) active times, each associated with a destination of a plurality of destinations. The wireless device may determine based on the plurality of sidelink DRX active times of the plurality of destinations, a sidelink grant for a multiple consecutive slot transmission (MCSt) to the plurality of destinations. The MCSt may comprise a plurality of single slot transmissions. Each of the single slot transmissions may comprise sidelink data associated with a destination of the plurality of destinations. Each slot, of the plurality of single slot transmissions, may be within at least one DRX active time, of the plurality of DRX active times. The wireless device may transmit, via the sidelink grant, sidelink data to the plurality of destinations.

What is claimed is:

1. A wireless device comprising:
one or more processors; and
memory storing instructions that, when executed by the one or more processors, cause the wireless device to:
receive one or more configuration parameters of a sidelink resource pool;
initialize a candidate resource set, comprising one or more first multi-slot resources of the sidelink resource pool, for a plurality of sidelink transmissions to at least one destination wireless device, wherein:
each of the one or more first multi-slot resources comprises a number of consecutive slots; and
the number of consecutive slots is larger than 1;
determine to include, in the candidate resource set, a second multi-slot resource of the sidelink resource pool, wherein:
the second multi-slot resource comprises the number of consecutive slots within a sidelink discontinuous reception (DRX) active time of the at least one destination wireless device; and
determining to include the second multi-slot resource is based on none of the one or more first multi-slot resources remaining within the sidelink DRX active time in the candidate resource set; and
transmit, to the at least one destination wireless device, the plurality of sidelink transmissions via the second multi-slot resource.

2. The wireless device of claim 1, wherein each of the one or more first multi-slot resources and the second multi-slot resource comprises a plurality of consecutive single-slot resources.

3. The wireless device of claim 1, wherein at least a first single-slot resource of the second multi-slot resource is within the sidelink DRX active time of the at least one destination wireless device.

4. The wireless device of claim 1, wherein each of a plurality of consecutive single-slot resources, of the second multi-slot resource, are within the sidelink DRX active time of the at least one destination wireless device.

5. The wireless device of claim 1, wherein the plurality of sidelink transmissions comprise a plurality of physical sidelink shared channel transmissions.

6. The wireless device of claim 1, wherein the plurality of sidelink transmissions comprise a plurality of transport blocks for the at least one destination wireless device.

7. The wireless device of claim 1, wherein the at least one destination wireless device is associated with a plurality of destination identifiers (IDs), comprising:
a first destination ID configured with a first sidelink DRX configuration indicating a first DRX sidelink active time; and
a second destination ID configured with a second sidelink DRX configuration indicating a second sidelink DRX active time.

8. The wireless device of claim 1, wherein the plurality of sidelink transmissions comprise a multi-consecutive-slot transmission (MCSt).

9. The wireless device of claim 1, wherein the number of consecutive slots are within a maximum duration of a Channel Occupancy Time (COT).

10. The wireless device of claim 1, wherein the instructions further cause the wireless device to determine the candidate resource set based on a set of parameters associated with a plurality of logical channel data of the plurality of sidelink transmissions.

11. A method comprising:

receiving, by a wireless device, one or more configuration parameters of a sidelink resource pool;

initializing a candidate resource set, comprising one or more first multi-slot resources of the sidelink resource pool, for a plurality of sidelink transmissions to at least one destination wireless device, wherein:

each of the one or more first multi-slot resources comprises a number of consecutive slots; and the number of consecutive slots is larger than 1;

determining to include, in the candidate resource set, a second multi-slot resource of the sidelink resource pool, wherein:

the second multi-slot resource comprises the number of consecutive slots within a sidelink discontinuous reception (DRX) active time of the at least one destination wireless device; and the determining is based on none of the one or more first multi-slot resources remaining within the sidelink DRX active time in the candidate resource set; and transmitting, to the at least one destination wireless device, the plurality of sidelink transmissions via the second multi-slot resource.

12. The method of claim 11, wherein each of the one or more first multi-slot resources and the second multi-slot resource comprises a plurality of consecutive single-slot resources.

13. The method of claim 11, wherein at least a first single-slot resource of the second multi-slot resource is within the sidelink DRX active time of the at least one destination wireless device.

14. The method of claim 11, wherein each of a plurality of consecutive single-slot resources, of the second multi-slot resource, are within the sidelink DRX active time of the at least one destination wireless device.

15. The method of claim 11, wherein the plurality of sidelink transmissions comprise a plurality of physical sidelink shared channel transmissions.

16. The method of claim 11, wherein the plurality of sidelink transmissions comprise a plurality of transport blocks for the at least one destination wireless device.

17. The method of claim 11, wherein the at least one destination wireless device is associated with a plurality of destination identifiers (IDs), comprising:

a first destination ID configured with a first sidelink DRX configuration indicating a first DRX sidelink active time; and a second destination ID configured with a second sidelink DRX configuration indicating a second sidelink DRX active time.

18. The method of claim 11, wherein the plurality of sidelink transmissions comprise a multi-consecutive-slot transmission (MCSt).

19. The method of claim 11, wherein the number of consecutive slots are within a maximum duration of a Channel Occupancy Time (COT).

20. A non-transitory computer-readable medium comprising instructions that, when executed by one or more processors of a wireless device, cause the wireless device to:

receive one or more configuration parameters of a sidelink resource pool;

initialize a candidate resource set, comprising one or more first multi-slot resources of the sidelink resource pool, for a plurality of sidelink transmissions to at least one destination wireless device, wherein:

each of the one or more first multi-slot resources comprises a number of consecutive slots; and the number of consecutive slots is larger than 1;

determine to include, in the candidate resource set, a second multi-slot resource of the sidelink resource pool, wherein:

the second multi-slot resource comprises the number of consecutive slots within a sidelink discontinuous reception (DRX) active time of the at least one destination wireless device; and determining to include the second multi-slot resource is based on none of the one or more first multi-slot resources remaining within the sidelink DRX active time in the candidate resource set; and transmit, to the at least one destination wireless device, the plurality of sidelink transmissions via the second multi-slot resource.

* * * * *